United States Patent
Storm et al.

(10) Patent No.: US 10,083,097 B2
(45) Date of Patent: Sep. 25, 2018

(54) STORING RELATED DATA IN A DISPERSED STORAGE NETWORK

(71) Applicant: International Business Machines Corporation, Armonk, NY (US)

(72) Inventors: Michael Colin Storm, Palo Alto, CA (US); Wesley Leggette, Chicago, IL (US); Manish Motwani, Chicago, IL (US); Greg Dhuse, Chicago, IL (US); Jason K. Resch, Chicago, IL (US); Andrew Baptist, Mt. Pleasant, WI (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/276,077

(22) Filed: Sep. 26, 2016

(65) Prior Publication Data
US 2017/0010942 A1    Jan. 12, 2017

Related U.S. Application Data

(63) Continuation of application No. 14/215,542, filed on Mar. 17, 2014, now Pat. No. 9,456,035.
(Continued)

(51) Int. Cl.
*G06F 13/00* (2006.01)
*G06F 11/14* (2006.01)
(Continued)

(52) U.S. Cl.
CPC ...... *G06F 11/1469* (2013.01); *G06F 11/1092* (2013.01); *G06F 11/1448* (2013.01);
(Continued)

(58) Field of Classification Search
CPC ........ G06F 1/169; G06F 1/1616; G06F 3/067; G06F 3/0605; G06F 3/0481;
(Continued)

(56) References Cited

U.S. PATENT DOCUMENTS

2011/0314072 A1 * 12/2011 Resch .................... H04L 63/06
                                                            707/827
2013/0086442 A1    4/2013 Baptist et al.

FOREIGN PATENT DOCUMENTS

WO    2004061605 A2    7/2004

OTHER PUBLICATIONS

European Patent Office; Extended European Search Report; dated Nov. 15, 2016; 8 pgs.

* cited by examiner

*Primary Examiner* — Robert B Harrell
(74) *Attorney, Agent, or Firm* — Garlick & Markison; Timothy W. Markison; Patricia A. Markison

(57) ABSTRACT

A method includes determining, by a first client and a second client module, that a first data object and a second data objects are related. The method further includes dispersed storage error encoding the first data object to produce a first plurality of sets of encoded data slices and the second data object to produce a second plurality of sets of encoded data slices. The method further includes sending, by the first client module, first requests regarding the first plurality of sets of encoded data slices to a set of storage units. The method further includes sending, by the second client module, second requests regarding the second plurality of sets of encoded data slices to the set of storage units. The method further includes processing, by a binding module, remaining phases of the first and second write requests as a single write operation for the first and second data objects.

16 Claims, 54 Drawing Sheets

Related U.S. Application Data

(60) Provisional application No. 61/819,039, filed on May 3, 2013.

(51) Int. Cl.
*H04L 29/08* (2006.01)
*G06F 11/10* (2006.01)
*G06F 17/30* (2006.01)

(52) U.S. Cl.
CPC .. *G06F 17/30194* (2013.01); *G06F 17/30227* (2013.01); *H04L 67/1097* (2013.01); *G06F 2211/1028* (2013.01)

(58) Field of Classification Search
CPC .............. G06F 3/0631; G06F 3/0647; G06F 17/30067; G06F 17/30902; G06F 11/1092; G06F 11/1448; G06F 11/1469; G06F 17/30194; G06F 17/30227; G06F 2211/1028; G11B 27/34; G11B 27/034; H04L 1/0041; H04L 1/0057; H04L 29/06; H04L 29/06027; H04L 29/06462; H04L 29/06523; H04L 29/08072; H04L 29/08549; H04L 29/08144; H04L 67/1097; H03M 13/116; H03M 13/1111; H03M 13/1137
USPC ................ 707/827; 709/213, 231; 714/752; 715/863
See application file for complete search history.

DST allocation info 242 | data partition info 320: data ID; No. of partitions; Addr. info for each partition; format conversion indication task execution info 322

| task 326 | task ordering 328 | data partition 330 | set of DT EX mods 332 | Name 334 | interm. result processing 336 | scratch pad storage 338 | intermediate result storage 340 |
|---|---|---|---|---|---|---|---|
| 1_1 | none | 2_1 - 2_z | 1_1, 2_1, 3_1, 4_1, & 5_1 | R1-1 | DST unit 1 | DST unit 1 | DST units 1-5 |
| 1_2 | none | 2_1 - 2_4 | 1_1, 2_1, 3_1, 4_1, & 5_1 | R1-2 | DST unit 1 | DST unit 1 | DST units 1-5 |
| 1_3 | none | 2_1 - 2_4<br>2_5 - 2_z | 1_1, 2_1, 3_1, 4_1, & 5_1<br>1_2, 2_2, 3_2, 4_2, & 5_2 | R1-3 | DST unit 2 | DST unit 2 | DST units 2-6 |
| 1_4 | after 1_3 | R1-3_1 - R1-3_4<br>R1-3_5 - R1-3_z | 1_1, 2_1, 3_1, 4_1, & 5_1<br>1_2, 2_2, 6_1, 7_1, & 7_2 | R1_4 | DST unit 3 | DST unit 3 | DST units 3-7 |
| 1_5 | after 1_4 | R1-4_1 - R1-4_z &<br>2_1 - 2_z | 1_1, 2_1, 3_1, 4_1, & 5_1 | R1-5 | DST unit 1 | DST unit 1 | DST units 1-5 |
| 1_6 | after 1_1 &<br>1_5 | R1-1_1 - R1-1_z &<br>R1-5_1 - R1-5_z | 1_1, 2_1, 3_1, 4_1, & 5_1 | R1-6 | DST unit 2 | DST unit 2 | DST units 2-6 |
| 1_7 | after 1_2 &<br>1_5 | R1-2_1 - R1-2_z &<br>R1-5_1 - R1-5_z | 1_2, 2_2, 2_3, 2_4, 4_2, & 5_2 | R1-7 | DST unit 3 | DST unit 3 | DST units 3-7 |
| 2 | none | 2_1 - 2_z | 3_1, 4_1, 5_1, 6_1, & 7_1 | R2 | DST unit 7 | DST unit 7 | DST units 7, 1-4 |
| 3_1 | none (same as 1_3) | use R1_3 | | R1-1 | | | |
| 3_2 | after 3_1 | R1-3_1 - R1-3_z | 1_2, 2_2, 3_2, 4_2, & 5_2 | R3-2 | DST unit 5 | DST unit 5 | DST units 5,6, 1-3 |

FIG. 32

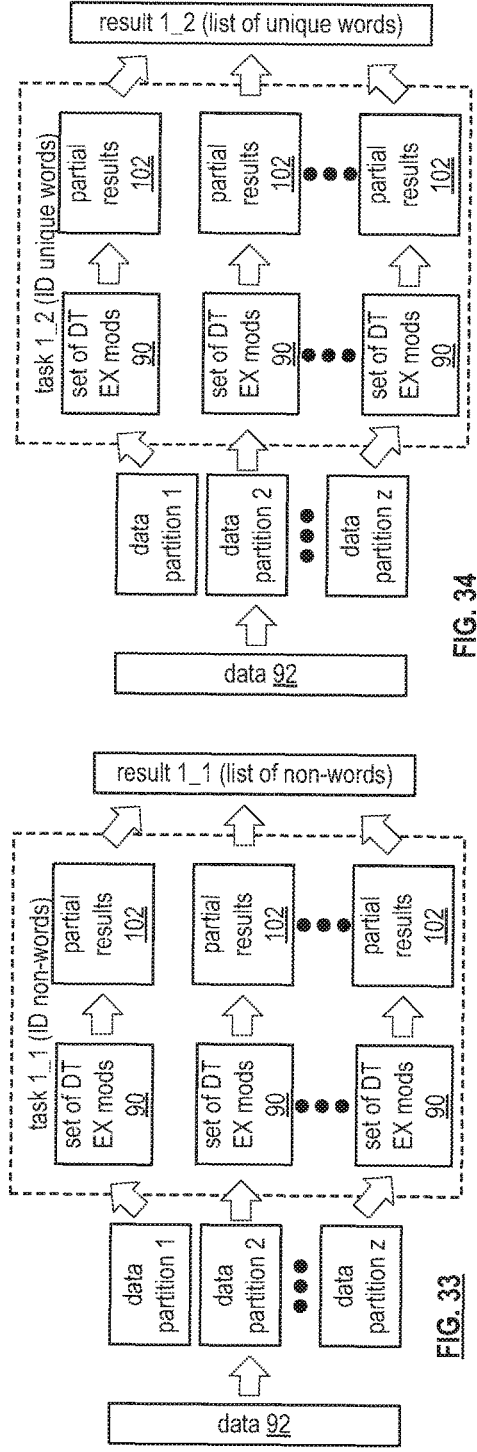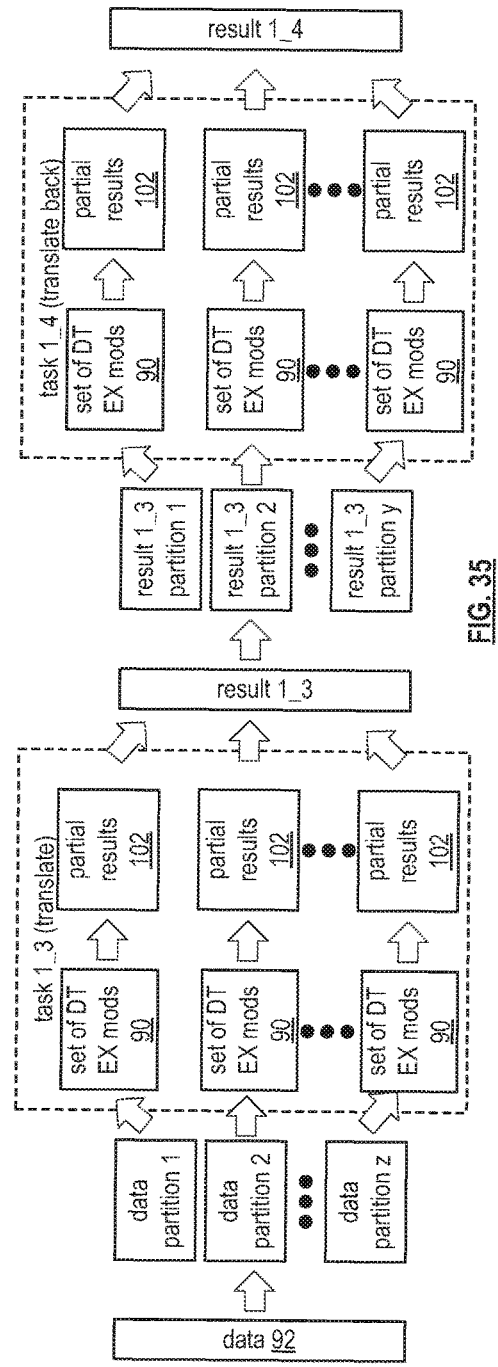

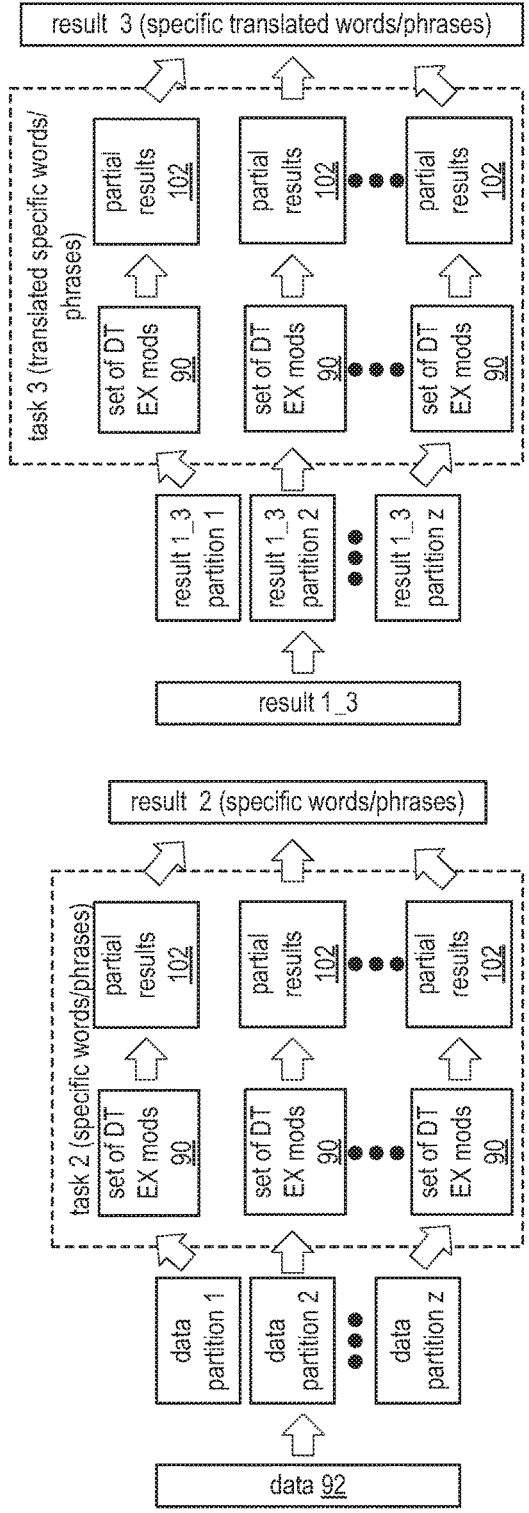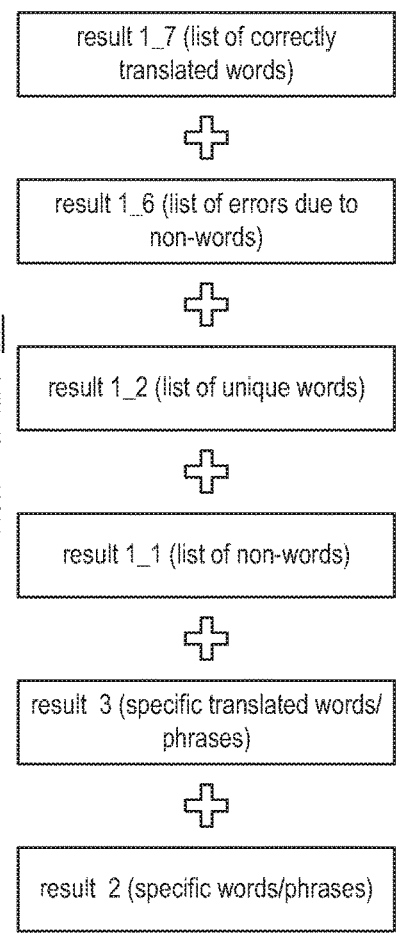

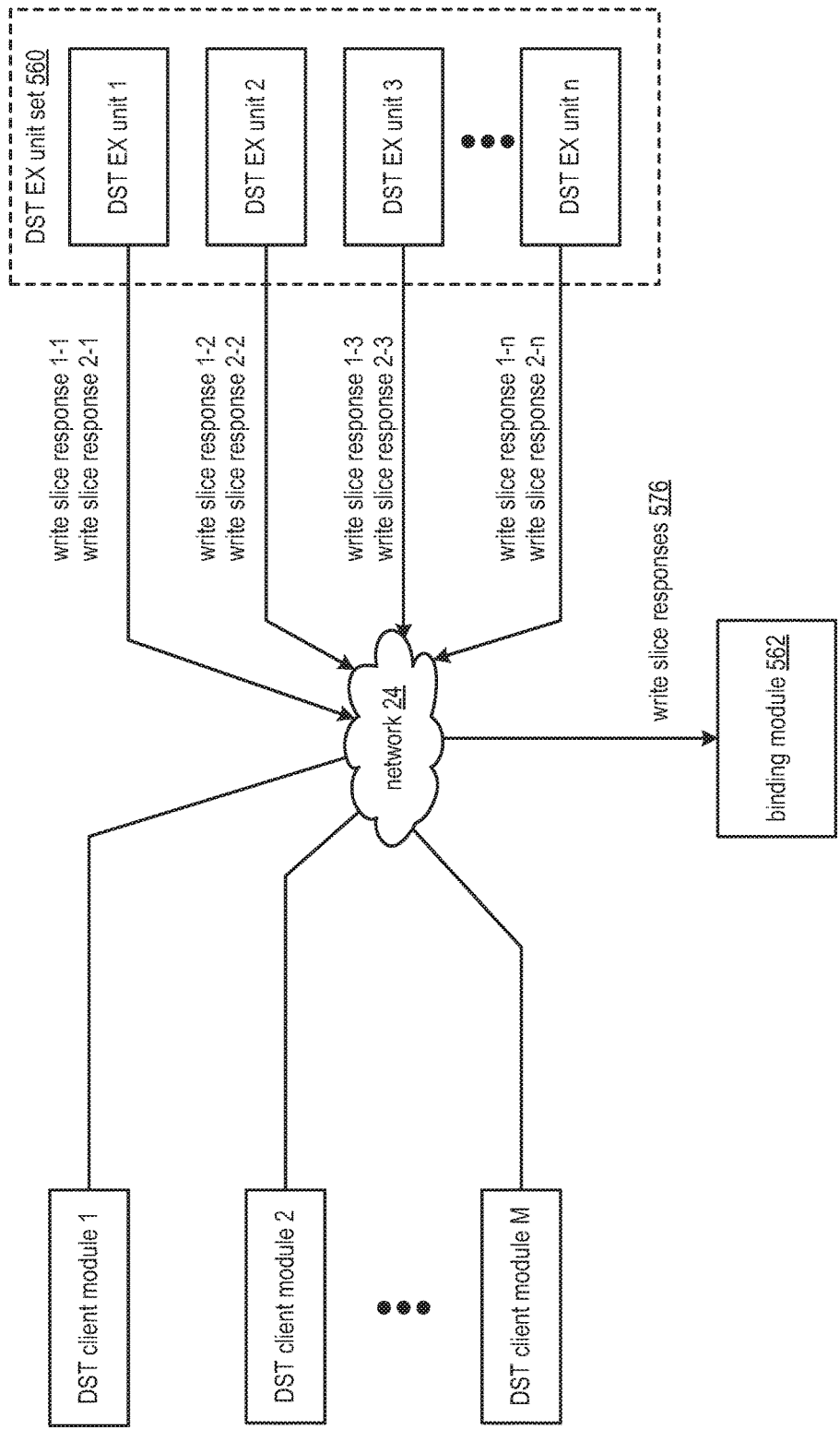

STORING RELATED DATA IN A DISPERSED STORAGE NETWORK

CROSS REFERENCE TO RELATED PATENTS

The present U.S. Utility Patent Application claims priority pursuant to 35 U.S.C. § 120 as a continuation of U.S. Utility application Ser. No. 14/215,542, entitled "STORING RELATED DATA IN A DISPERSED STORAGE NETWORK", filed Mar. 17, 2014, issuing as U.S. Pat. No. 9,456,035 on Sep. 27, 2016, which claims priority pursuant to 35 U.S.C. § 119(e) to U.S. Provisional Application No. 61/819,039, entitled "SLICE MIGRATION TRACKING IN A DISPERSED STORAGE NETWORK", filed May 3, 2013, all of which are hereby incorporated herein by reference in their entirety and made part of the present U.S. Utility Patent Application for all purposes.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

Technical Field of the Invention

This invention relates generally to computer networks and more particularly to dispersed storage of data and distributed task processing of data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 32 is a diagram of an example of DST allocation information for the example of FIG. 30 in accordance with the present invention;

FIGS. 33-38 are schematic block diagrams of the DSTN module performing the example of FIG. 30 in accordance with the present invention;

FIG. 39 is a diagram of an example of combining result information into final results for the example of FIG. 30 in accordance with the present invention;

Figure 46A:
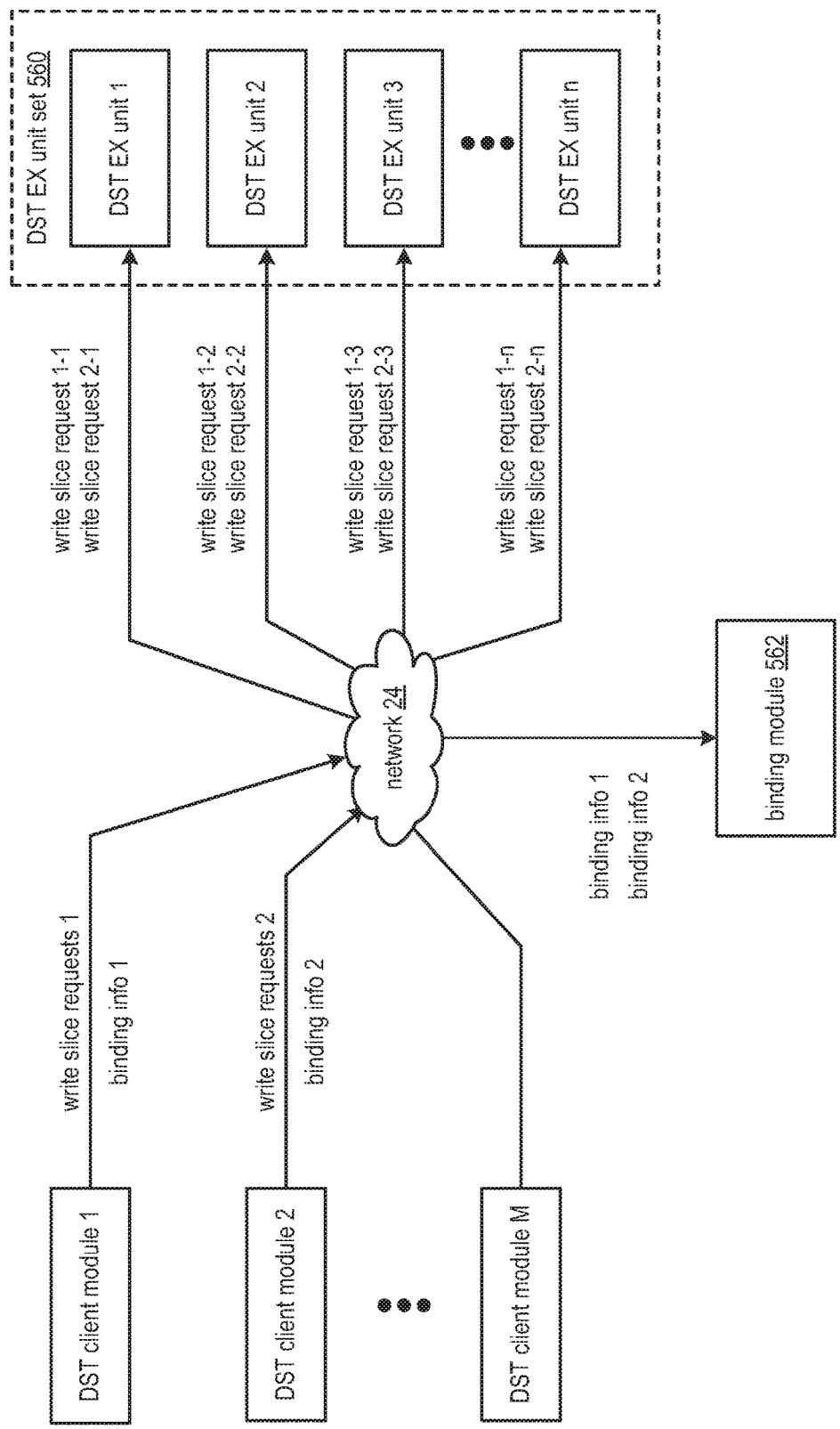
Figure 46B:
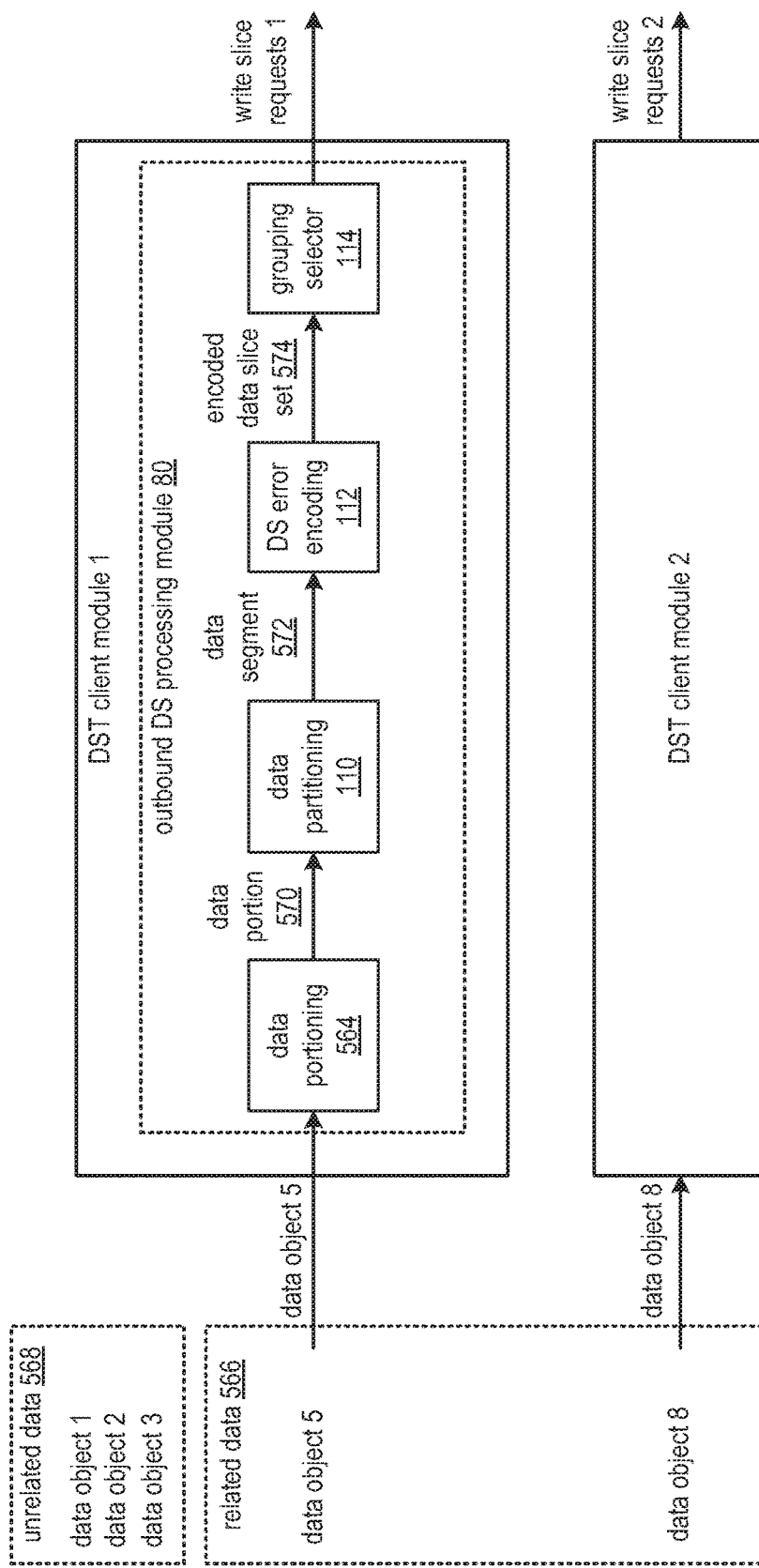
Figure 46D:
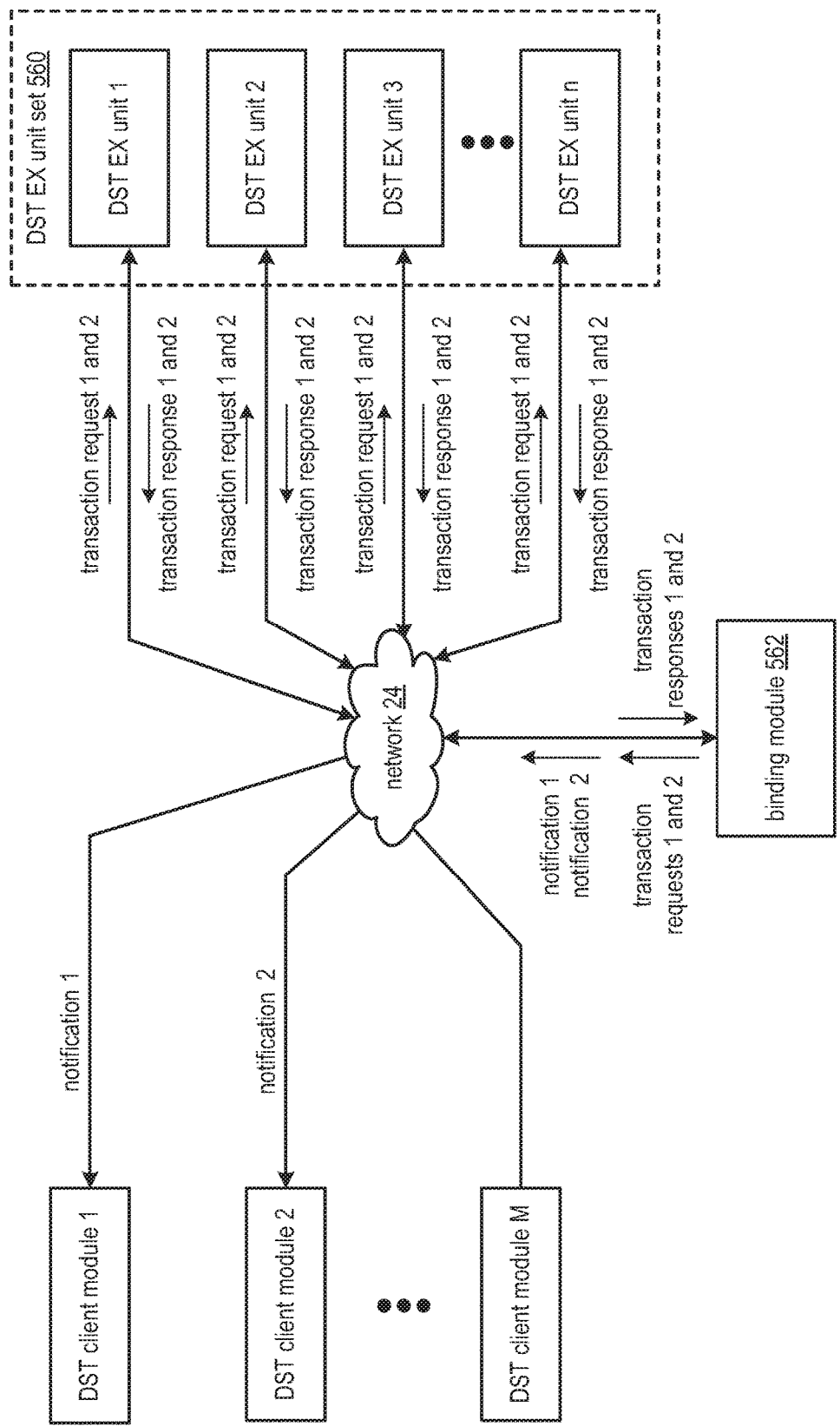
Figure 46E:
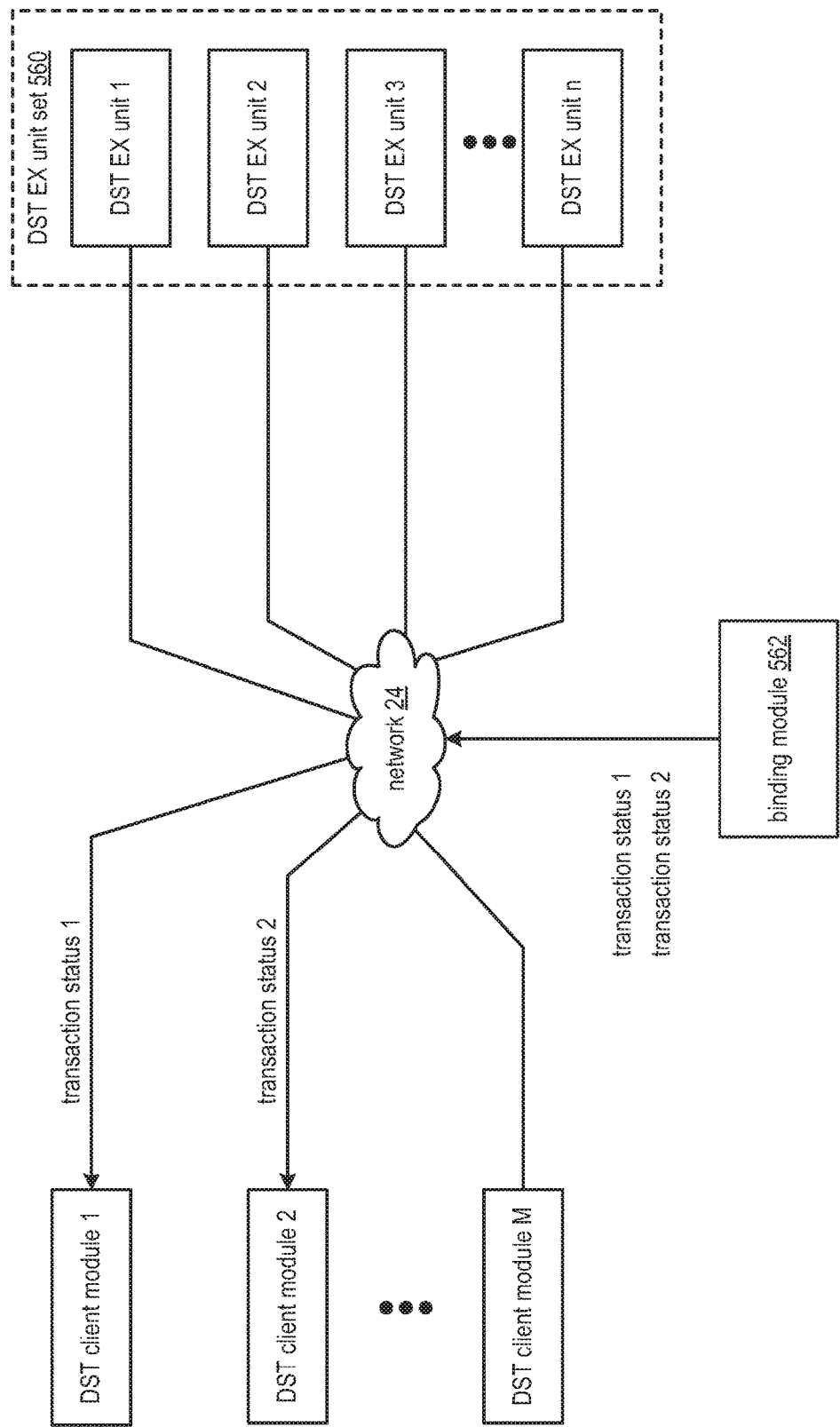
Figure 46F:
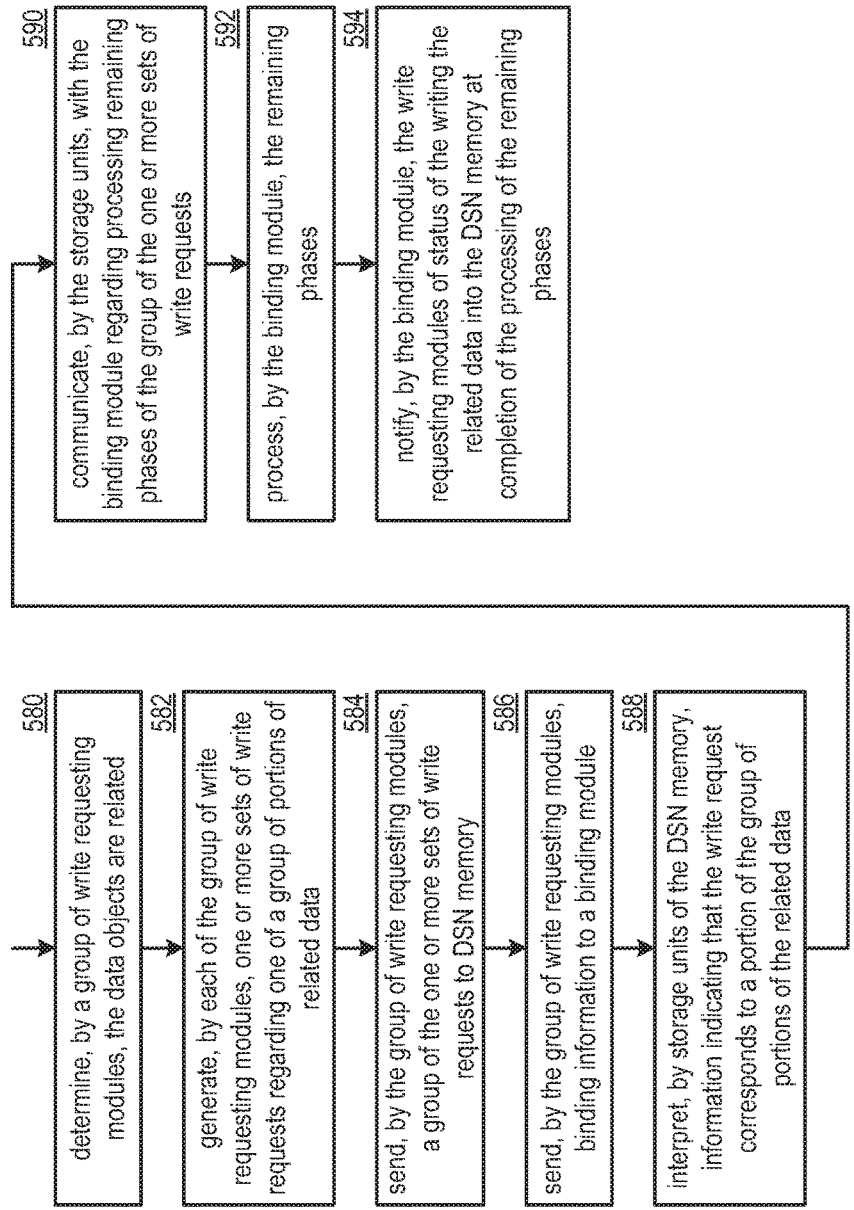
Figure 47:
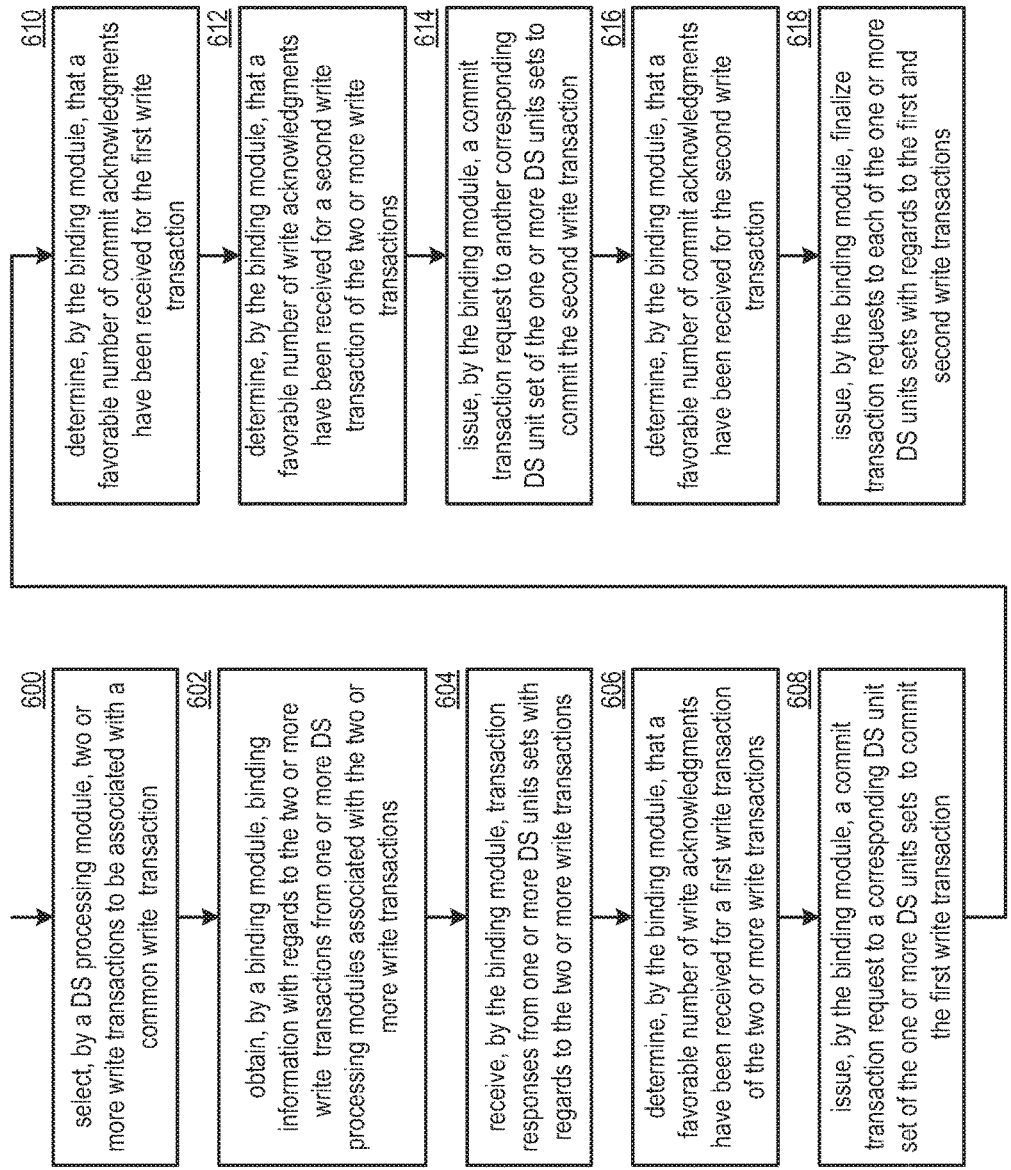

FIGS. 46A, 46C, 46D, and 46E are schematic block diagrams of another embodiment of a dispersed storage network (DSN) system illustrating an example of storing related data in accordance with the present invention;

FIG. 46B is a schematic block diagram of another embodiment of a distributed storage and task (DST) client module further illustrating the example of the storing the related data in accordance with the present invention;

FIG. 46F is a flowchart illustrating an example of storing related data in accordance with the present invention; and FIG. 47 is a flowchart illustrating an example of synchronously storing two or more data objects in a dispersed storage network (DSN) in accordance with the present invention.

DETAILED DESCRIPTION OF THE INVENTION

Figure 1:
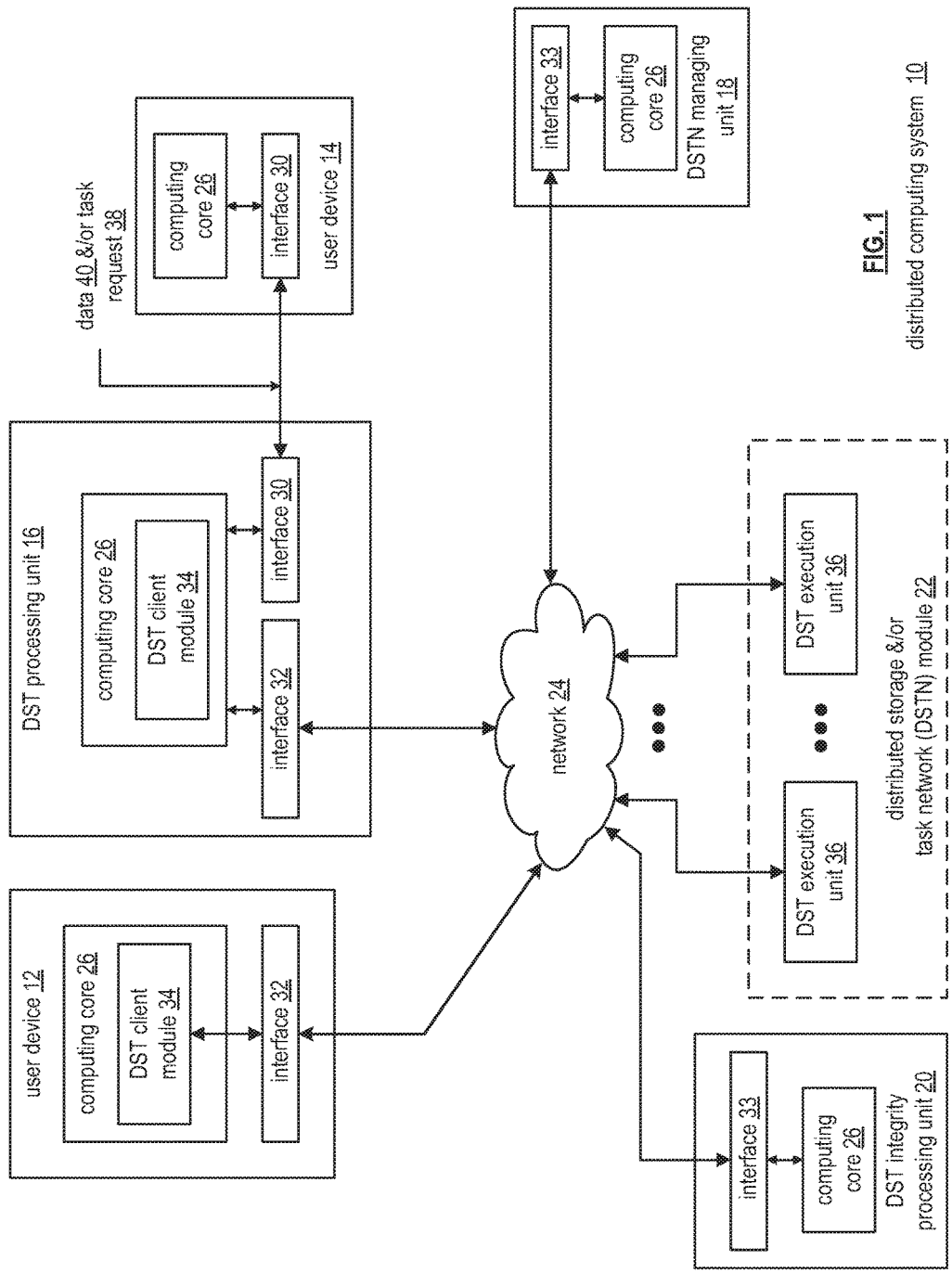
FIG. 1 is a schematic block diagram of an embodiment of a distributed computing system in accordance with the present invention.

FIG. 1 is a schematic block diagram of an embodiment of a distributed computing system 10 that includes a user device 12 and/or a user device 14, a distributed storage and/or task (DST) processing unit 16, a distributed storage and/or task network (DSTN) managing unit 18, a DST integrity processing unit 20, and a distributed storage and/or task network (DSTN) module 22. The components of the distributed computing system 10 are coupled via a network 24, which may include one or more wireless and/or wire lined communication systems; one or more private intranet systems and/or public internet systems; and/or one or more local area networks (LAN) and/or wide area networks (WAN).

The DSTN module 22 includes a plurality of distributed storage and/or task (DST) execution units 36 that may be located at geographically different sites (e.g., one in Chicago, one in Milwaukee, etc.). Each of the DST execution units is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc.

Each of the user devices 12-14, the DST processing unit 16, the DSTN managing unit 18, and the DST integrity processing unit 20 include a computing core 26 and may be a portable computing device and/or a fixed computing device. A portable computing device may be a social networking device, a gaming device, a cell phone, a smart phone, a personal digital assistant, a digital music player, a digital video player, a laptop computer, a handheld computer, a tablet, a video game controller, and/or any other portable device that includes a computing core. A fixed computing device may be a personal computer (PC), a computer server, a cable set-top box, a satellite receiver, a television set, a printer, a fax machine, home entertainment equipment, a video game console, and/or any type of home or office computing equipment. User device 12 and DST processing unit 16 are configured to include a DST client module 34.

With respect to interfaces, each interface 30, 32, and 33 includes software and/or hardware to support one or more communication links via the network 24 indirectly and/or directly. For example, interface 30 supports a communication link (e.g., wired, wireless, direct, via a LAN, via the network 24, etc.) between user device 14 and the DST processing unit 16. As another example, interface 32 supports communication links (e.g., a wired connection, a wireless connection, a LAN connection, and/or any other type of connection to/from the network 24) between user device 12 and the DSTN module 22 and between the DST processing unit 16 and the DSTN module 22. As yet another example, interface 33 supports a communication link for each of the DSTN managing unit 18 and DST integrity processing unit 20 to the network 24.

The distributed computing system 10 is operable to support dispersed storage (DS) error encoded data storage and retrieval, to support distributed task processing on received data, and/or to support distributed task processing on stored data. In general, and with respect to DS error encoded data storage and retrieval, the distributed computing system 10 supports three primary operations: storage management, data storage and retrieval (an example of which will be discussed with reference to FIGS. 20-26), and data storage integrity verification. In accordance with these three primary functions, data can be encoded, distributedly stored in physically different locations, and subsequently retrieved in a reliable and secure manner. Such a system is tolerant of a significant number of failures (e.g., up to a failure level, which may be greater than or equal to a pillar width minus a decode threshold minus one) that may result from individual storage device failures and/or network equipment failures without loss of data and without the need for a redundant or backup copy. Further, the system allows the data to be stored for an indefinite period of time without data loss and does so in a secure manner (e.g., the system is very resistant to attempts at hacking the data).

The second primary function (i.e., distributed data storage and retrieval) begins and ends with a user device 12-14. For instance, if a second type of user device 14 has data 40 to store in the DSTN module 22, it sends the data 40 to the DST processing unit 16 via its interface 30. The interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data 40.

To support storage management, the DSTN managing unit 18 performs DS management services. One such DS management service includes the DSTN managing unit 18 establishing distributed data storage parameters (e.g., vault creation, distributed storage parameters, security parameters, billing information, user profile information, etc.) for a user device 12-14 individually or as part of a group of user devices. For example, the DSTN managing unit 18 coordinates creation of a vault (e.g., a virtual memory block) within memory of the DSTN module 22 for a user device, a group of devices, or for public access and establishes per vault dispersed storage (DS) error encoding parameters for a vault. The DSTN managing unit 18 may facilitate storage of DS error encoding parameters for each vault of a plurality of vaults by updating registry information for the distributed computing system 10. The facilitating includes storing updated registry information in one or more of the DSTN module 22, the user device 12, the DST processing unit 16, and the DST integrity processing unit 20.

The DS error encoding parameters (e.g., or dispersed storage error coding parameters) include data segmenting information (e.g., how many segments data (e.g., a file, a group of files, a data block, etc.) is divided into), segment security information (e.g., per segment encryption, compression, integrity checksum, etc.), error coding information (e.g., pillar width, decode threshold, read threshold, write threshold, etc.), slicing information (e.g., the number of encoded data slices that will be created for each data segment); and slice security information (e.g., per encoded data slice encryption, compression, integrity checksum, etc.).

The DSTN managing unit 18 creates and stores user profile information (e.g., an access control list (ACL)) in local memory and/or within memory of the DSTN module 22. The user profile information includes authentication information, permissions, and/or the security parameters. The security parameters may include encryption/decryption scheme, one or more encryption keys, key generation scheme, and/or data encoding/decoding scheme.

The DSTN managing unit 18 creates billing information for a particular user, a user group, a vault access, public vault access, etc. For instance, the DSTN managing unit 18 tracks the number of times a user accesses a private vault and/or public vaults, which can be used to generate a per-access billing information. In another instance, the DSTN managing unit 18 tracks the amount of data stored and/or retrieved by a user device and/or a user group, which can be used to generate a per-data-amount billing information.

Another DS management service includes the DSTN managing unit 18 performing network operations, network administration, and/or network maintenance. Network operations include authenticating user data allocation requests (e.g., read and/or write requests), managing creation of vaults, establishing authentication credentials for user devices, adding/deleting components (e.g., user devices, DST execution units, and/or DST processing units) from the distributed computing system 10, and/or establishing authentication credentials for DST execution units 36. Network administration includes monitoring devices and/or units for failures, maintaining vault information, determining device and/or unit activation status, determining device and/or unit loading, and/or determining any other system level operation that affects the performance level of the system 10. Network maintenance includes facilitating replacing, upgrading, repairing, and/or expanding a device and/or unit of the system 10.

To support data storage integrity verification within the distributed computing system 10, the DST integrity processing unit 20 performs rebuilding of 'bad' or missing encoded data slices. At a high level, the DST integrity processing unit 20 performs rebuilding by periodically attempting to retrieve/list encoded data slices, and/or slice names of the encoded data slices, from the DSTN module 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in memory of the DSTN module 22. Note that the DST integrity processing unit 20 may be a separate unit as shown, it may be included in the DSTN module 22, it may be included in the DST processing unit 16, and/or distributed among the DST execution units 36.

To support distributed task processing on received data, the distributed computing system 10 has two primary operations: DST (distributed storage and/or task processing) management and DST execution on received data (an example of which will be discussed with reference to FIGS. 3-19). With respect to the storage portion of the DST management, the DSTN managing unit 18 functions as previously described. With respect to the tasking processing of the DST management, the DSTN managing unit 18 performs distributed task processing (DTP) management services. One such DTP management service includes the DSTN managing unit 18 establishing DTP parameters (e.g., user-vault affiliation information, billing information, user-task information, etc.) for a user device 12-14 individually or as part of a group of user devices.

Another DTP management service includes the DSTN managing unit 18 performing DTP network operations, network administration (which is essentially the same as described above), and/or network maintenance (which is essentially the same as described above). Network operations include, but are not limited to, authenticating user task processing requests (e.g., valid request, valid user, etc.), authenticating results and/or partial results, establishing DTP authentication credentials for user devices, adding/deleting components (e.g., user devices, DST execution units, and/or DST processing units) from the distributed computing system, and/or establishing DTP authentication credentials for DST execution units.

To support distributed task processing on stored data, the distributed computing system 10 has two primary operations: DST (distributed storage and/or task) management and DST execution on stored data. With respect to the DST execution on stored data, if the second type of user device 14 has a task request 38 for execution by the DSTN module 22, it sends the task request 38 to the DST processing unit 16 via its interface 30. An example of DST execution on stored data will be discussed in greater detail with reference to FIGS. 27-39. With respect to the DST management, it is substantially similar to the DST management to support distributed task processing on received data.

Figure 2:
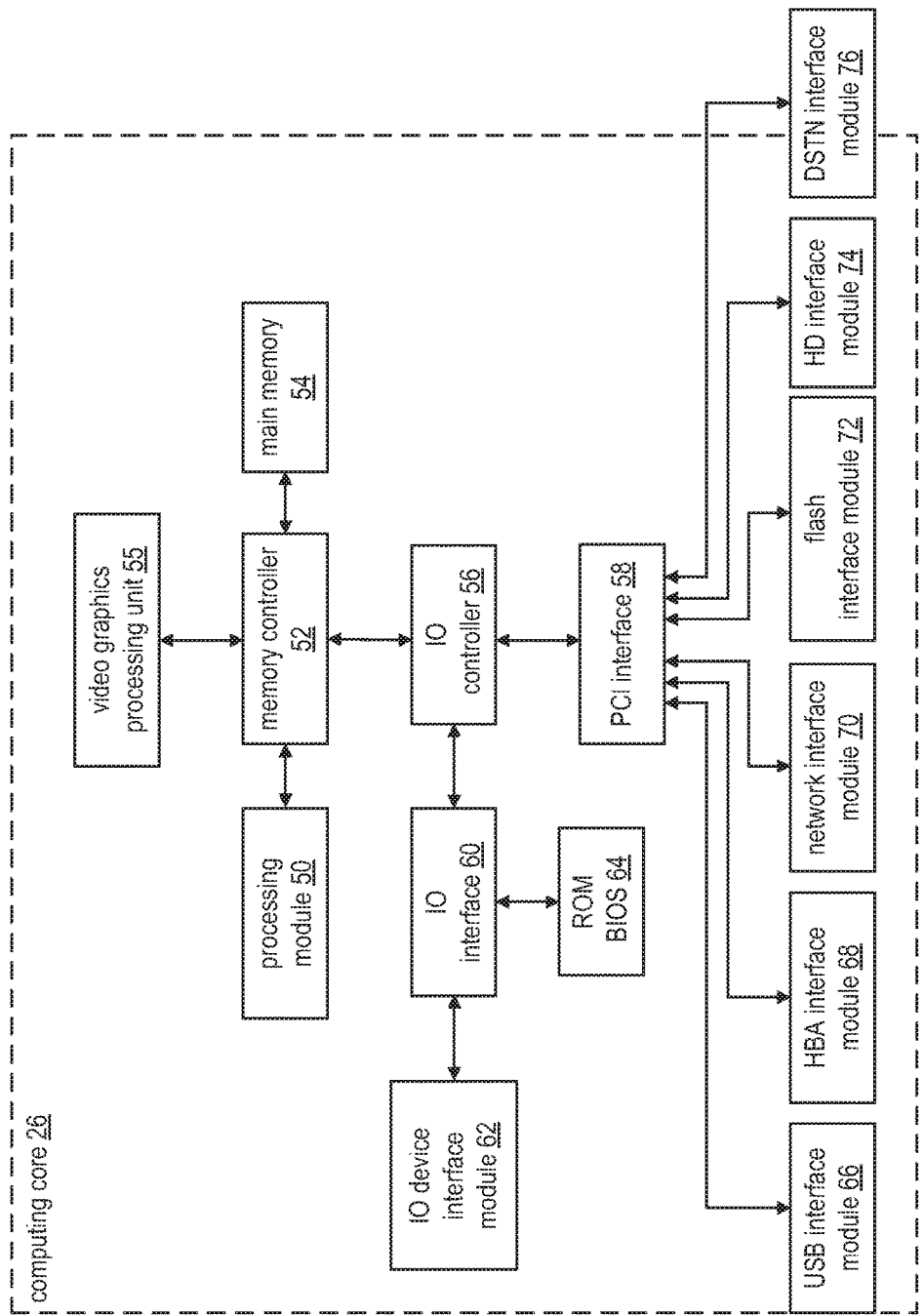
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (TO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSTN interface module 76.

The DSTN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSTN interface module 76 and/or the network interface module 70 may function as the interface 30 of the user device 14 of FIG. 1. Further note that the IO device interface module 62 and/or the memory interface modules may be collectively or individually referred to as IO ports.

Figure 3:
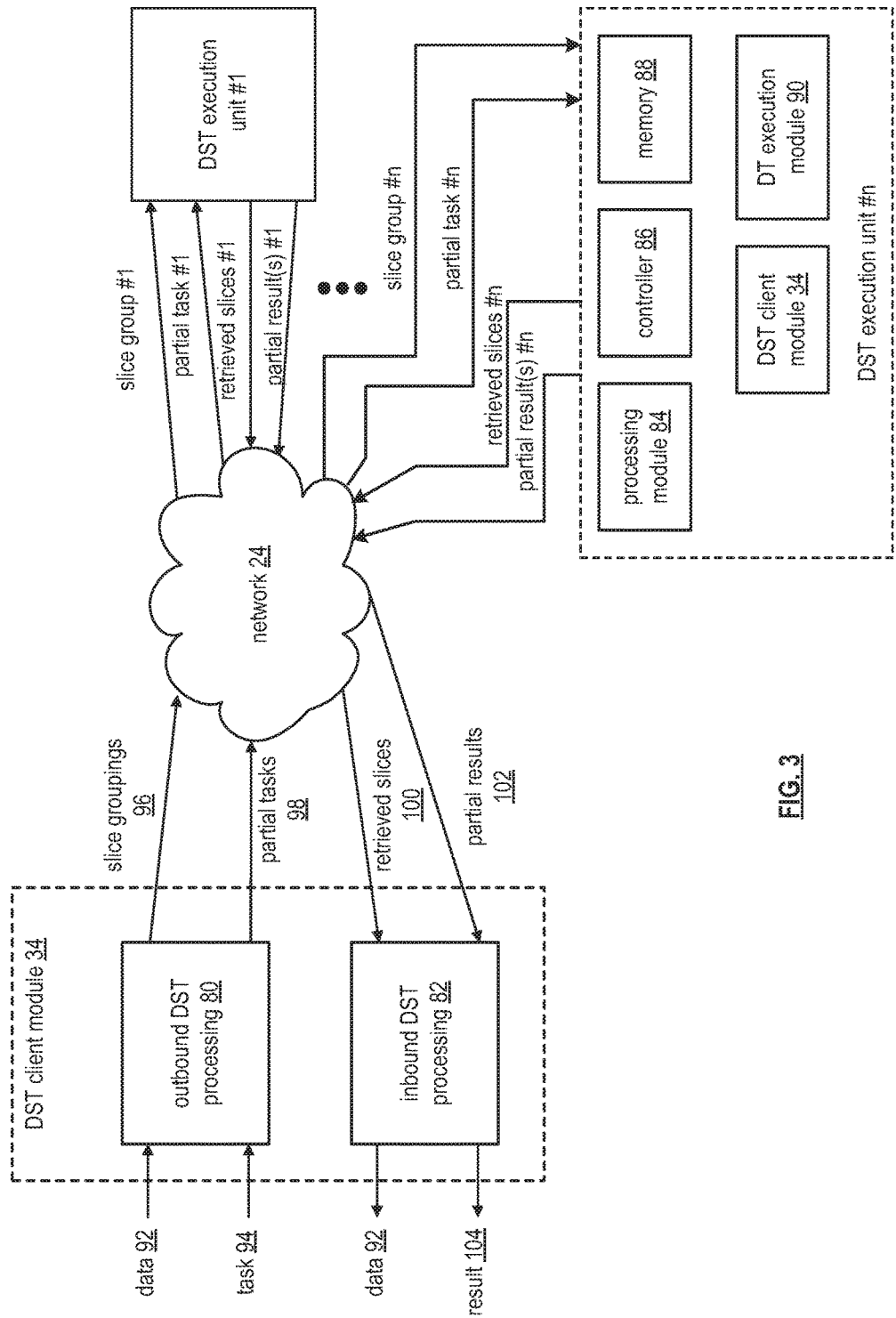
FIG. 3 is a diagram of an example of a distributed storage and task processing in accordance with the present invention.

FIG. 3 is a diagram of an example of the distributed computing system performing a distributed storage and task processing operation. The distributed computing system includes a DST (distributed storage and/or task) client module 34 (which may be in user device 14 and/or in DST processing unit 16 of FIG. 1), a network 24, a plurality of DST execution units 1-n that includes two or more DST execution units 36 of FIG. 1 (which form at least a portion of DSTN module 22 of FIG. 1), a DST managing module (not shown), and a DST integrity verification module (not shown). The DST client module 34 includes an outbound DST processing section 80 and an inbound DST processing section 82. Each of the DST execution units 1-n includes a controller 86, a processing module 84, memory 88, a DT (distributed task) execution module 90, and a DST client module 34.

In an example of operation, the DST client module 34 receives data 92 and one or more tasks 94 to be performed upon the data 92. The data 92 may be of any size and of any content, where, due to the size (e.g., greater than a few Terabytes), the content (e.g., secure data, etc.), and/or task(s) (e.g., MIPS intensive), distributed processing of the task(s) on the data is desired. For example, the data 92 may be one or more digital books, a copy of a company's emails, a large-scale Internet search, a video security file, one or more entertainment video files (e.g., television programs, movies, etc.), data files, and/or any other large amount of data (e.g., greater than a few Terabytes).

Within the DST client module 34, the outbound DST processing section 80 receives the data 92 and the task(s) 94. The outbound DST processing section 80 processes the data 92 to produce slice groupings 96. As an example of such processing, the outbound DST processing section 80 partitions the data 92 into a plurality of data partitions. For each data partition, the outbound DST processing section 80 dispersed storage (DS) error encodes the data partition to produce encoded data slices and groups the encoded data slices into a slice grouping 96. In addition, the outbound DST processing section 80 partitions the task 94 into partial tasks 98, where the number of partial tasks 98 may correspond to the number of slice groupings 96.

The outbound DST processing section 80 then sends, via the network 24, the slice groupings 96 and the partial tasks 98 to the DST execution units 1-n of the DSTN module 22 of FIG. 1. For example, the outbound DST processing section 80 sends slice group 1 and partial task 1 to DST execution unit 1. As another example, the outbound DST processing section 80 sends slice group #n and partial task #n to DST execution unit #n.

Each DST execution unit performs its partial task 98 upon its slice group 96 to produce partial results 102. For example, DST execution unit #1 performs partial task #1 on slice group #1 to produce a partial result #1, for results. As a more specific example, slice group #1 corresponds to a data partition of a series of digital books and the partial task #1 corresponds to searching for specific phrases, recording where the phrase is found, and establishing a phrase count. In this more specific example, the partial result #1 includes information as to where the phrase was found and includes the phrase count.

Upon completion of generating their respective partial results 102, the DST execution units send, via the network 24, their partial results 102 to the inbound DST processing section 82 of the DST client module 34. The inbound DST processing section 82 processes the received partial results 102 to produce a result 104. Continuing with the specific example of the preceding paragraph, the inbound DST processing section 82 combines the phrase count from each of the DST execution units 36 to produce a total phrase count. In addition, the inbound DST processing section 82 combines the 'where the phrase was found' information from each of the DST execution units 36 within their respective data partitions to produce 'where the phrase was found' information for the series of digital books.

In another example of operation, the DST client module 34 requests retrieval of stored data within the memory of the DST execution units 36 (e.g., memory of the DSTN module). In this example, the task 94 is retrieve data stored in the memory of the DSTN module. Accordingly, the outbound DST processing section 80 converts the task 94 into a plurality of partial tasks 98 and sends the partial tasks 98 to the respective DST execution units 1-*n*.

In response to the partial task 98 of retrieving stored data, a DST execution unit 36 identifies the corresponding encoded data slices 100 and retrieves them. For example, DST execution unit #1 receives partial task #1 and retrieves, in response thereto, retrieved slices #1. The DST execution units 36 send their respective retrieved slices 100 to the inbound DST processing section 82 via the network 24.

The inbound DST processing section 82 converts the retrieved slices 100 into data 92. For example, the inbound DST processing section 82 de-groups the retrieved slices 100 to produce encoded slices per data partition. The inbound DST processing section 82 then DS error decodes the encoded slices per data partition to produce data partitions. The inbound DST processing section 82 de-partitions the data partitions to recapture the data 92.

Figure 4:
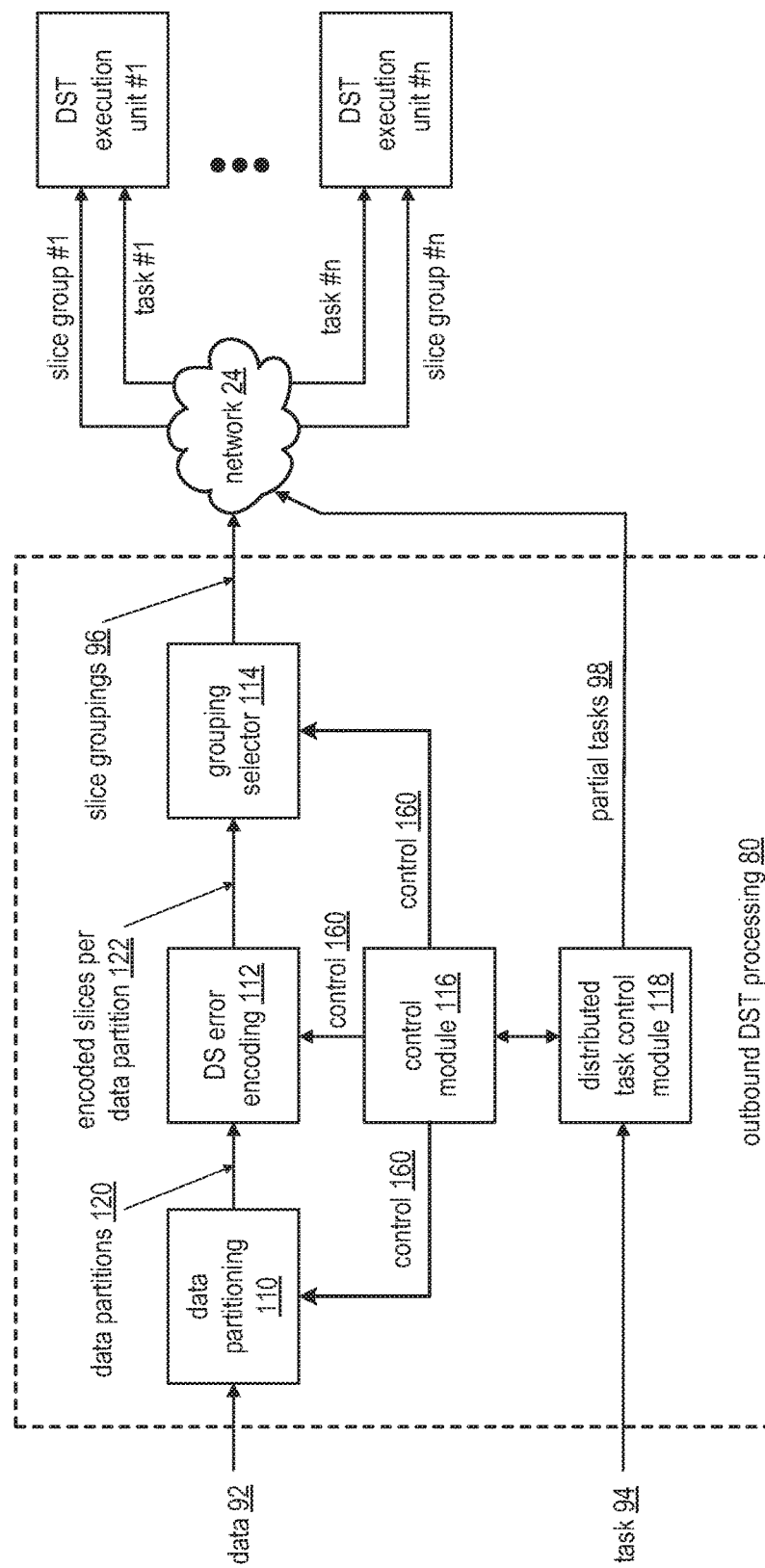
FIG. 4 is a schematic block diagram of an embodiment of an outbound distributed storage and/or task (DST) processing in accordance with the present invention.

FIG. 4 is a schematic block diagram of an embodiment of an outbound distributed storage and/or task (DST) processing section 80 of a DST client module 34 FIG. 1 coupled to a DSTN module 22 of a FIG. 1 (e.g., a plurality of n DST execution units 36) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 partitions data 92 into a plurality of data partitions 120. The number of partitions and the size of the partitions may be selected by the control module 116 via control 160 based on the data 92 (e.g., its size, its content, etc.), a corresponding task 94 to be performed (e.g., simple, complex, single step, multiple steps, etc.), DS encoding parameters (e.g., pillar width, decode threshold, write threshold, segment security parameters, slice security parameters, etc.), capabilities of the DST execution units 36 (e.g., processing resources, availability of processing recourses, etc.), and/or as may be inputted by a user, system administrator, or other operator (human or automated). For example, the data partitioning module 110 partitions the data 92 (e.g., 100 Terabytes) into 100,000 data segments, each being 1 Gigabyte in size. Alternatively, the data partitioning module 110 partitions the data 92 into a plurality of data segments, where some of data segments are of a different size, are of the same size, or a combination thereof.

The DS error encoding module 112 receives the data partitions 120 in a serial manner, a parallel manner, and/or a combination thereof. For each data partition 120, the DS error encoding module 112 DS error encodes the data partition 120 in accordance with control information 160 from the control module 116 to produce encoded data slices 122. The DS error encoding includes segmenting the data partition into data segments, segment security processing (e.g., encryption, compression, watermarking, integrity check (e.g., CRC), etc.), error encoding, slicing, and/or per slice security processing (e.g., encryption, compression, watermarking, integrity check (e.g., CRC), etc.). The control information 160 indicates which steps of the DS error encoding are active for a given data partition and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 122 of a data partition into a set of slice groupings 96. The number of slice groupings corresponds to the number of DST execution units 36 identified for a particular task 94. For example, if five DST execution units 36 are identified for the particular task 94, the grouping selector module groups the encoded slices 122 of a data partition into five slice groupings 96. The grouping selector module 114 outputs the slice groupings 96 to the corresponding DST execution units 36 via the network 24.

The distributed task control module 118 receives the task 94 and converts the task 94 into a set of partial tasks 98. For example, the distributed task control module 118 receives a task to find where in the data (e.g., a series of books) a phrase occurs and a total count of the phrase usage in the data. In this example, the distributed task control module 118 replicates the task 94 for each DST execution unit 36 to produce the partial tasks 98. In another example, the distributed task control module 118 receives a task to find where in the data a first phrase occurs, where in the data a second phrase occurs, and a total count for each phrase usage in the data. In this example, the distributed task control module 118 generates a first set of partial tasks 98 for finding and counting the first phrase and a second set of partial tasks for finding and counting the second phrase. The distributed task control module 118 sends respective first and/or second partial tasks 98 to each DST execution unit 36.

Figure 5:
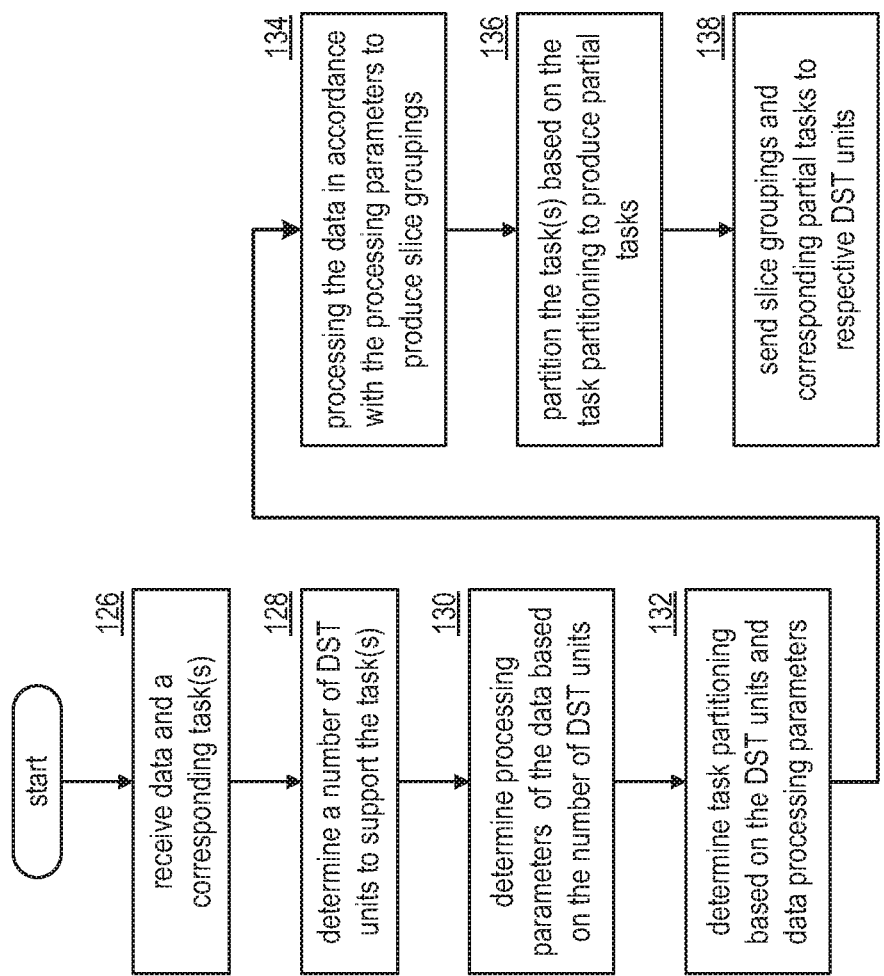
FIG. 5 is a logic diagram of an example of a method for outbound DST processing in accordance with the present invention.

FIG. 5 is a logic diagram of an example of a method for outbound distributed storage and task (DST) processing that begins at step 126 where a DST client module receives data and one or more corresponding tasks. The method continues at step 128 where the DST client module determines a number of DST units to support the task for one or more data partitions. For example, the DST client module may determine the number of DST units to support the task based on the size of the data, the requested task, the content of the data, a predetermined number (e.g., user indicated, system administrator determined, etc.), available DST units, capability of the DST units, and/or any other factor regarding distributed task processing of the data. The DST client module may select the same DST units for each data partition, may select different DST units for the data partitions, or a combination thereof.

The method continues at step 130 where the DST client module determines processing parameters of the data based on the number of DST units selected for distributed task processing. The processing parameters include data partitioning information, DS encoding parameters, and/or slice grouping information. The data partitioning information includes a number of data partitions, size of each data partition, and/or organization of the data partitions (e.g., number of data blocks in a partition, the size of the data blocks, and arrangement of the data blocks). The DS encoding parameters include segmenting information, segment security information, error encoding information (e.g., dispersed storage error encoding function parameters including one or more of pillar width, decode threshold, write threshold, read threshold, generator matrix), slicing information, and/or per slice security information. The slice grouping information includes information regarding how to arrange the encoded data slices into groups for the selected DST units. As a specific example, if the DST client module determines that five DST units are needed to support the task, then it determines that the error encoding parameters include a pillar width of five and a decode threshold of three.

The method continues at step 132 where the DST client module determines task partitioning information (e.g., how to partition the tasks) based on the selected DST units and data processing parameters. The data processing parameters include the processing parameters and DST unit capability information. The DST unit capability information includes the number of DT (distributed task) execution units, execution capabilities of each DT execution unit (e.g., MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, memory information (e.g., type, size, availability, etc.)), and/or any information germane to executing one or more tasks.

The method continues at step 134 where the DST client module processes the data in accordance with the processing parameters to produce slice groupings. The method continues at step 136 where the DST client module partitions the task based on the task partitioning information to produce a set of partial tasks. The method continues at step 138 where the DST client module sends the slice groupings and the corresponding partial tasks to respective DST units.

Figure 6:
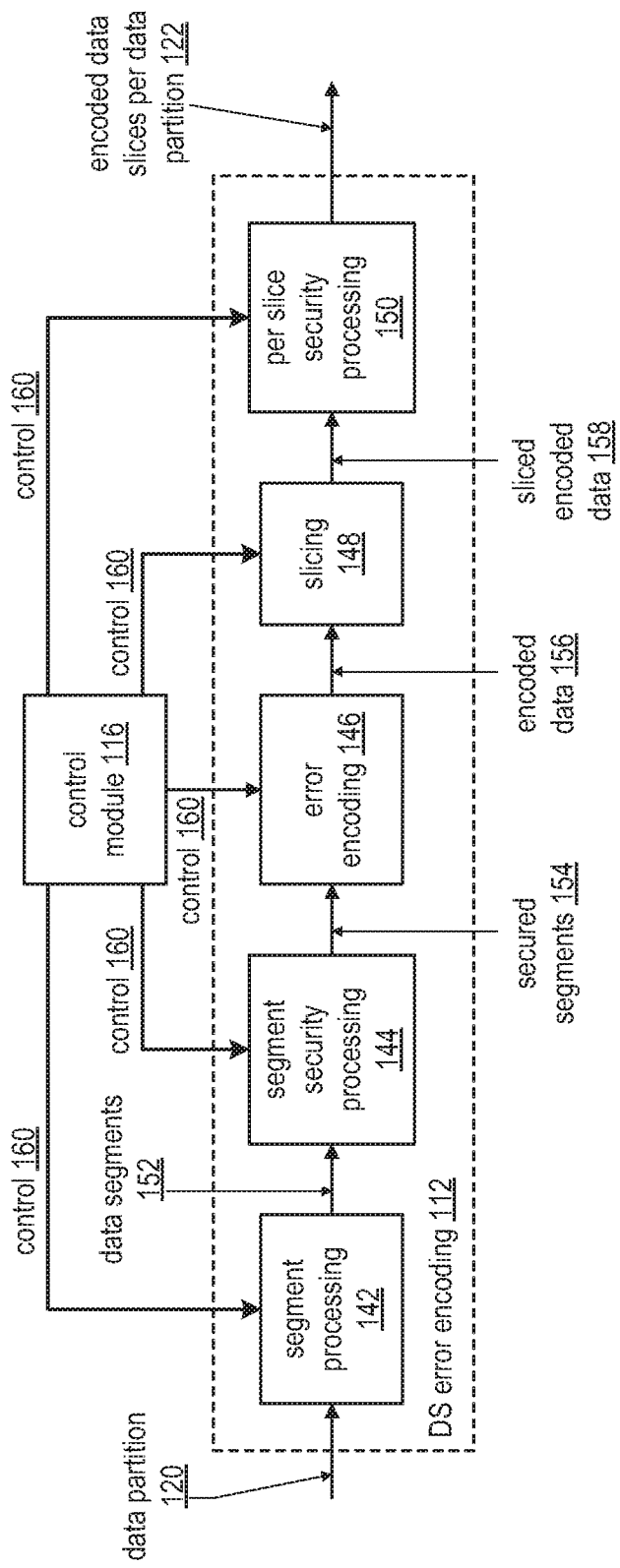
FIG. 6 is a schematic block diagram of an embodiment of a dispersed error encoding in accordance with the present invention.

FIG. 6 is a schematic block diagram of an embodiment of the dispersed storage (DS) error encoding module 112 of an outbound distributed storage and task (DST) processing section. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives a data partition 120 from a data partitioning module and receives segmenting information as the control information 160 from the control module 116. The segmenting information indicates how the segment processing module 142 is to segment the data partition 120. For example, the segmenting information indicates how many rows to segment the data based on a decode threshold of an error encoding scheme, indicates how many columns to segment the data into based on a number and size of data blocks within the data partition 120, and indicates how many columns to include in a data segment 152. The segment processing module 142 segments the data 120 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., cyclic redundancy check (CRC), etc.), and/or any other type of digital security. For example, when the segment security processing module 144 is enabled, it may compress a data segment 152, encrypt the compressed data segment, and generate a CRC value for the encrypted data segment to produce a secure data segment 154. When the segment security processing module 144 is not enabled, it passes the data segments 152 to the error encoding module 146 or is bypassed such that the data segments 152 are provided to the error encoding module 146.

The error encoding module 146 encodes the secure data segments 154 in accordance with error correction encoding parameters received as control information 160 from the control module 116. The error correction encoding parameters (e.g., also referred to as dispersed storage error coding parameters) include identifying an error correction encoding scheme (e.g., forward error correction algorithm, a Reed-Solomon based algorithm, an online coding algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment 154 to produce an encoded data segment 156.

The slicing module 148 slices the encoded data segment 156 in accordance with the pillar width of the error correction encoding parameters received as control information 160. For example, if the pillar width is five, the slicing module 148 slices an encoded data segment 156 into a set of five encoded data slices. As such, for a plurality of encoded data segments 156 for a given data partition, the slicing module outputs a plurality of sets of encoded data slices 158.

The per slice security processing module 150, when enabled by the control module 116, secures each encoded data slice 158 based on slice security information received as control information 160 from the control module 116. The slice security information includes data compression, encryption, watermarking, integrity check (e.g., CRC, etc.), and/or any other type of digital security. For example, when the per slice security processing module 150 is enabled, it compresses an encoded data slice 158, encrypts the compressed encoded data slice, and generates a CRC value for the encrypted encoded data slice to produce a secure encoded data slice 122. When the per slice security processing module 150 is not enabled, it passes the encoded data slices 158 or is bypassed such that the encoded data slices 158 are the output of the DS error encoding module 112. Note that the control module 116 may be omitted and each module stores its own parameters.

Figure 7:
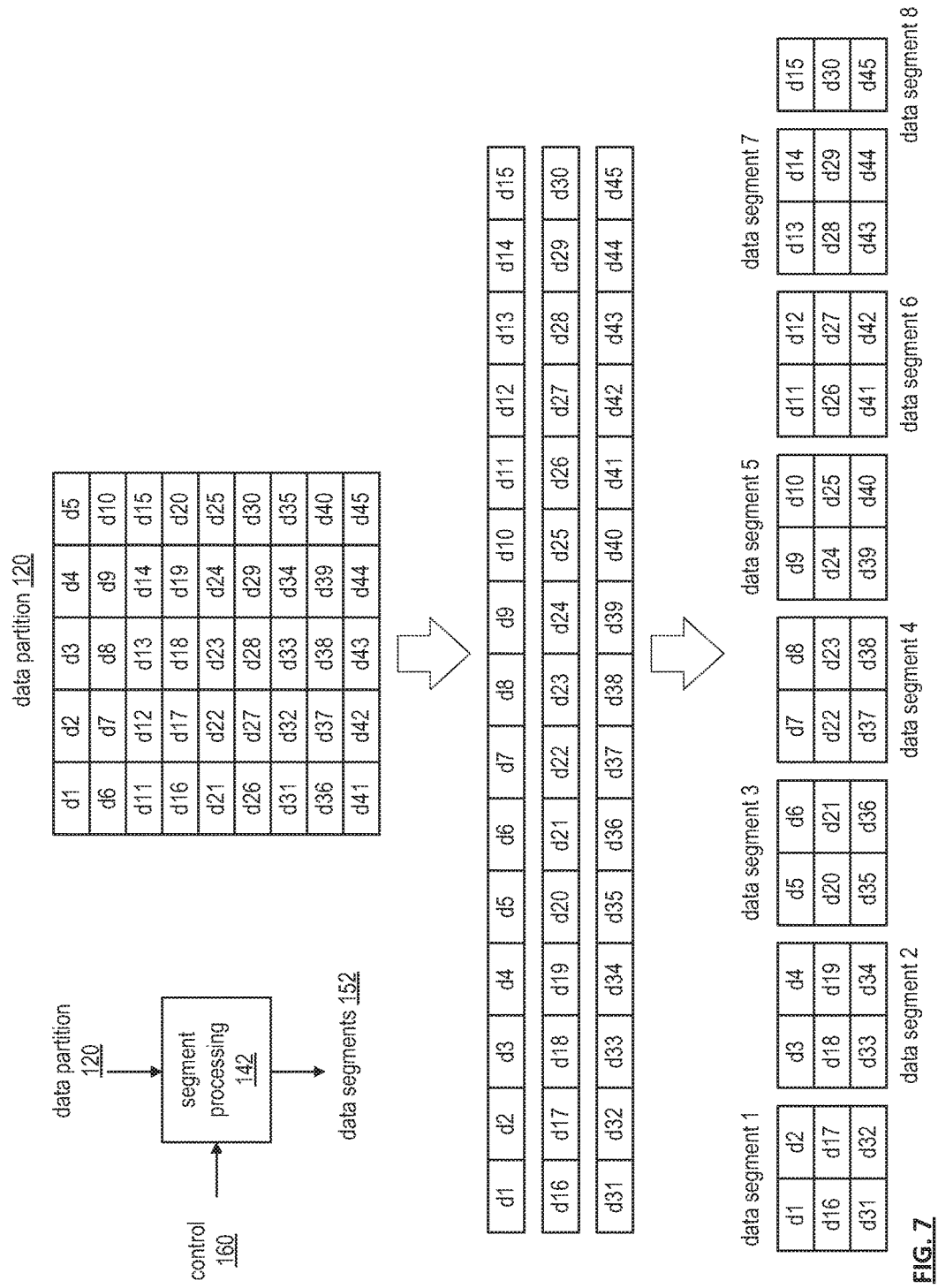
FIG. 7 is a diagram of an example of a segment processing of the dispersed error encoding in accordance with the present invention.

FIG. 7 is a diagram of an example of a segment processing of a dispersed storage (DS) error encoding module. In this example, a segment processing module 142 receives a data partition 120 that includes 45 data blocks (e.g., d1-d45), receives segmenting information (i.e., control information 160) from a control module, and segments the data partition 120 in accordance with the control information 160 to produce data segments 152. Each data block may be of the same size as other data blocks or of a different size. In addition, the size of each data block may be a few bytes to megabytes of data. As previously mentioned, the segmenting information indicates how many rows to segment the data partition into, indicates how many columns to segment the data partition into, and indicates how many columns to include in a data segment.

In this example, the decode threshold of the error encoding scheme is three; as such the number of rows to divide the data partition into is three. The number of columns for each row is set to 15, which is based on the number and size of data blocks. The data blocks of the data partition are arranged in rows and columns in a sequential order (i.e., the first row includes the first 15 data blocks; the second row includes the second 15 data blocks; and the third row includes the last 15 data blocks).

With the data blocks arranged into the desired sequential order, they are divided into data segments based on the segmenting information. In this example, the data partition is divided into 8 data segments; the first 7 include 2 columns of three rows and the last includes 1 column of three rows. Note that the first row of the 8 data segments is in sequential order of the first 15 data blocks; the second row of the 8 data segments in sequential order of the second 15 data blocks; and the third row of the 8 data segments in sequential order of the last 15 data blocks. Note that the number of data blocks, the grouping of the data blocks into segments, and size of the data blocks may vary to accommodate the desired distributed task processing function.

Figure 8:
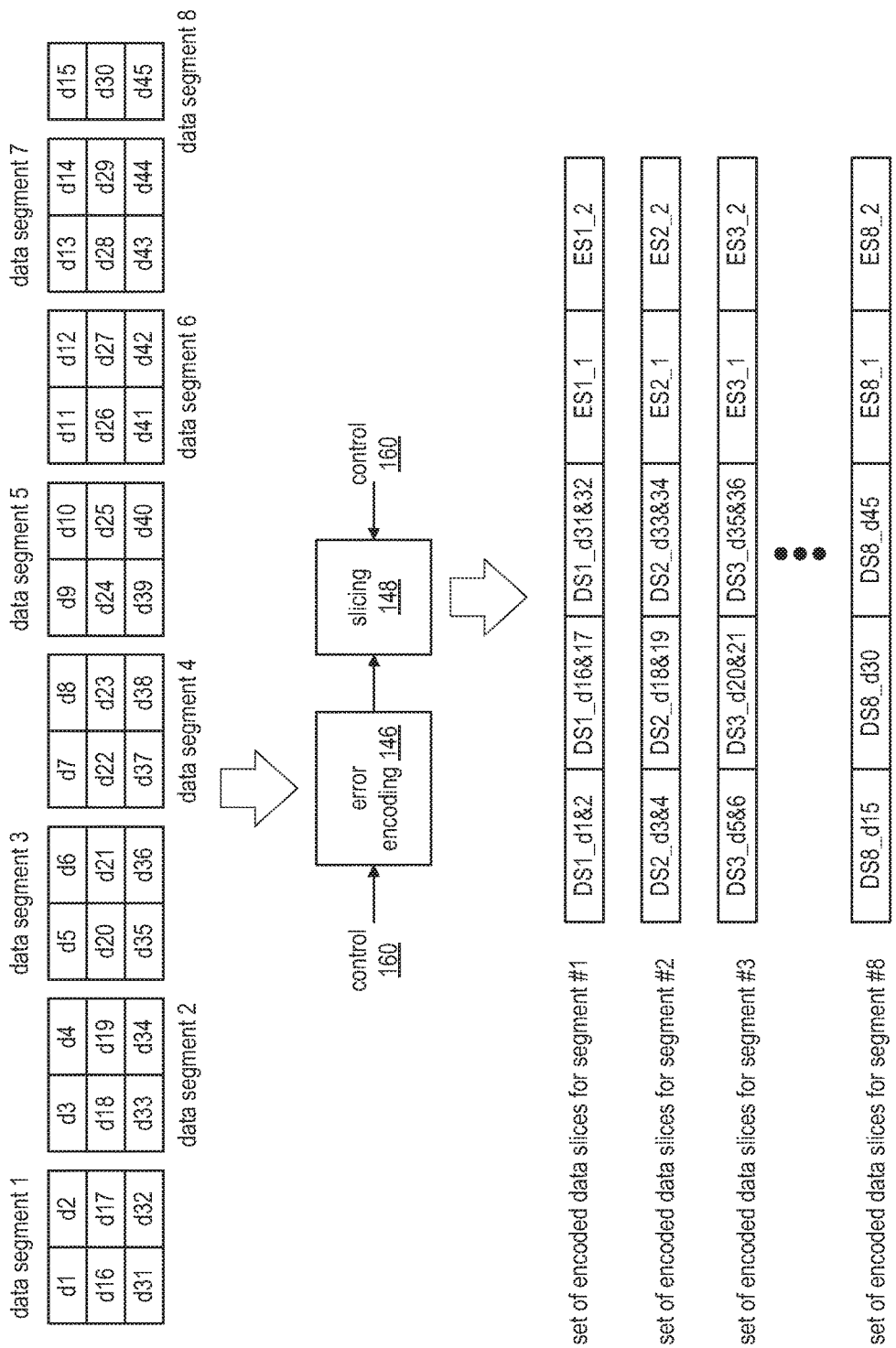
FIG. 8 is a diagram of an example of error encoding and slicing processing of the dispersed error encoding in accordance with the present invention.

FIG. 8 is a diagram of an example of error encoding and slicing processing of the dispersed error encoding processing the data segments of FIG. 7. In this example, data segment 1 includes 3 rows with each row being treated as one word for encoding. As such, data segment 1 includes three words for encoding: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

In operation, an error encoding module 146 and a slicing module 148 convert each data segment into a set of encoded data slices in accordance with error correction encoding parameters as control information 160. More specifically, when the error correction encoding parameters indicate a unity matrix Reed-Solomon based encoding algorithm, 5 pillars, and decode threshold of 3, the first three encoded data slices of the set of encoded data slices for a data segment are substantially similar to the corresponding word of the data segment. For instance, when the unity matrix Reed-Solomon based encoding algorithm is applied to data segment 1, the content of the first encoded data slice (DS1_d1&2) of the first set of encoded data slices (e.g., corresponding to data segment 1) is substantially similar to content of the first word (e.g., d1 & d2); the content of the second encoded data slice (DS1_d16&17) of the first set of encoded data slices is substantially similar to content of the second word (e.g., d16 & d17); and the content of the third encoded data slice (DS1_d31&32) of the first set of encoded data slices is substantially similar to content of the third word (e.g., d31 & d32).

The content of the fourth and fifth encoded data slices (e.g., ES1_1 and ES1_2) of the first set of encoded data slices include error correction data based on the first-third words of the first data segment. With such an encoding and slicing scheme, retrieving any three of the five encoded data slices allows the data segment to be accurately reconstructed.

The encoding and slicing of data segments 2-7 yield sets of encoded data slices similar to the set of encoded data slices of data segment 1. For instance, the content of the first encoded data slice (DS2_d3&4) of the second set of encoded data slices (e.g., corresponding to data segment 2) is substantially similar to content of the first word (e.g., d3 & d4); the content of the second encoded data slice (DS2_d18&19) of the second set of encoded data slices is substantially similar to content of the second word (e.g., d18 & d19); and the content of the third encoded data slice (DS2_d33&34) of the second set of encoded data slices is substantially similar to content of the third word (e.g., d33 & d34). The content of the fourth and fifth encoded data slices (e.g., ES1_1 and ES1_2) of the second set of encoded data slices includes error correction data based on the first-third words of the second data segment.

Figure 9:
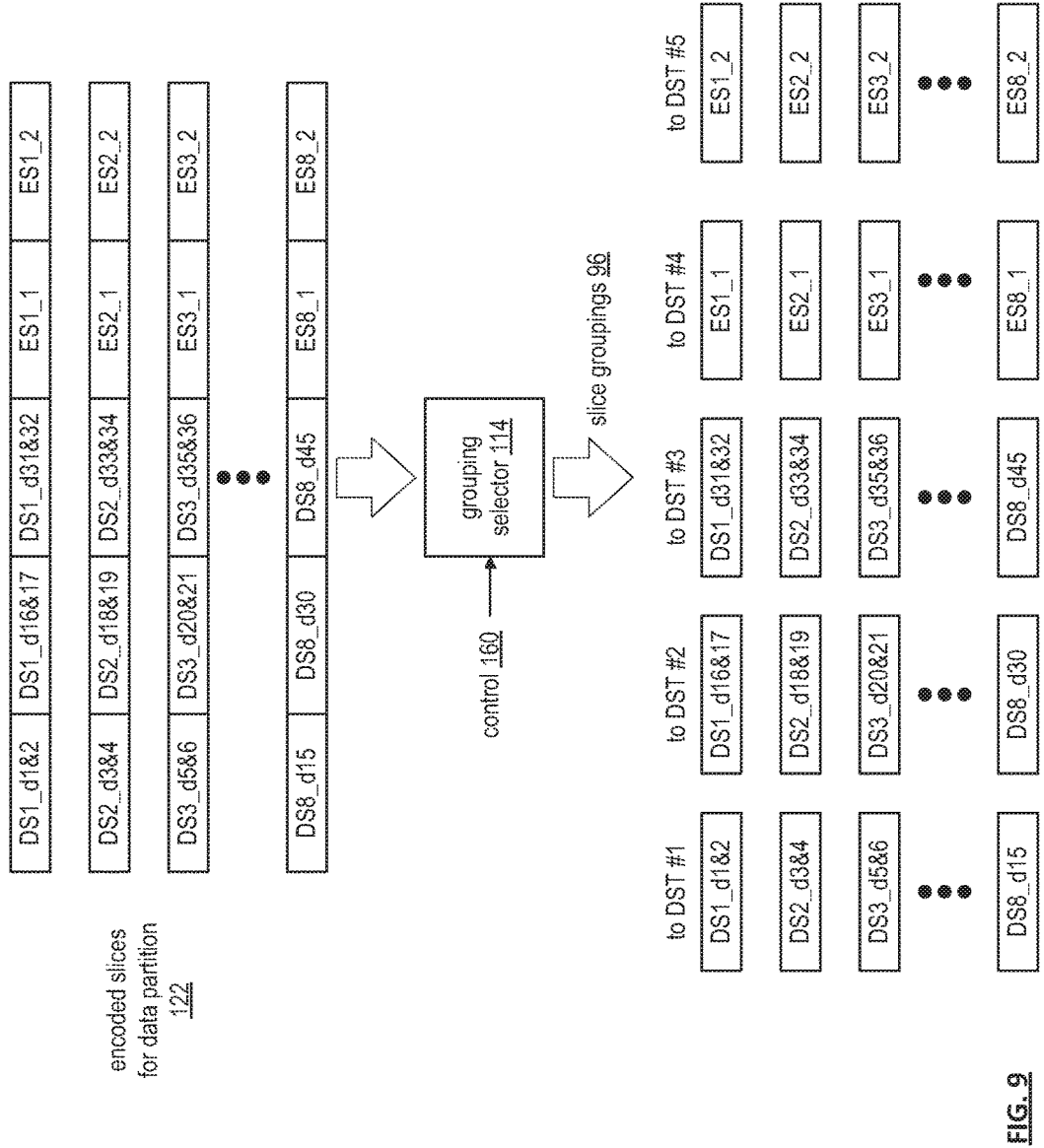
FIG. 9 is a diagram of an example of grouping selection processing of the outbound DST processing in accordance with the present invention.

FIG. 9 is a diagram of an example of grouping selection processing of an outbound distributed storage and task (DST) processing in accordance with group selection information as control information 160 from a control module. Encoded slices for data partition 122 are grouped in accordance with the control information 160 to produce slice groupings 96. In this example, a grouping selector module 114 organizes the encoded data slices into five slice groupings (e.g., one for each DST execution unit of a distributed storage and task network (DSTN) module). As a specific example, the grouping selector module 114 creates a first slice grouping for a DST execution unit #1, which includes first encoded slices of each of the sets of encoded slices. As such, the first DST execution unit receives encoded data slices corresponding to data blocks 1-15 (e.g., encoded data slices of contiguous data).

The grouping selector module 114 also creates a second slice grouping for a DST execution unit #2, which includes second encoded slices of each of the sets of encoded slices. As such, the second DST execution unit receives encoded data slices corresponding to data blocks 16-30. The grouping selector module 114 further creates a third slice grouping for DST execution unit #3, which includes third encoded slices of each of the sets of encoded slices. As such, the third DST execution unit receives encoded data slices corresponding to data blocks 31-45.

The grouping selector module 114 creates a fourth slice grouping for DST execution unit #4, which includes fourth encoded slices of each of the sets of encoded slices. As such, the fourth DST execution unit receives encoded data slices corresponding to first error encoding information (e.g., encoded data slices of error coding (EC) data). The grouping selector module 114 further creates a fifth slice grouping for DST execution unit #5, which includes fifth encoded slices of each of the sets of encoded slices. As such, the fifth DST execution unit receives encoded data slices corresponding to second error encoding information.

Figure 10:
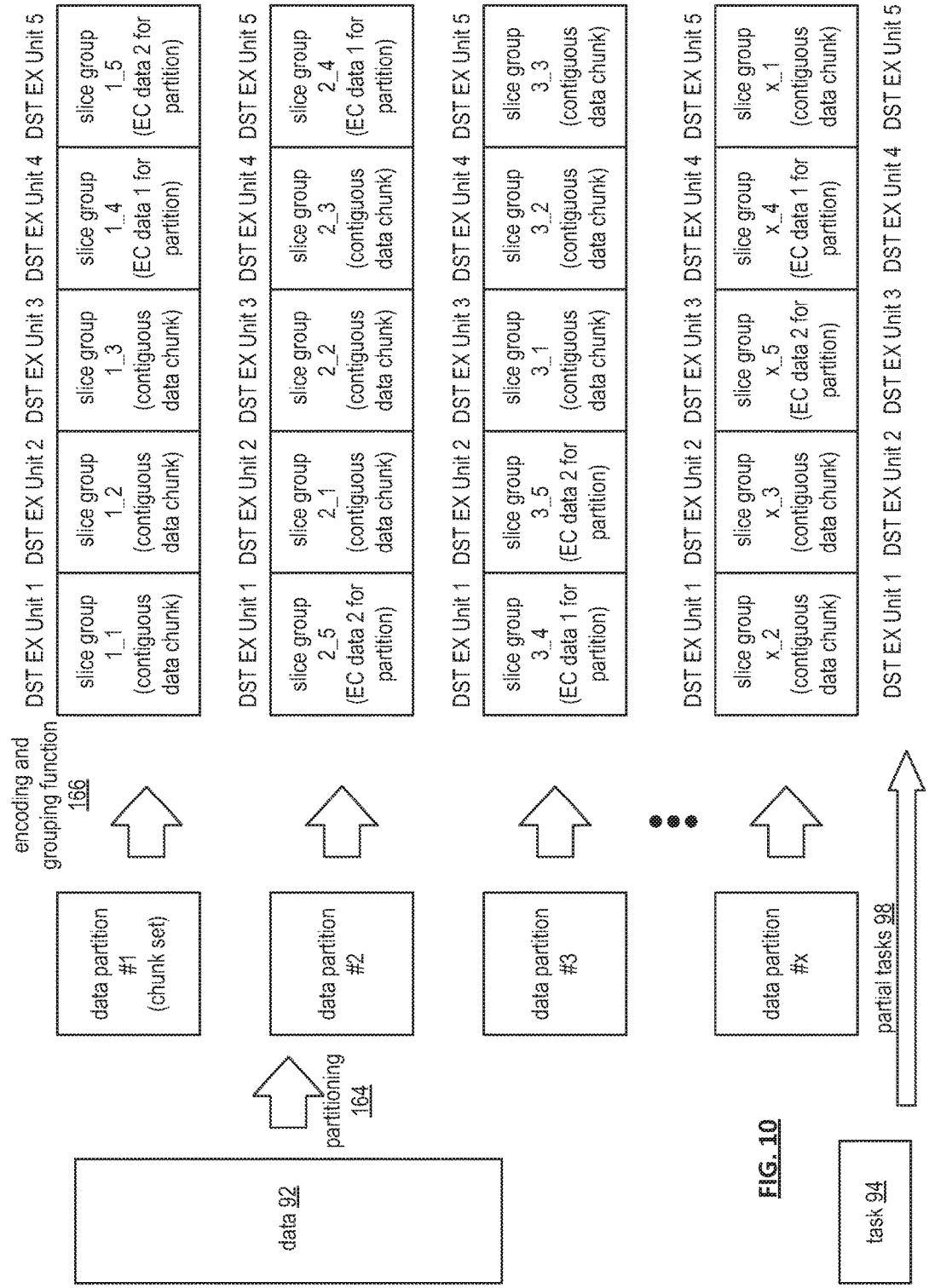
FIG. 10 is a diagram of an example of converting data into slice groups in accordance with the present invention.

FIG. 10 is a diagram of an example of converting data 92 into slice groups that expands on the preceding figures. As shown, the data 92 is partitioned in accordance with a partitioning function 164 into a plurality of data partitions (1-x, where x is an integer greater than 4). Each data partition (or chunkset of data) is encoded and grouped into slice groupings as previously discussed by an encoding and grouping function 166. For a given data partition, the slice groupings are sent to distributed storage and task (DST) execution units. From data partition to data partition, the ordering of the slice groupings to the DST execution units may vary.

For example, the slice groupings of data partition #1 is sent to the DST execution units such that the first DST execution receives first encoded data slices of each of the sets of encoded data slices, which corresponds to a first continuous data chunk of the first data partition (e.g., refer to FIG. 9), a second DST execution receives second encoded data slices of each of the sets of encoded data slices, which corresponds to a second continuous data chunk of the first data partition, etc.

For the second data partition, the slice groupings may be sent to the DST execution units in a different order than it was done for the first data partition. For instance, the first slice grouping of the second data partition (e.g., slice group 2_1) is sent to the second DST execution unit; the second slice grouping of the second data partition (e.g., slice group 2_2) is sent to the third DST execution unit; the third slice grouping of the second data partition (e.g., slice group 2_3) is sent to the fourth DST execution unit; the fourth slice grouping of the second data partition (e.g., slice group 2_4, which includes first error coding information) is sent to the fifth DST execution unit; and the fifth slice grouping of the second data partition (e.g., slice group 2_5, which includes second error coding information) is sent to the first DST execution unit.

The pattern of sending the slice groupings to the set of DST execution units may vary in a predicted pattern, a random pattern, and/or a combination thereof from data partition to data partition. In addition, from data partition to data partition, the set of DST execution units may change. For example, for the first data partition, DST execution units 1-5 may be used; for the second data partition, DST execution units 6-10 may be used; for the third data partition, DST execution units 3-7 may be used; etc. As is also shown, the task is divided into partial tasks that are sent to the DST execution units in conjunction with the slice groupings of the data partitions.

Figure 11:
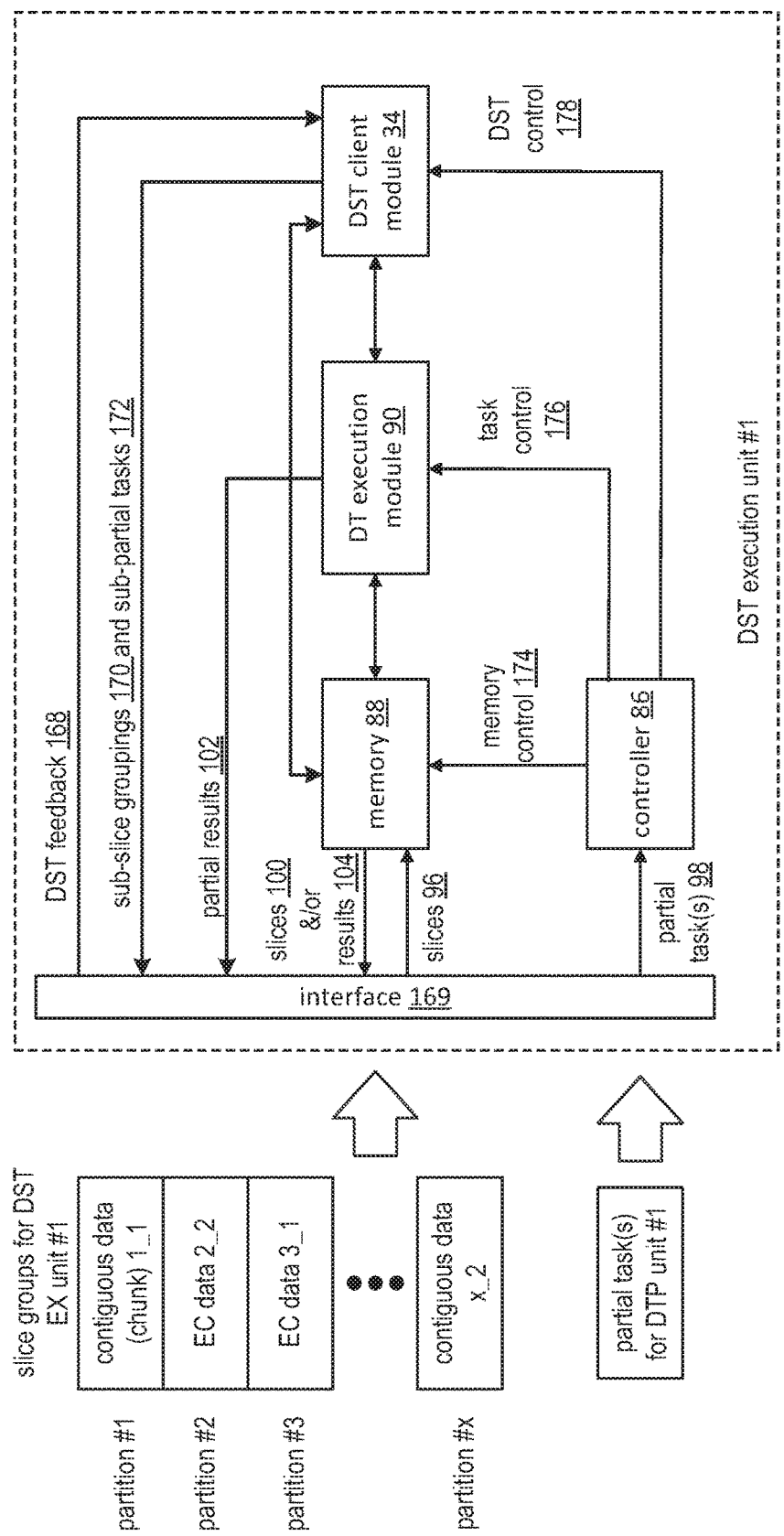
FIG. 11 is a schematic block diagram of an embodiment of a DST execution unit in accordance with the present invention.

FIG. 11 is a schematic block diagram of an embodiment of a DST (distributed storage and/or task) execution unit that includes an interface 169, a controller 86, memory 88, one or more DT (distributed task) execution modules 90, and a DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a slice group, the DST execution module receives a slice grouping 96 (e.g., slice group #1) via interface 169. The slice grouping 96 includes, per partition, encoded data slices of contiguous data or encoded data slices of error coding (EC) data. For slice group #1, the DST execution module receives encoded data slices of contiguous data for partitions #1 and #x (and potentially others between 3 and x) and receives encoded data slices of EC data for partitions #2 and #3 (and potentially others between 3 and x). Examples of encoded data slices of contiguous data and encoded data slices of error coding (EC) data are discussed with reference to FIG. 9. The memory 88 stores the encoded data slices of slice groupings 96 in accordance with memory control information 174 it receives from the controller 86.

The controller 86 (e.g., a processing module, a CPU, etc.) generates the memory control information 174 based on a partial task(s) 98 and distributed computing information (e.g., user information (e.g., user ID, distributed computing permissions, data access permission, etc.), vault information (e.g., virtual memory assigned to user, user group, temporary storage for task processing, etc.), task validation information, etc.). For example, the controller 86 interprets the partial task(s) 98 in light of the distributed computing information to determine whether a requestor is authorized to perform the task 98, is authorized to access the data, and/or is authorized to perform the task on this particular data. When the requestor is authorized, the controller 86 determines, based on the task 98 and/or another input, whether the encoded data slices of the slice grouping 96 are to be temporarily stored or permanently stored. Based on the foregoing, the controller 86 generates the memory control information 174 to write the encoded data slices of the slice grouping 96 into the memory 88 and to indicate whether the slice grouping 96 is permanently stored or temporarily stored.

With the slice grouping 96 stored in the memory 88, the controller 86 facilitates execution of the partial task(s) 98. In an example, the controller 86 interprets the partial task 98 in light of the capabilities of the DT execution module(s) 90. The capabilities include one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, etc. If the controller 86 determines that the DT execution module(s) 90 have sufficient capabilities, it generates task control information 176.

The task control information 176 may be a generic instruction (e.g., perform the task on the stored slice grouping) or a series of operational codes. In the former instance, the DT execution module 90 includes a co-processor function specifically configured (fixed or programmed) to perform the desired task 98. In the latter instance, the DT execution module 90 includes a general processor topology where the controller stores an algorithm corresponding to the particular task 98. In this instance, the controller 86 provides the operational codes (e.g., assembly language, source code of a programming language, object code, etc.) of the algorithm to the DT execution module 90 for execution.

Depending on the nature of the task 98, the DT execution module 90 may generate intermediate partial results 102 that are stored in the memory 88 or in a cache memory (not shown) within the DT execution module 90. In either case, when the DT execution module 90 completes execution of the partial task 98, it outputs one or more partial results 102. The partial results 102 may also be stored in memory 88.

If, when the controller 86 is interpreting whether capabilities of the DT execution module(s) 90 can support the partial task 98, the controller 86 determines that the DT execution module(s) 90 cannot adequately support the task 98 (e.g., does not have the right resources, does not have sufficient available resources, available resources would be too slow, etc.), it then determines whether the partial task 98 should be fully offloaded or partially offloaded.

If the controller 86 determines that the partial task 98 should be fully offloaded, it generates DST control information 178 and provides it to the DST client module 34. The DST control information 178 includes the partial task 98, memory storage information regarding the slice grouping 96, and distribution instructions. The distribution instructions instruct the DST client module 34 to divide the partial task 98 into sub-partial tasks 172, to divide the slice grouping 96 into sub-slice groupings 170, and identify other DST execution units. The DST client module 34 functions in a similar manner as the DST client module 34 of FIGS. 3-10 to produce the sub-partial tasks 172 and the sub-slice groupings 170 in accordance with the distribution instructions.

The DST client module 34 receives DST feedback 168 (e.g., sub-partial results), via the interface 169, from the DST execution units to which the task was offloaded. The DST client module 34 provides the sub-partial results to the DST execution unit, which processes the sub-partial results to produce the partial result(s) 102.

If the controller 86 determines that the partial task 98 should be partially offloaded, it determines what portion of the task 98 and/or slice grouping 96 should be processed locally and what should be offloaded. For the portion that is being locally processed, the controller 86 generates task control information 176 as previously discussed. For the portion that is being offloaded, the controller 86 generates DST control information 178 as previously discussed.

When the DST client module 34 receives DST feedback 168 (e.g., sub-partial results) from the DST executions units to which a portion of the task was offloaded, it provides the sub-partial results to the DT execution module 90. The DT execution module 90 processes the sub-partial results with the sub-partial results it created to produce the partial result(s) 102.

The memory 88 may be further utilized to retrieve one or more of stored slices 100, stored results 104, partial results 102 when the DT execution module 90 stores partial results 102 and/or results 104 in the memory 88. For example, when the partial task 98 includes a retrieval request, the controller 86 outputs the memory control 174 to the memory 88 to facilitate retrieval of slices 100 and/or results 104.

Figure 12:
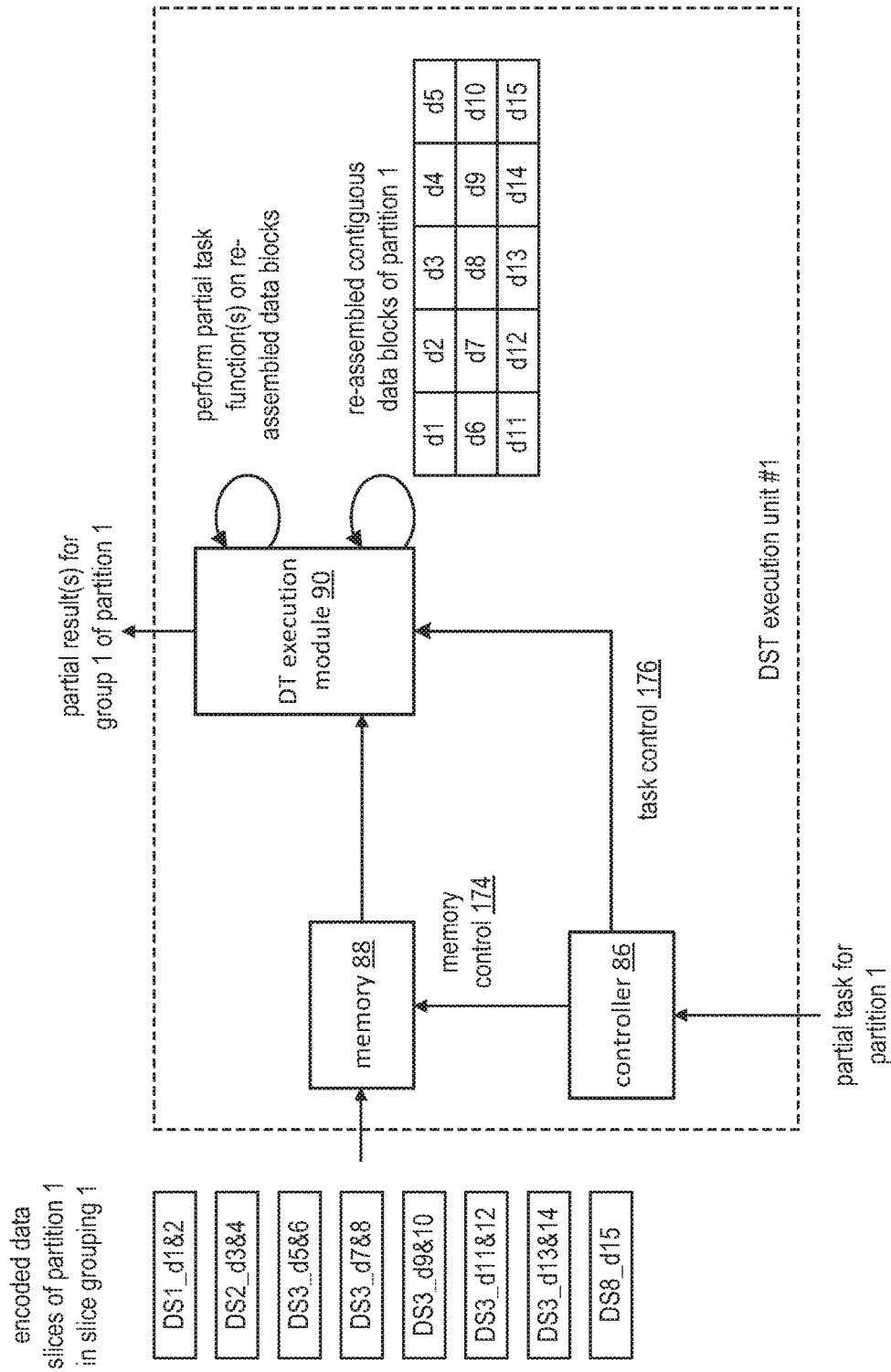
FIG. 12 is a schematic block diagram of an example of operation of a DST execution unit in accordance with the present invention.

FIG. 12 is a schematic block diagram of an example of operation of a distributed storage and task (DST) execution unit storing encoded data slices and executing a task thereon. To store the encoded data slices of a partition 1 of slice grouping 1, a controller 86 generates write commands as memory control information 174 such that the encoded slices are stored in desired locations (e.g., permanent or temporary) within memory 88.

Once the encoded slices are stored, the controller 86 provides task control information 176 to a distributed task (DT) execution module 90. As a first step of executing the task in accordance with the task control information 176, the DT execution module 90 retrieves the encoded slices from memory 88. The DT execution module 90 then reconstructs contiguous data blocks of a data partition. As shown for this example, reconstructed contiguous data blocks of data partition 1 include data blocks 1-15 (e.g., d1-d15).

With the contiguous data blocks reconstructed, the DT execution module 90 performs the task on the reconstructed contiguous data blocks. For example, the task may be to search the reconstructed contiguous data blocks for a particular word or phrase, identify where in the reconstructed contiguous data blocks the particular word or phrase occurred, and/or count the occurrences of the particular word or phrase on the reconstructed contiguous data blocks. The DST execution unit continues in a similar manner for the encoded data slices of other partitions in slice grouping 1. Note that with using the unity matrix error encoding scheme previously discussed, if the encoded data slices of contiguous data are uncorrupted, the decoding of them is a relatively straightforward process of extracting the data.

If, however, an encoded data slice of contiguous data is corrupted (or missing), it can be rebuilt by accessing other DST execution units that are storing the other encoded data slices of the set of encoded data slices of the corrupted encoded data slice. In this instance, the DST execution unit having the corrupted encoded data slices retrieves at least three encoded data slices (of contiguous data and of error coding data) in the set from the other DST execution units (recall for this example, the pillar width is 5 and the decode threshold is 3). The DST execution unit decodes the retrieved data slices using the DS error encoding parameters to recapture the corresponding data segment. The DST execution unit then re-encodes the data segment using the DS error encoding parameters to rebuild the corrupted encoded data slice. Once the encoded data slice is rebuilt, the DST execution unit functions as previously described.

Figure 13:
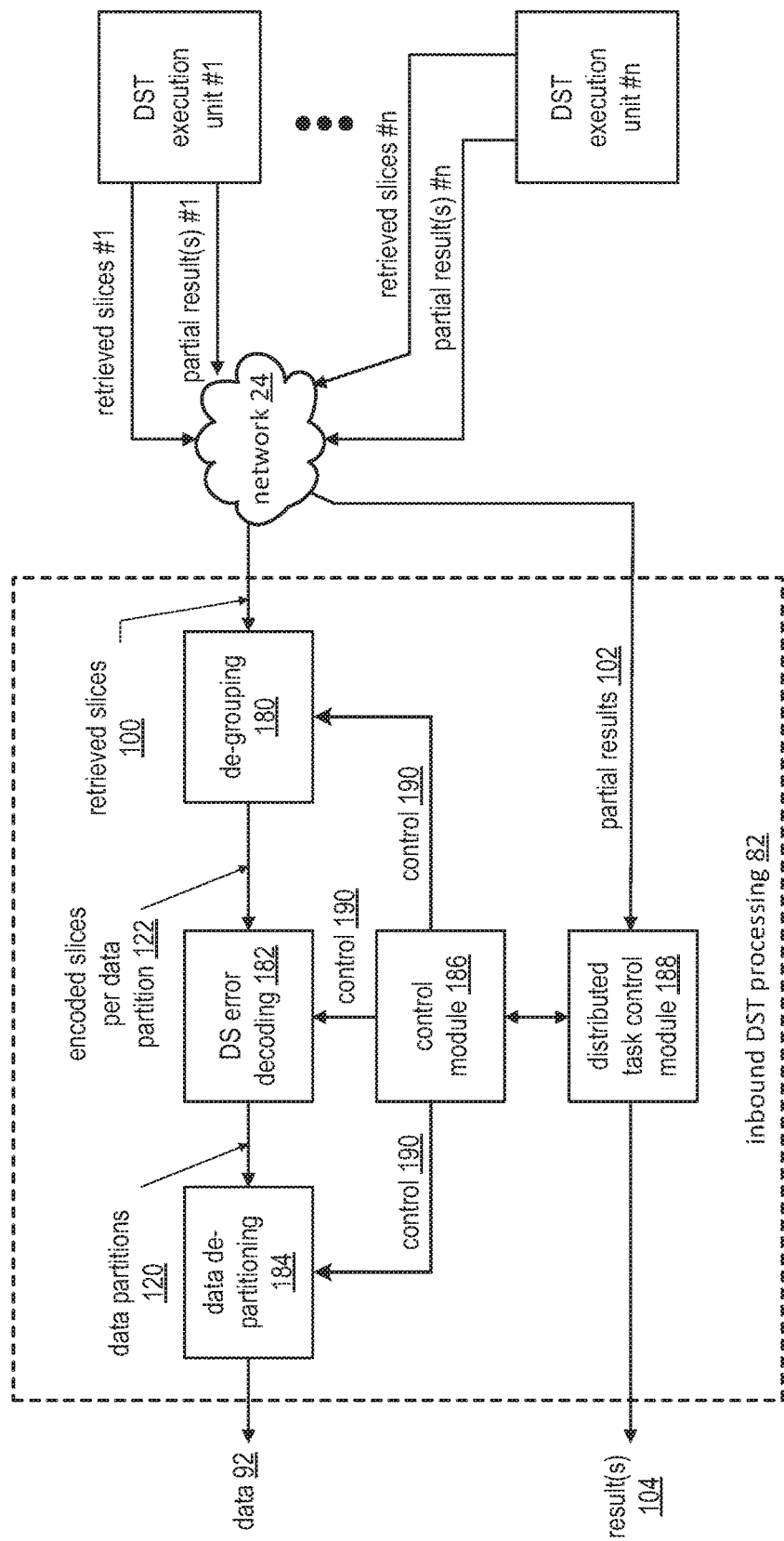
FIG. 13 is a schematic block diagram of an embodiment of an inbound distributed storage and/or task (DST) processing in accordance with the present invention.

FIG. 13 is a schematic block diagram of an embodiment of an inbound distributed storage and/or task (DST) processing section 82 of a DST client module coupled to DST execution units of a distributed storage and task network (DSTN) module via a network 24. The inbound DST processing section 82 includes a de-grouping module 180, a DS (dispersed storage) error decoding module 182, a data de-partitioning module 184, a control module 186, and a distributed task control module 188. Note that the control module 186 and/or the distributed task control module 188 may be separate modules from corresponding ones of outbound DST processing section or may be the same modules.

In an example of operation, the DST execution units have completed execution of corresponding partial tasks on the corresponding slice groupings to produce partial results 102. The inbound DST processing section 82 receives the partial results 102 via the distributed task control module 188. The inbound DST processing section 82 then processes the partial results 102 to produce a final result, or results 104. For example, if the task was to find a specific word or phrase within data, the partial results 102 indicate where in each of the prescribed portions of the data the corresponding DST execution units found the specific word or phrase. The distributed task control module 188 combines the individual partial results 102 for the corresponding portions of the data into a final result 104 for the data as a whole.

In another example of operation, the inbound DST processing section 82 is retrieving stored data from the DST execution units (i.e., the DSTN module). In this example, the DST execution units output encoded data slices 100 corresponding to the data retrieval requests. The de-grouping module 180 receives retrieved slices 100 and de-groups them to produce encoded data slices per data partition 122. The DS error decoding module 182 decodes, in accordance with DS error encoding parameters, the encoded data slices per data partition 122 to produce data partitions 120.

The data de-partitioning module 184 combines the data partitions 120 into the data 92. The control module 186 controls the conversion of retrieved slices 100 into the data 92 using control signals 190 to each of the modules. For instance, the control module 186 provides de-grouping information to the de-grouping module 180, provides the DS error encoding parameters to the DS error decoding module 182, and provides de-partitioning information to the data de-partitioning module 184.

Figure 14:
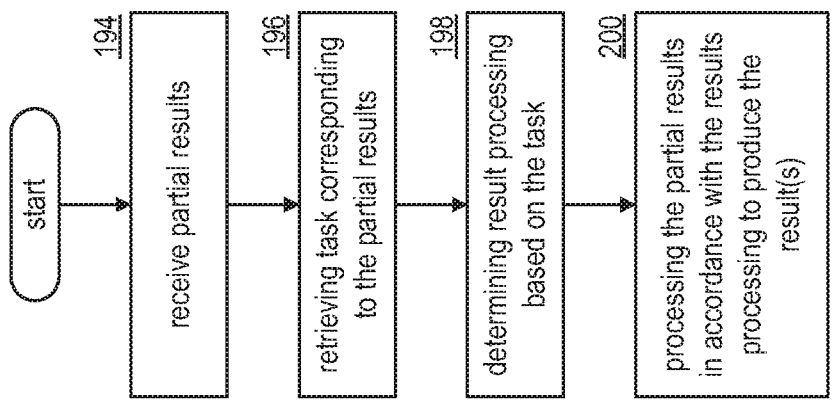
FIG. 14 is a logic diagram of an example of a method for inbound DST processing in accordance with the present invention.

FIG. 14 is a logic diagram of an example of a method that is executable by distributed storage and task (DST) client module regarding inbound DST processing. The method begins at step 194 where the DST client module receives partial results. The method continues at step 196 where the DST client module retrieves the task corresponding to the partial results. For example, the partial results include header information that identifies the requesting entity, which correlates to the requested task.

The method continues at step 198 where the DST client module determines result processing information based on the task. For example, if the task were to identify a particular word or phrase within the data, the result processing information would indicate to aggregate the partial results for the corresponding portions of the data to produce the final result. As another example, if the task were to count the occurrences of a particular word or phrase within the data, results of processing the information would indicate to add the partial results to produce the final results. The method continues at step 200 where the DST client module processes the partial results in accordance with the result processing information to produce the final result or results.

Figure 15:
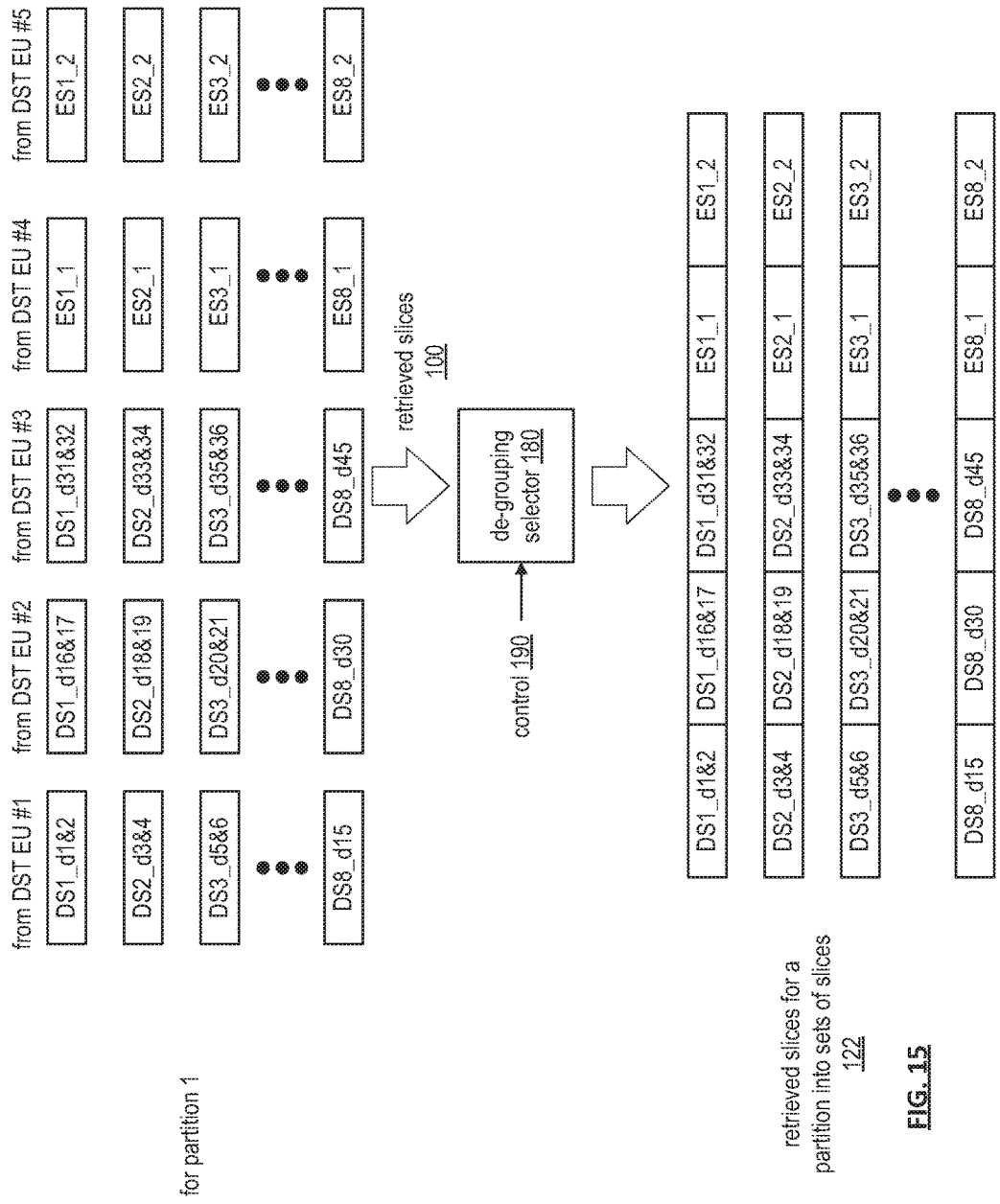
FIG. 15 is a diagram of an example of de-grouping selection processing of the inbound DST processing in accordance with the present invention.

FIG. 15 is a diagram of an example of de-grouping selection processing of an inbound distributed storage and task (DST) processing section of a DST client module. In general, this is an inverse process of the grouping module of the outbound DST processing section of FIG. 9. Accordingly, for each data partition (e.g., partition #1), the de-grouping module retrieves the corresponding slice grouping from the DST execution units (EU) (e.g., DST 1-5).

As shown, DST execution unit #1 provides a first slice grouping, which includes the first encoded slices of each of the sets of encoded slices (e.g., encoded data slices of contiguous data of data blocks 1-15); DST execution unit #2 provides a second slice grouping, which includes the second encoded slices of each of the sets of encoded slices (e.g., encoded data slices of contiguous data of data blocks 16-30); DST execution unit #3 provides a third slice grouping, which includes the third encoded slices of each of the sets of encoded slices (e.g., encoded data slices of contiguous data of data blocks 31-45); DST execution unit #4 provides a fourth slice grouping, which includes the fourth encoded slices of each of the sets of encoded slices (e.g., first encoded data slices of error coding (EC) data); and DST execution unit #5 provides a fifth slice grouping, which includes the fifth encoded slices of each of the sets of encoded slices (e.g., first encoded data slices of error coding (EC) data).

The de-grouping module de-groups the slice groupings (e.g., received slices 100) using a de-grouping selector 180 controlled by a control signal 190 as shown in the example to produce a plurality of sets of encoded data slices (e.g., retrieved slices for a partition into sets of slices 122). Each set corresponding to a data segment of the data partition.

Figure 16:
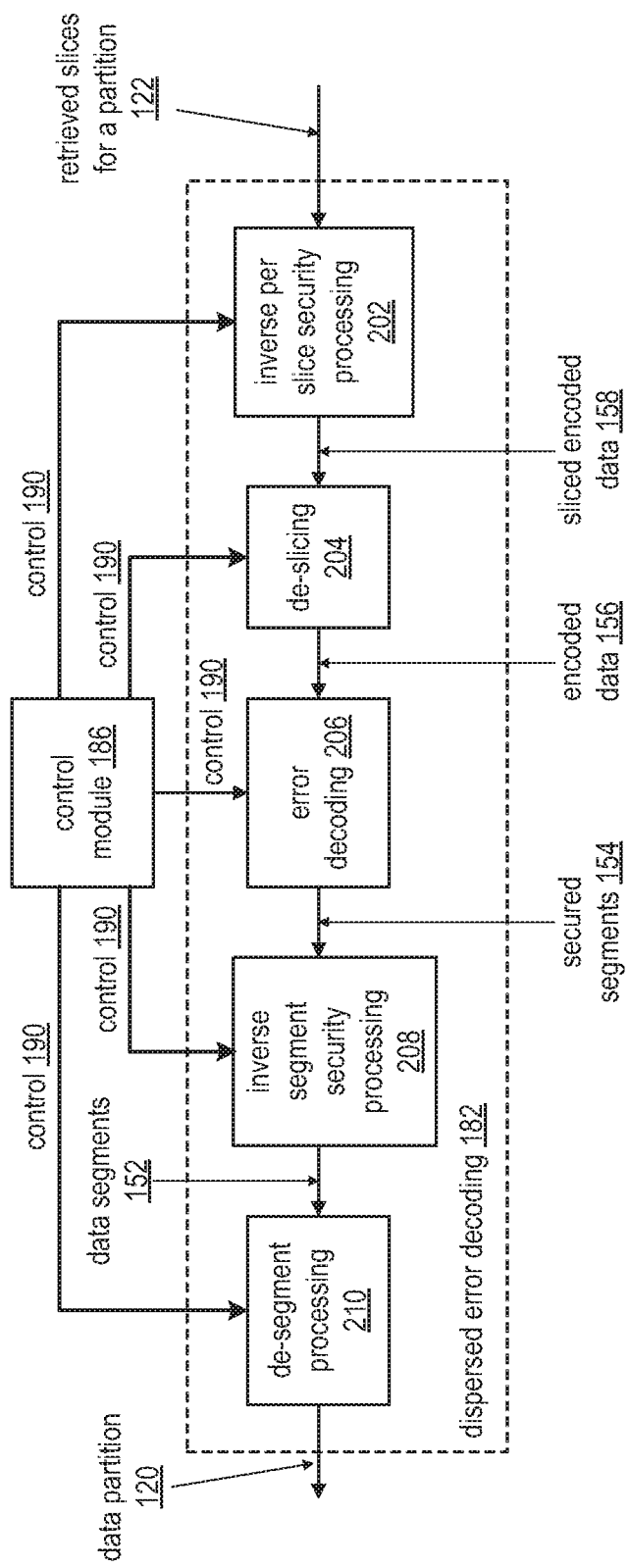
FIG. 16 is a schematic block diagram of an embodiment of a dispersed error decoding in accordance with the present invention.

FIG. 16 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, a de-segmenting processing module 210, and a control module 186.

In an example of operation, the inverse per slice security processing module 202, when enabled by the control module 186, unsecures each encoded data slice 122 based on slice de-security information received as control information 190 (e.g., the compliment of the slice security information discussed with reference to FIG. 6) received from the control module 186. The slice security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 122, it decrypts each verified encoded data slice, and decompresses each decrypted encoded data slice to produce slice encoded data 158. When the inverse per slice security processing module 202 is not enabled, it passes the encoded data slices 122 as the sliced encoded data 158 or is bypassed such that the retrieved encoded data slices 122 are provided as the sliced encoded data 158.

The de-slicing module 204 de-slices the sliced encoded data 158 into encoded data segments 156 in accordance with a pillar width of the error correction encoding parameters received as control information 190 from the control module 186. For example, if the pillar width is five, the de-slicing module 204 de-slices a set of five encoded data slices into an encoded data segment 156. The error decoding module 206 decodes the encoded data segments 156 in accordance with error correction decoding parameters received as control information 190 from the control module 186 to produce secure data segments 154. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments 154 based on segment security information received as control information 190 from the control module 186. The segment security information includes data decompression, decryption, de-watermarking, integrity check (e.g., CRC, etc.) verification, and/or any other type of digital security. For example, when the inverse segment security processing module 208 is enabled, it verifies integrity information (e.g., a CRC value) of each secure data segment 154, it decrypts each verified secured data segment, and decompresses each decrypted secure data segment to produce a data segment 152. When the inverse segment security processing module 208 is not enabled, it passes the decoded data segment 154 as the data segment 152 or is bypassed.

The de-segment processing module 210 receives the data segments 152 and receives de-segmenting information as control information 190 from the control module 186. The de-segmenting information indicates how the de-segment processing module 210 is to de-segment the data segments 152 into a data partition 120. For example, the de-segmenting information indicates how the rows and columns of data segments are to be rearranged to yield the data partition 120.

Figure 17:
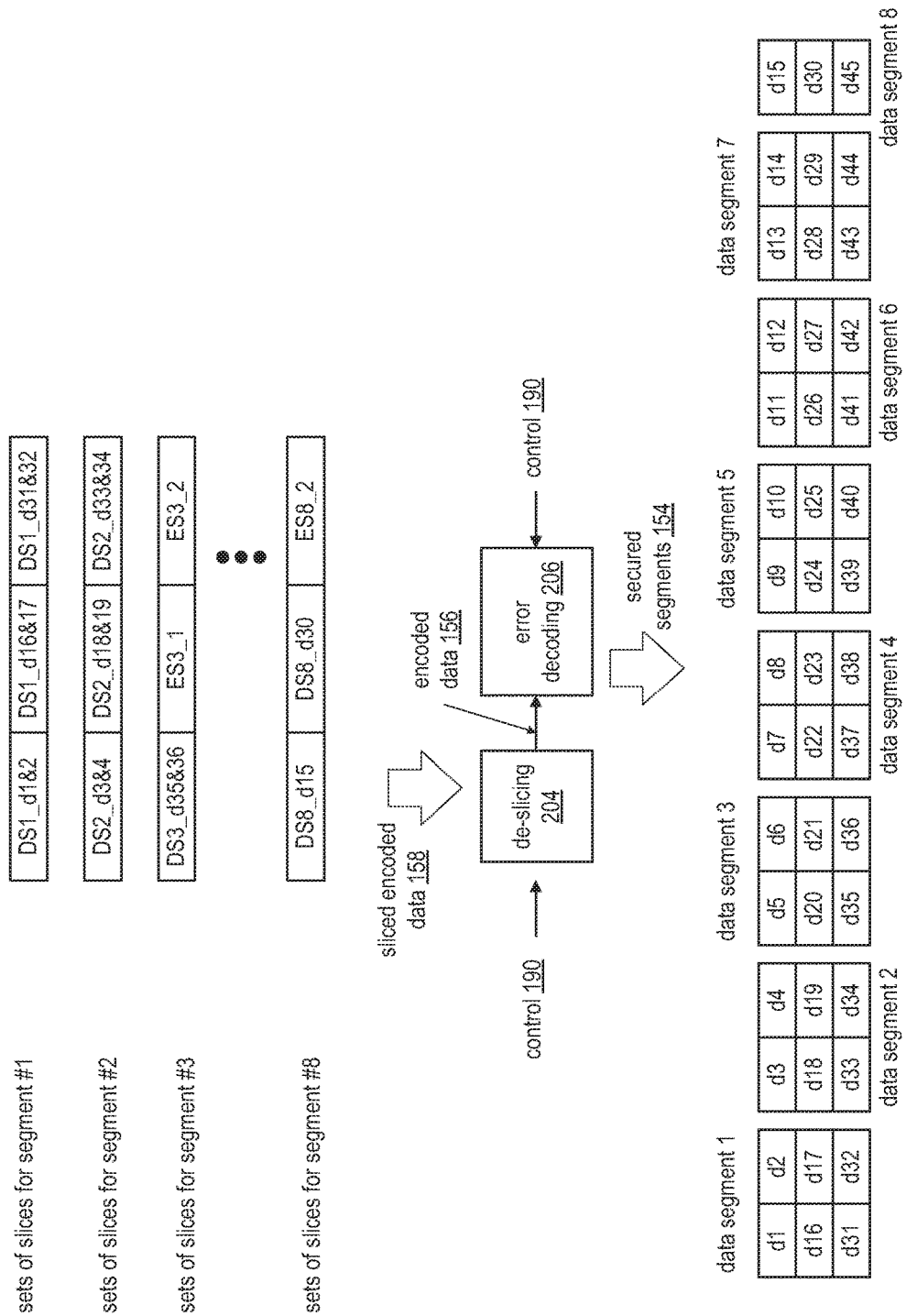
FIG. 17 is a diagram of an example of de-slicing and error decoding processing of the dispersed error decoding in accordance with the present invention.

FIG. 17 is a diagram of an example of de-slicing and error decoding processing of a dispersed error decoding module. A de-slicing module 204 receives at least a decode threshold number of encoded data slices 158 for each data segment in accordance with control information 190 and provides encoded data 156. In this example, a decode threshold is three. As such, each set of encoded data slices 158 is shown to have three encoded data slices per data segment. The de-slicing module 204 may receive three encoded data slices per data segment because an associated distributed storage and task (DST) client module requested retrieving only three encoded data slices per segment or selected three of the retrieved encoded data slices per data segment. As shown, which is based on the unity matrix encoding previously discussed with reference to FIG. 8, an encoded data slice may be a data-based encoded data slice (e.g., DS1_d1&d2) or an error code based encoded data slice (e.g., ES3_1).

An error decoding module 206 decodes the encoded data 156 of each data segment in accordance with the error correction decoding parameters of control information 190 to produce secured segments 154. In this example, data segment 1 includes 3 rows with each row being treated as one word for encoding. As such, data segment 1 includes three words: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

Figure 18:
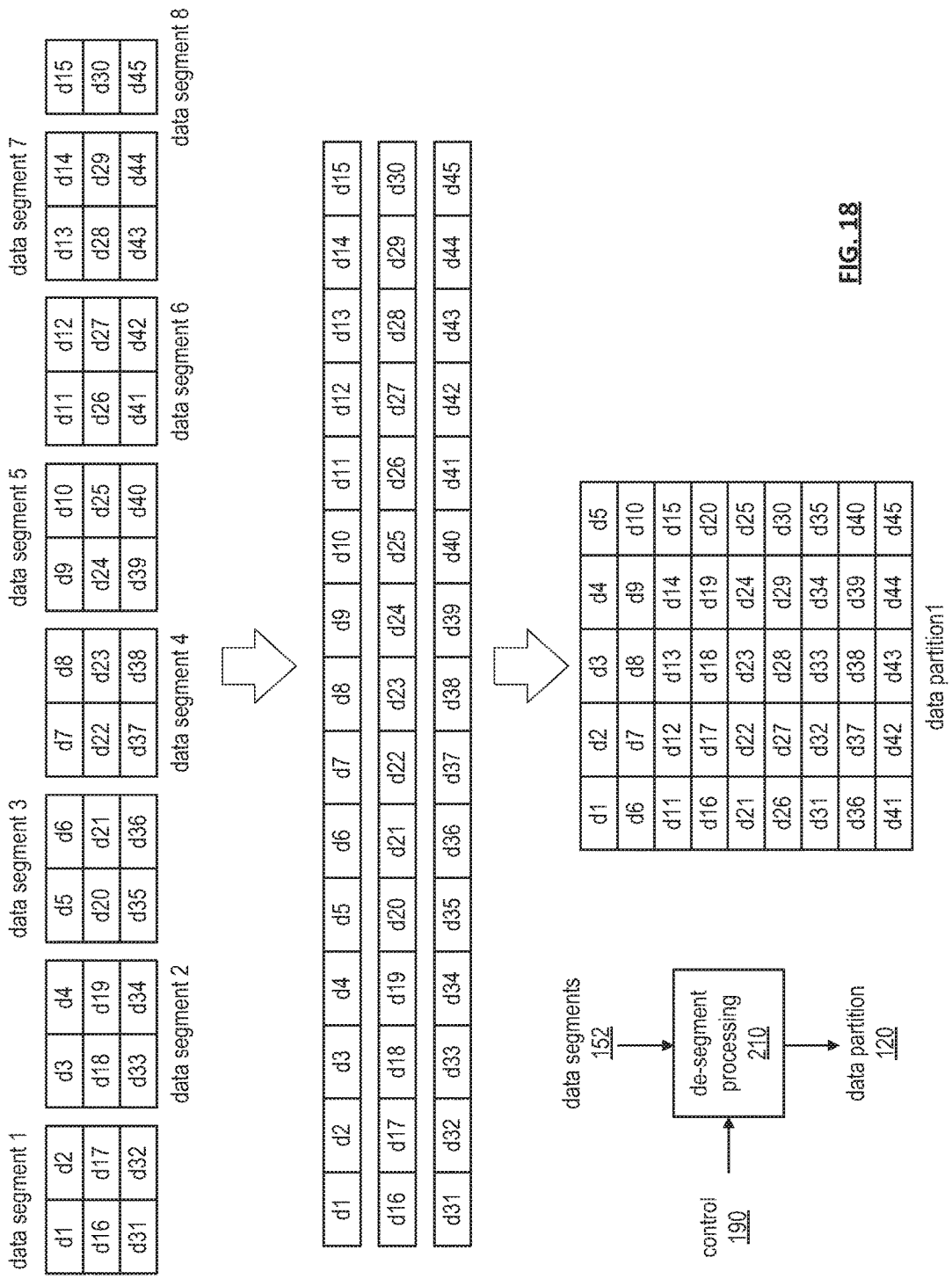
FIG. 18 is a diagram of an example of a de-segment processing of the dispersed error decoding in accordance with the present invention.

FIG. 18 is a diagram of an example of a de-segment processing of an inbound distributed storage and task (DST) processing. In this example, a de-segment processing module 210 receives data segments 152 (e.g., 1-8) and rearranges the data blocks of the data segments into rows and columns in accordance with de-segmenting information of control information 190 to produce a data partition 120. Note that the number of rows is based on the decode threshold (e.g., 3 in this specific example) and the number of columns is based on the number and size of the data blocks.

The de-segmenting module 210 converts the rows and columns of data blocks into the data partition 120. Note that each data block may be of the same size as other data blocks or of a different size. In addition, the size of each data block may be a few bytes to megabytes of data.

Figure 19:
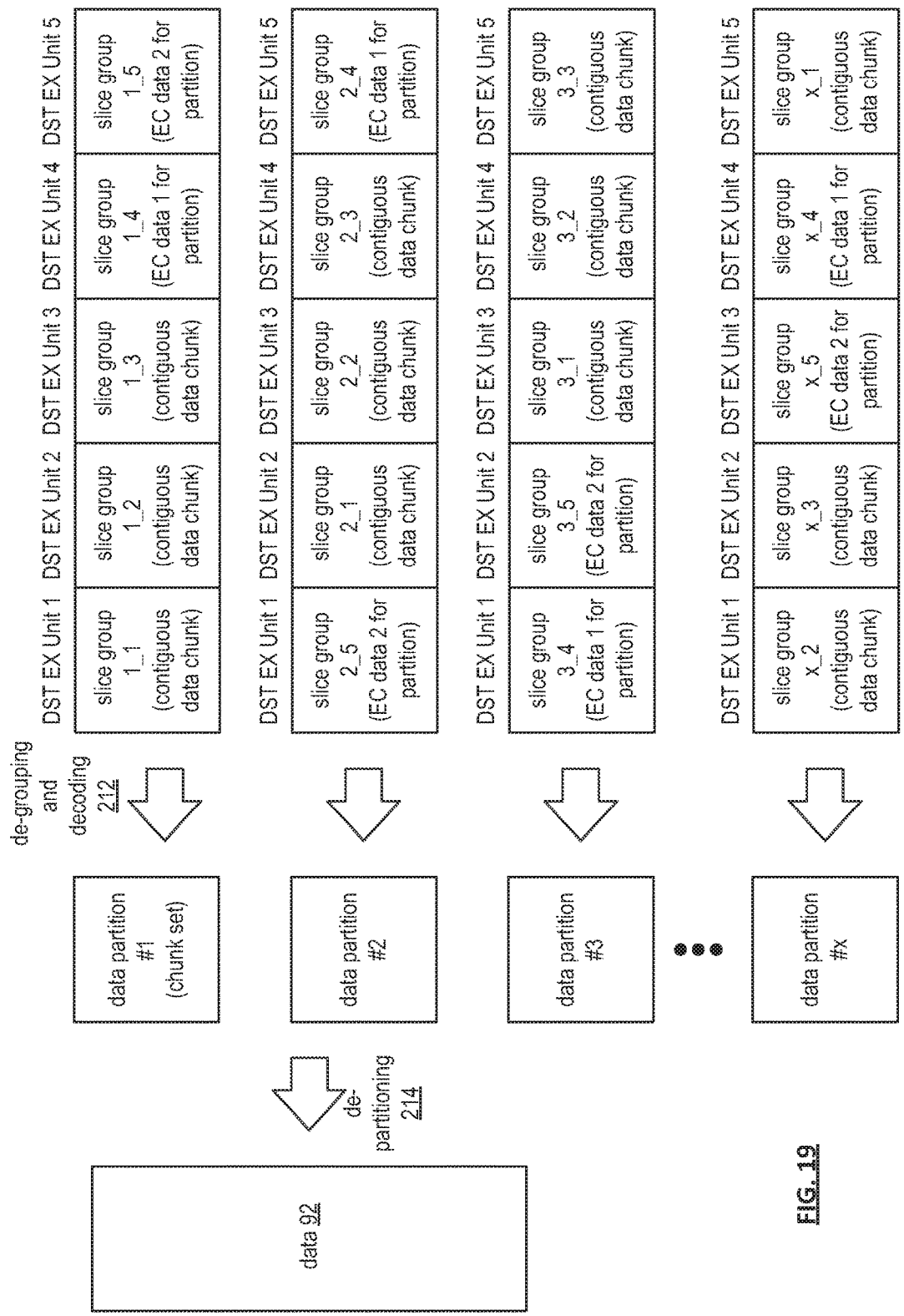
FIG. 19 is a diagram of an example of converting slice groups into data in accordance with the present invention.

FIG. 19 is a diagram of an example of converting slice groups into data 92 within an inbound distributed storage and task (DST) processing section. As shown, the data 92 is reconstructed from a plurality of data partitions (1-x, where x is an integer greater than 4). Each data partition (or chunk set of data) is decoded and re-grouped using a de-grouping and decoding function 212 and a de-partition function 214 from slice groupings as previously discussed. For a given data partition, the slice groupings (e.g., at least a decode threshold per data segment of encoded data slices) are received from DST execution units. From data partition to data partition, the ordering of the slice groupings received from the DST execution units may vary as discussed with reference to FIG. 10.

Figure 20:
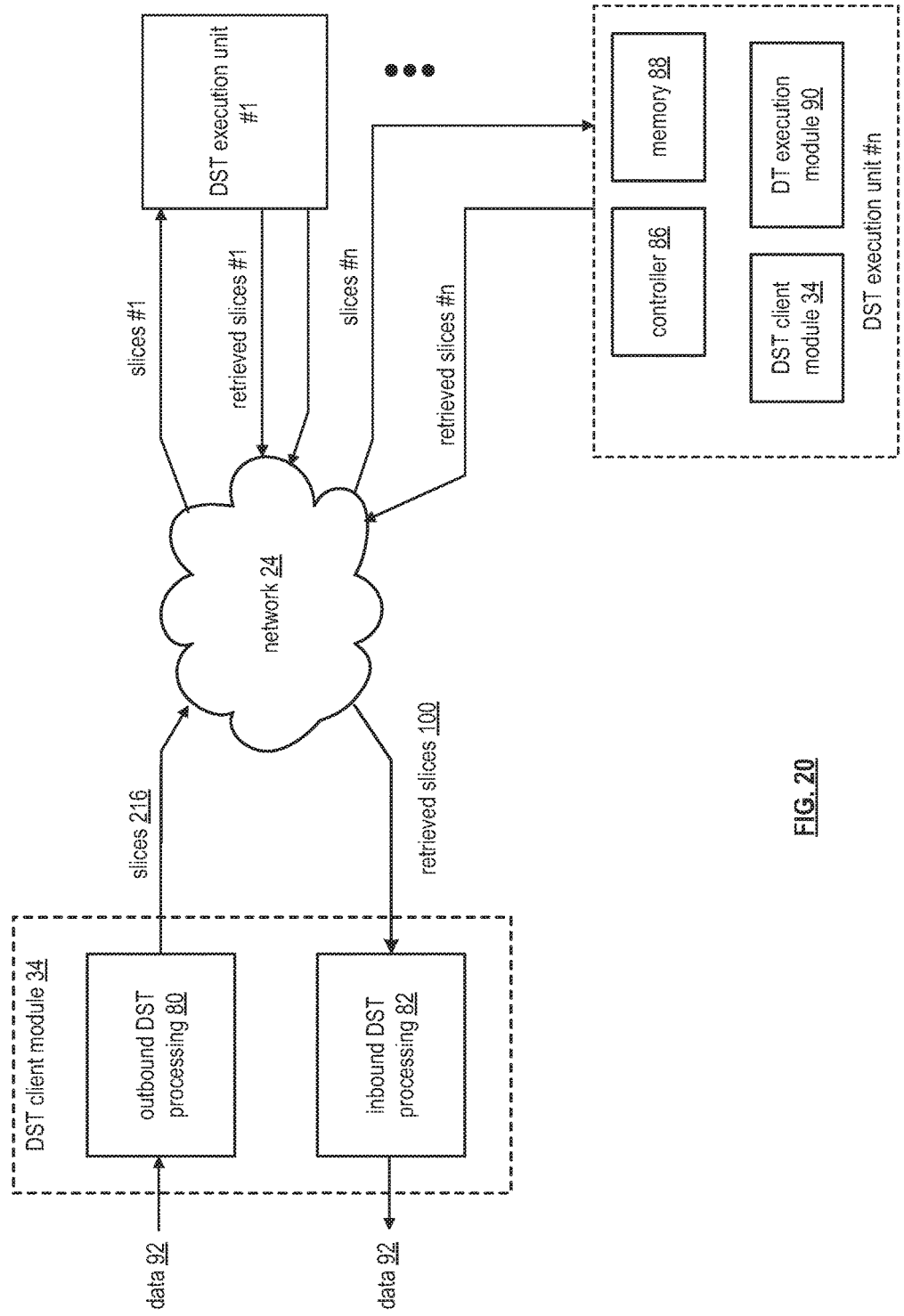
FIG. 20 is a diagram of an example of a distributed storage within the distributed computing system in accordance with the present invention.

FIG. 20 is a diagram of an example of a distributed storage and/or retrieval within the distributed computing system. The distributed computing system includes a plurality of distributed storage and/or task (DST) processing client modules 34 (one shown) coupled to a distributed storage and/or task processing network (DSTN) module, or multiple DSTN modules, via a network 24. The DST client module 34 includes an outbound DST processing section 80 and an inbound DST processing section 82. The DSTN module includes a plurality of DST execution units. Each DST execution unit includes a controller 86, memory 88, one or more distributed task (DT) execution modules 90, and a DST client module 34.

In an example of data storage, the DST client module 34 has data 92 that it desires to store in the DSTN module. The data 92 may be a file (e.g., video, audio, text, graphics, etc.), a data object, a data block, an update to a file, an update to a data block, etc. In this instance, the outbound DST processing module 80 converts the data 92 into encoded data slices 216 as will be further described with reference to FIGS. 21-23. The outbound DST processing module 80 sends, via the network 24, to the DST execution units for storage as further described with reference to FIG. 24.

In an example of data retrieval, the DST client module 34 issues a retrieve request to the DST execution units for the desired data 92. The retrieve request may address each DST executions units storing encoded data slices of the desired data, address a decode threshold number of DST execution units, address a read threshold number of DST execution units, or address some other number of DST execution units. In response to the request, each addressed DST execution unit retrieves its encoded data slices 100 of the desired data and sends them to the inbound DST processing section 82, via the network 24.

When, for each data segment, the inbound DST processing section 82 receives at least a decode threshold number of encoded data slices 100, it converts the encoded data slices 100 into a data segment. The inbound DST processing section 82 aggregates the data segments to produce the retrieved data 92.

Figure 21:
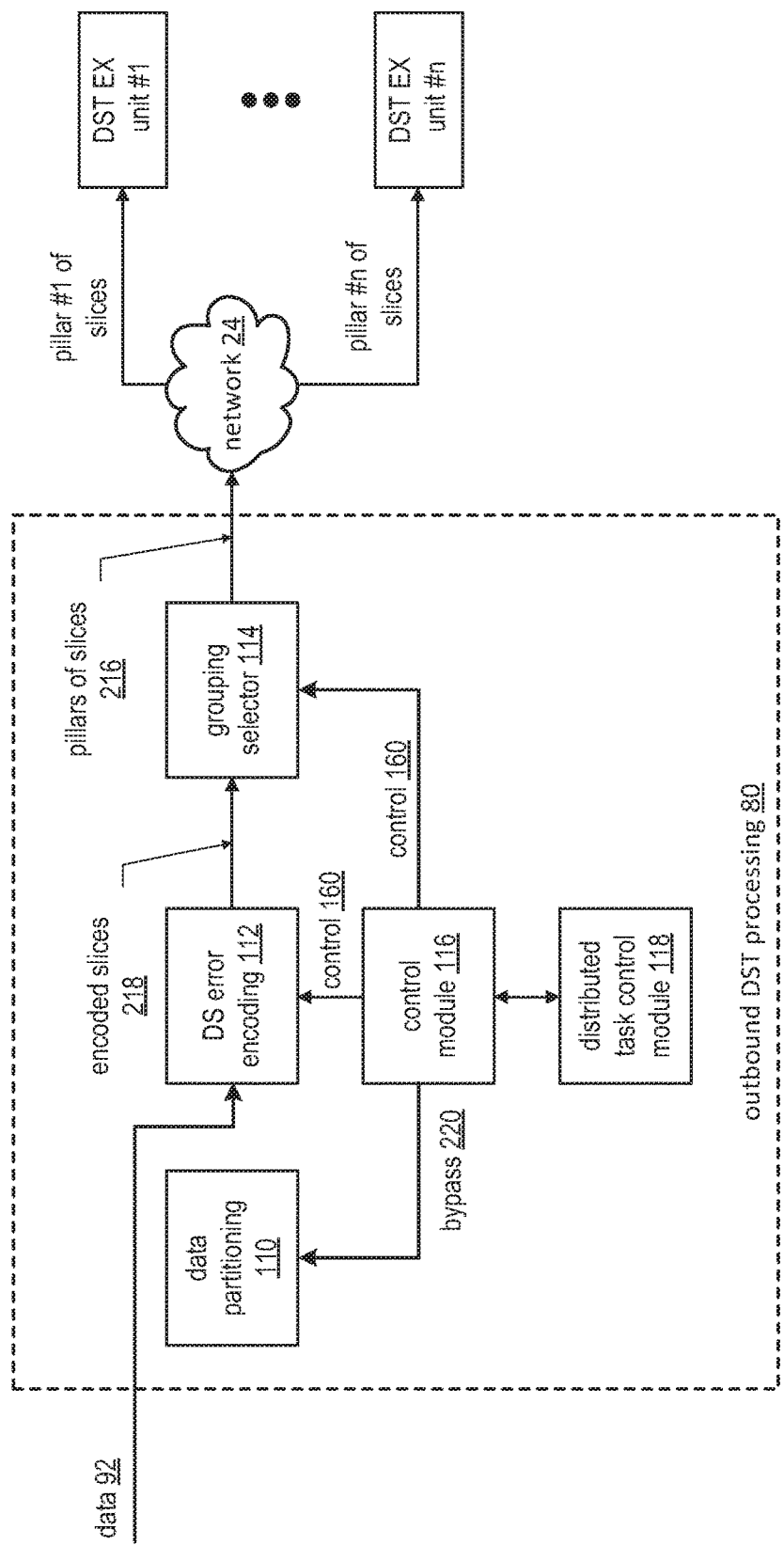
FIG. 21 is a schematic block diagram of an example of operation of outbound distributed storage and/or task (DST) processing for storing data in accordance with the present invention.

FIG. 21 is a schematic block diagram of an embodiment of an outbound distributed storage and/or task (DST) processing section 80 of a DST client module coupled to a distributed storage and task network (DSTN) module (e.g., a plurality of DST execution units) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 is by-passed such that data 92 is provided directly to the DS error encoding module 112. The control module 116 coordinates the by-passing of the data partitioning module 110 by outputting a bypass 220 message to the data partitioning module 110.

The DS error encoding module 112 receives the data 92 in a serial manner, a parallel manner, and/or a combination thereof. The DS error encoding module 112 DS error encodes the data in accordance with control information 160 from the control module 116 to produce encoded data slices 218. The DS error encoding includes segmenting the data 92 into data segments, segment security processing (e.g., encryption, compression, watermarking, integrity check (e.g., CRC, etc.)), error encoding, slicing, and/or per slice security processing (e.g., encryption, compression, watermarking, integrity check (e.g., CRC, etc.)). The control information 160 indicates which steps of the DS error encoding are active for the data 92 and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 218 of the data segments into pillars of slices 216. The number of pillars corresponds to the pillar width of the DS error encoding parameters. In this example, the distributed task control module 118 facilitates the storage request.

Figure 22:
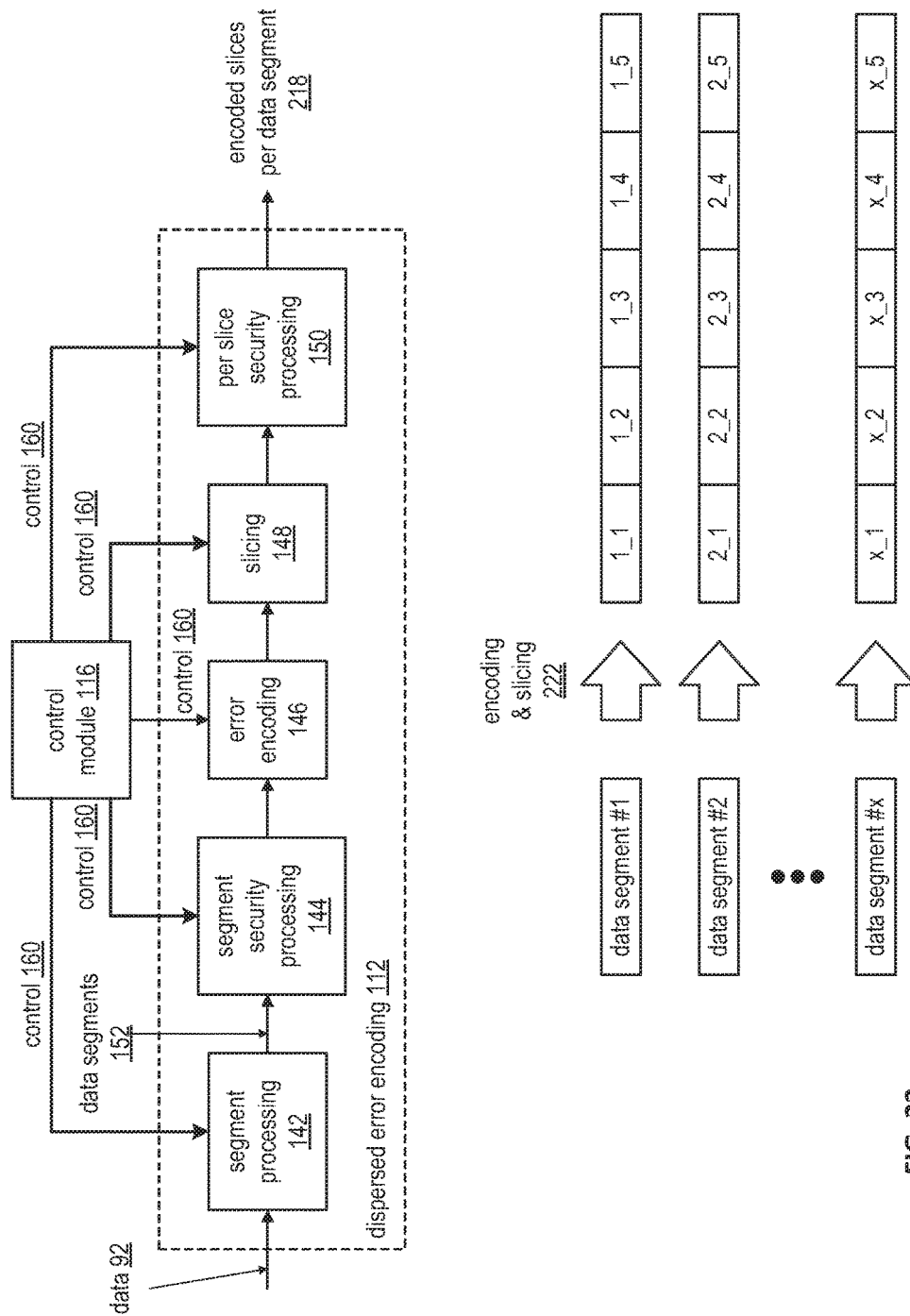
FIG. 22 is a schematic block diagram of an example of a dispersed error encoding for the example of FIG. 21 in accordance with the present invention.

FIG. 22 is a schematic block diagram of an example of a dispersed storage (DS) error encoding module 112 for the example of FIG. 21. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives data 92 and receives segmenting information as control information 160 from the control module 116. The segmenting information indicates how the segment processing module is to segment the data. For example, the segmenting information indicates the size of each data segment. The segment processing module 142 segments the data 92 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., CRC, etc.), and/or any other type of digital security. For example, when the segment security processing module 144 is enabled, it compresses a data segment 152, encrypts the compressed data segment, and generates a CRC value for the encrypted data segment to produce a secure data segment. When the segment security processing module 144 is not enabled, it passes the data segments 152 to the error encoding module 146 or is bypassed such that the data segments 152 are provided to the error encoding module 146.

The error encoding module 146 encodes the secure data segments in accordance with error correction encoding parameters received as control information 160 from the control module 116. The error correction encoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment to produce an encoded data segment.

The slicing module 148 slices the encoded data segment in accordance with a pillar width of the error correction encoding parameters. For example, if the pillar width is five, the slicing module slices an encoded data segment into a set of five encoded data slices. As such, for a plurality of data segments, the slicing module 148 outputs a plurality of sets of encoded data slices as shown within encoding and slicing function 222 as described.

The per slice security processing module 150, when enabled by the control module 116, secures each encoded data slice based on slice security information received as control information 160 from the control module 116. The slice security information includes data compression, encryption, watermarking, integrity check (e.g., CRC, etc.), and/or any other type of digital security. For example, when the per slice security processing module 150 is enabled, it may compress an encoded data slice, encrypt the compressed encoded data slice, and generate a CRC value for the encrypted encoded data slice to produce a secure encoded data slice tweaking. When the per slice security processing module 150 is not enabled, it passes the encoded data slices or is bypassed such that the encoded data slices 218 are the output of the DS error encoding module 112.

Figure 23:
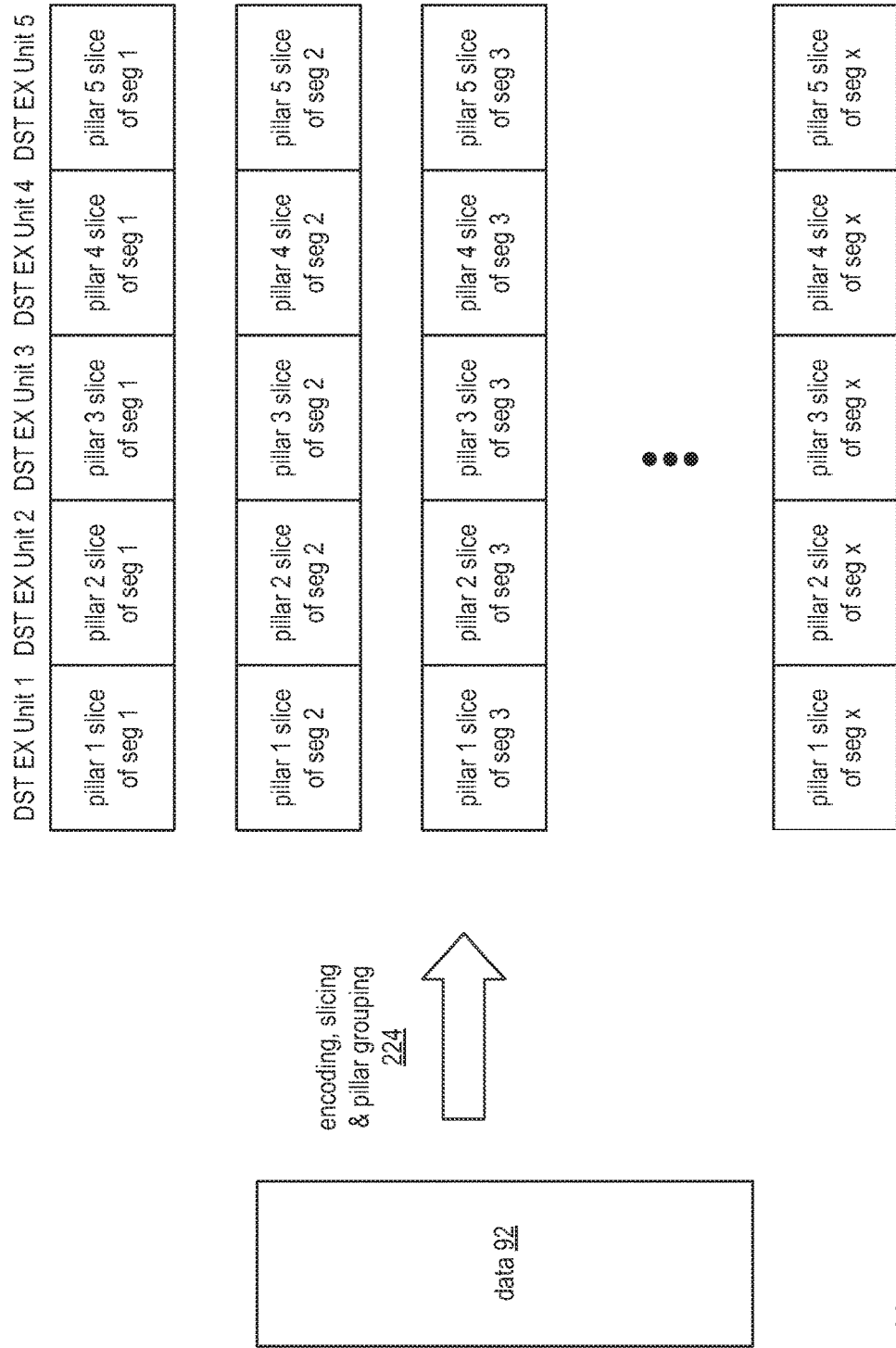
FIG. 23 is a diagram of an example of converting data into pillar slice groups for storage in accordance with the present invention.

FIG. 23 is a diagram of an example of converting data 92 into pillar slice groups utilizing encoding, slicing and pillar grouping function 224 for storage in memory of a distributed storage and task network (DSTN) module. As previously discussed the data 92 is encoded and sliced into a plurality of sets of encoded data slices; one set per data segment. The grouping selector module organizes the sets of encoded data slices into pillars of data slices. In this example, the DS error encoding parameters include a pillar width of 5 and a decode threshold of 3. As such, for each data segment, 5 encoded data slices are created.

The grouping selector module takes the first encoded data slice of each of the sets and forms a first pillar, which may be sent to the first DST execution unit. Similarly, the grouping selector module creates the second pillar from the second slices of the sets; the third pillar from the third slices of the sets; the fourth pillar from the fourth slices of the sets; and the fifth pillar from the fifth slices of the set.

Figure 24:
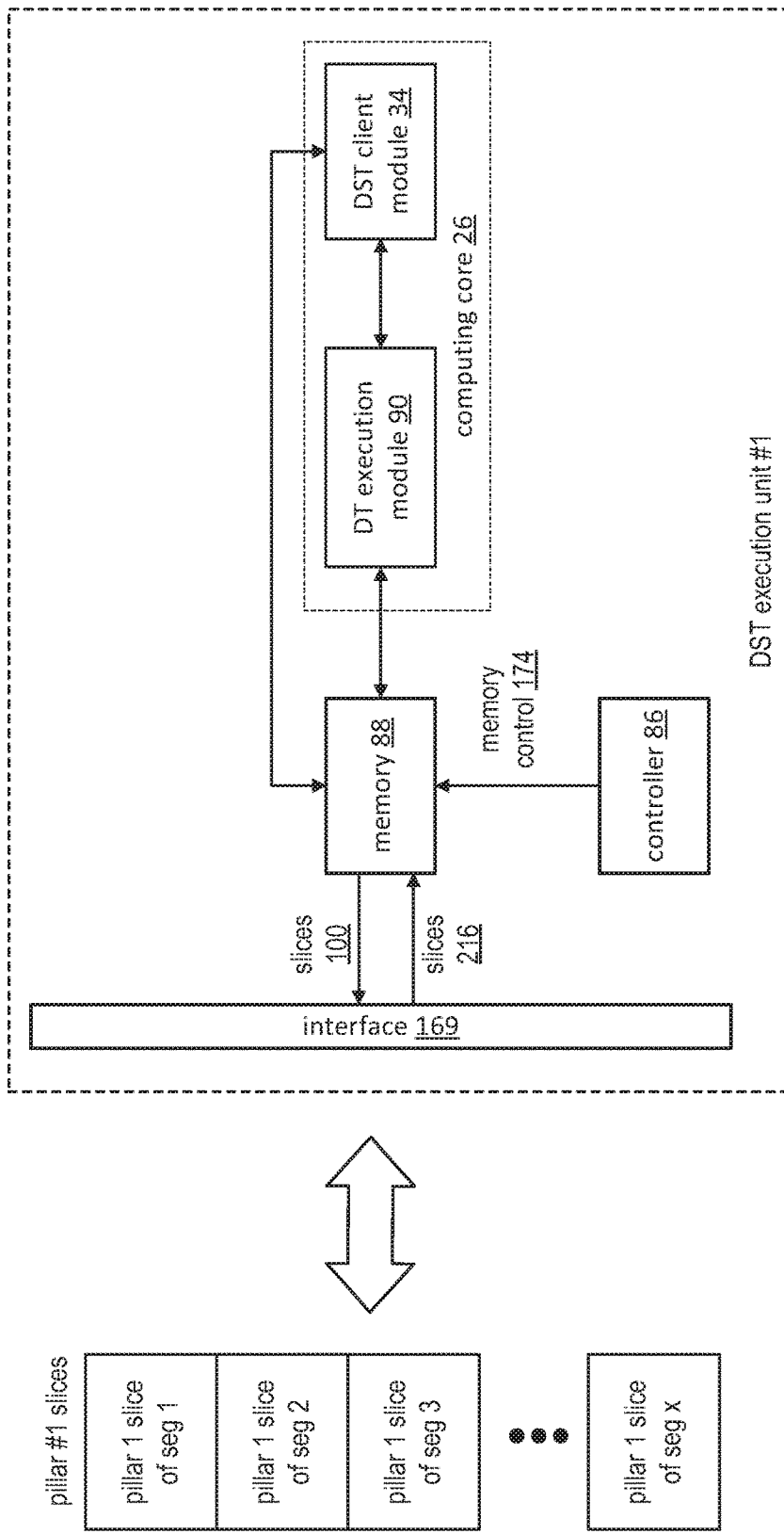
FIG. 24 is a schematic block diagram of an example of a storage operation of a DST execution unit in accordance with the present invention.

FIG. 24 is a schematic block diagram of an embodiment of a distributed storage and/or task (DST) execution unit that includes an interface 169, a controller 86, memory 88, one or more distributed task (DT) execution modules 90, and a DST client module 34. A computing core 26 may be utilized to implement the one or more DT execution modules 90 and the DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a pillar of slices 216, the DST execution unit receives, via interface 169, a pillar of slices 216 (e.g., pillar #1 slices). The memory 88 stores the encoded data slices 216 of the pillar of slices in accordance with memory control information 174 it receives from the controller 86. The controller 86 (e.g., a processing module, a CPU, etc.) generates the memory control information 174 based on distributed storage information (e.g., user information (e.g., user ID, distributed storage permissions, data access permission, etc.), vault information (e.g., virtual memory assigned to user, user group, etc.), etc.). Similarly, when retrieving slices, the DST execution unit receives, via interface 169, a slice retrieval request. The memory 88 retrieves the slice in accordance with memory control information 174 it receives from the controller 86. The memory 88 outputs the slice 100, via the interface 169, to a requesting entity.

Figure 25:
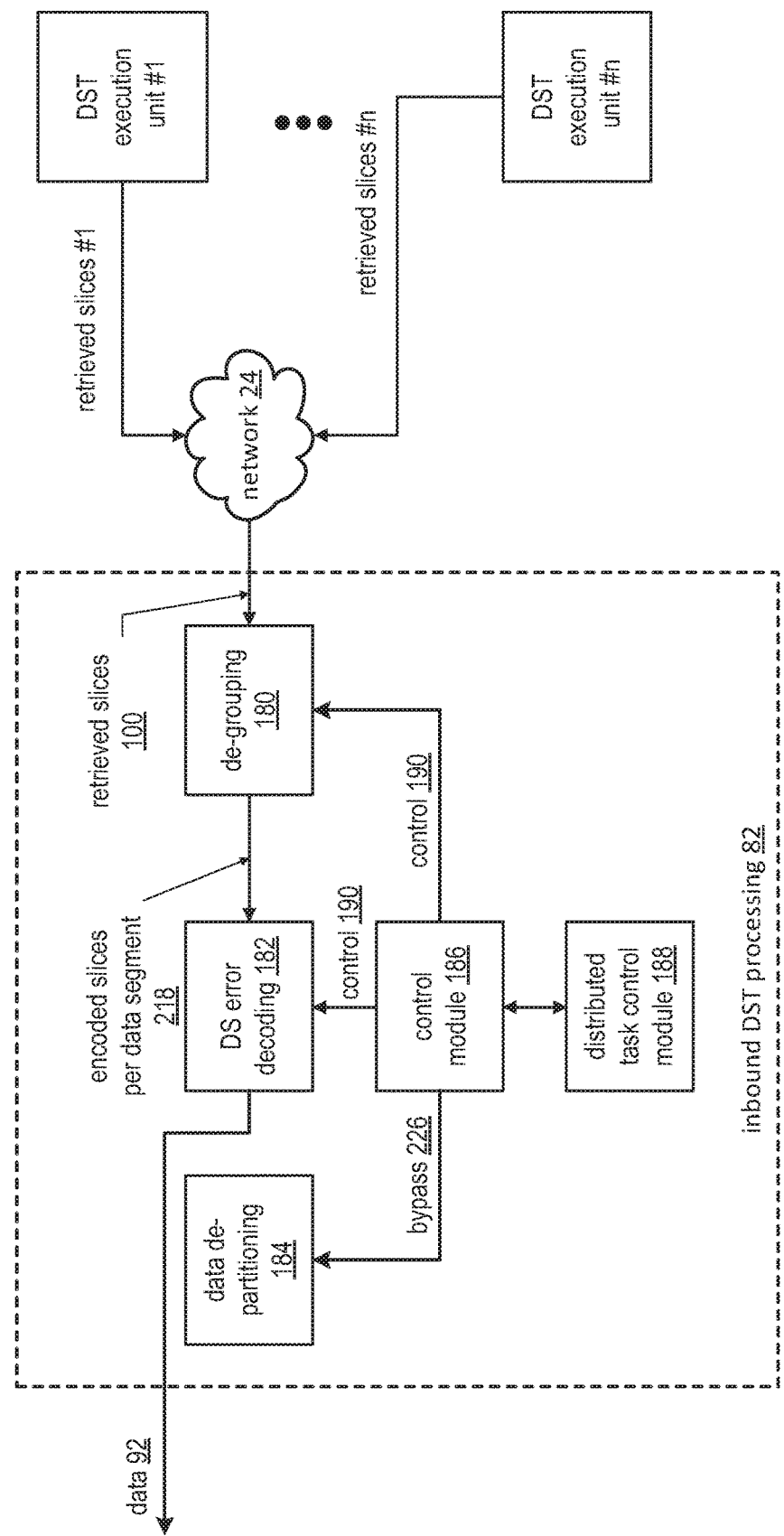
FIG. 25 is a schematic block diagram of an example of operation of inbound distributed storage and/or task (DST) processing for retrieving dispersed error encoded data in accordance with the present invention.

FIG. 25 is a schematic block diagram of an example of operation of an inbound distributed storage and/or task (DST) processing section 82 for retrieving dispersed error encoded data 92. The inbound DST processing section 82 includes a de-grouping module 180, a dispersed storage (DS) error decoding module 182, a data de-partitioning module 184, a control module 186, and a distributed task control module 188. Note that the control module 186 and/or the distributed task control module 188 may be separate modules from corresponding ones of an outbound DST processing section or may be the same modules.

In an example of operation, the inbound DST processing section 82 is retrieving stored data 92 from the DST execution units (i.e., the DSTN module). In this example, the DST execution units output encoded data slices corresponding to data retrieval requests from the distributed task control module 188. The de-grouping module 180 receives pillars of slices 100 and de-groups them in accordance with control information 190 from the control module 186 to produce sets of encoded data slices 218. The DS error decoding module 182 decodes, in accordance with the DS error encoding parameters received as control information 190 from the control module 186, each set of encoded data slices 218 to produce data segments, which are aggregated into retrieved data 92. The data de-partitioning module 184 is by-passed in this operational mode via a bypass signal 226 of control information 190 from the control module 186.

Figure 26:
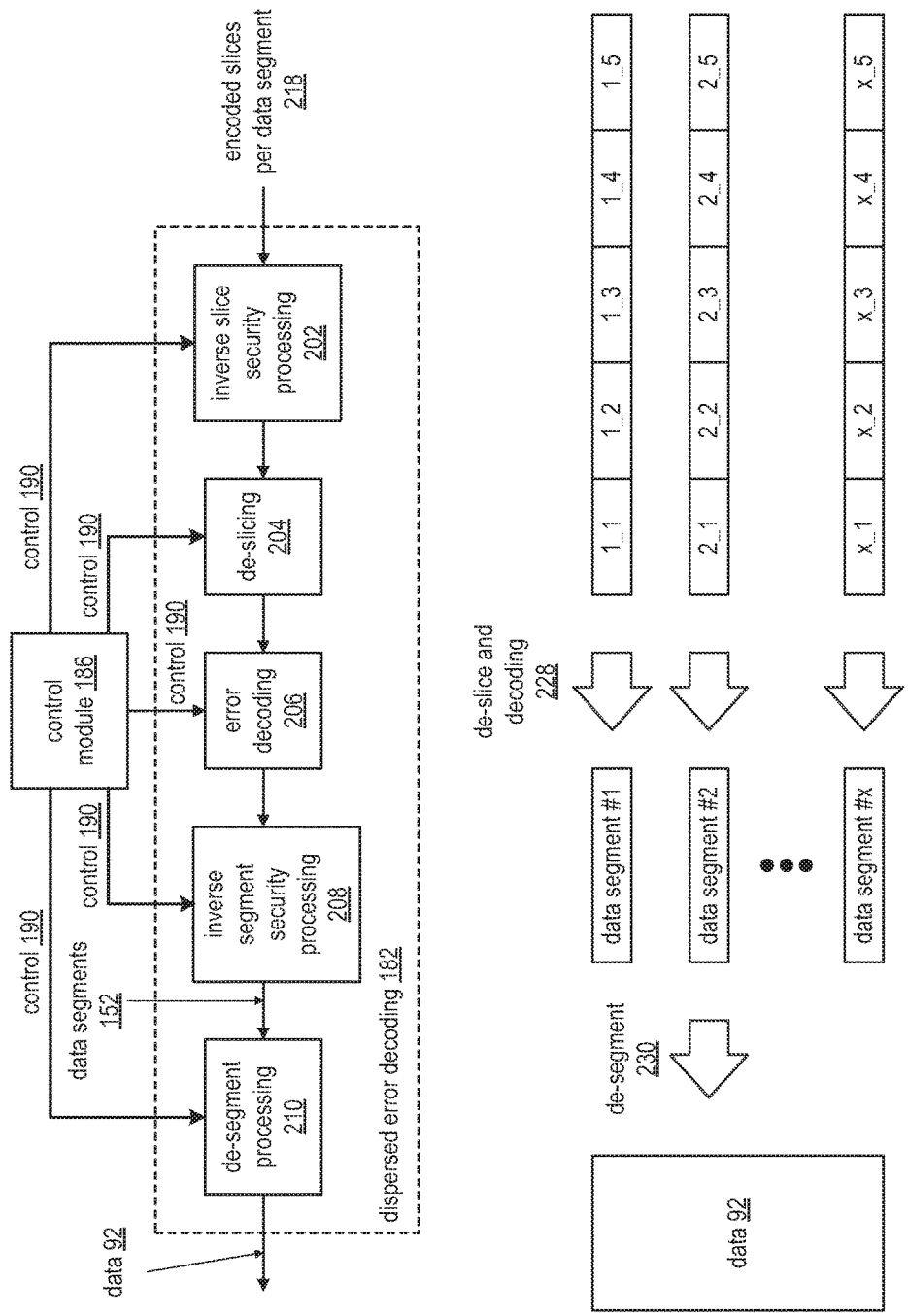
FIG. 26 is a schematic block diagram of an example of a dispersed error decoding for the example of FIG. 25 in accordance with the present invention.

FIG. 26 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, and a de-segmenting processing module 210. The dispersed error decoding module 182 is operable to de-slice and decode encoded slices per data segment 218 utilizing a de-slicing and decoding function 228 to produce a plurality of data segments that are de-segmented utilizing a de-segment function 230 to recover data 92.

In an example of operation, the inverse per slice security processing module 202, when enabled by the control module 186 via control information 190, unsecures each encoded data slice 218 based on slice de-security information (e.g., the compliment of the slice security information discussed with reference to FIG. 6) received as control information 190 from the control module 186. The slice de-security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 218, it decrypts each verified encoded data slice, and decompresses each decrypted encoded data slice to produce slice encoded data. When the inverse per slice security processing module 202 is not enabled, it passes the encoded data slices 218 as the sliced encoded data or is bypassed such that the retrieved encoded data slices 218 are provided as the sliced encoded data.

The de-slicing module 204 de-slices the sliced encoded data into encoded data segments in accordance with a pillar width of the error correction encoding parameters received as control information 190 from a control module 186. For example, if the pillar width is five, the de-slicing module de-slices a set of five encoded data slices into an encoded data segment. Alternatively, the encoded data segment may include just three encoded data slices (e.g., when the decode threshold is 3).

The error decoding module 206 decodes the encoded data segments in accordance with error correction decoding parameters received as control information 190 from the control module 186 to produce secure data segments. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments based on segment security information received as control information 190 from the control module 186. The segment security information includes data decompression, decryption, de-watermarking, integrity check (e.g., CRC, etc.) verification, and/or any other type of digital security. For example, when the inverse segment security processing module is enabled, it verifies integrity information (e.g., a CRC value) of each secure data segment, it decrypts each verified secured data segment, and decompresses each decrypted secure data segment to produce a data segment 152. When the inverse segment security processing module 208 is not enabled, it passes the decoded data segment 152 as the data segment or is bypassed. The de-segmenting processing module 210 aggregates the data segments 152 into the data 92 in accordance with control information 190 from the control module 186.

Figure 27:
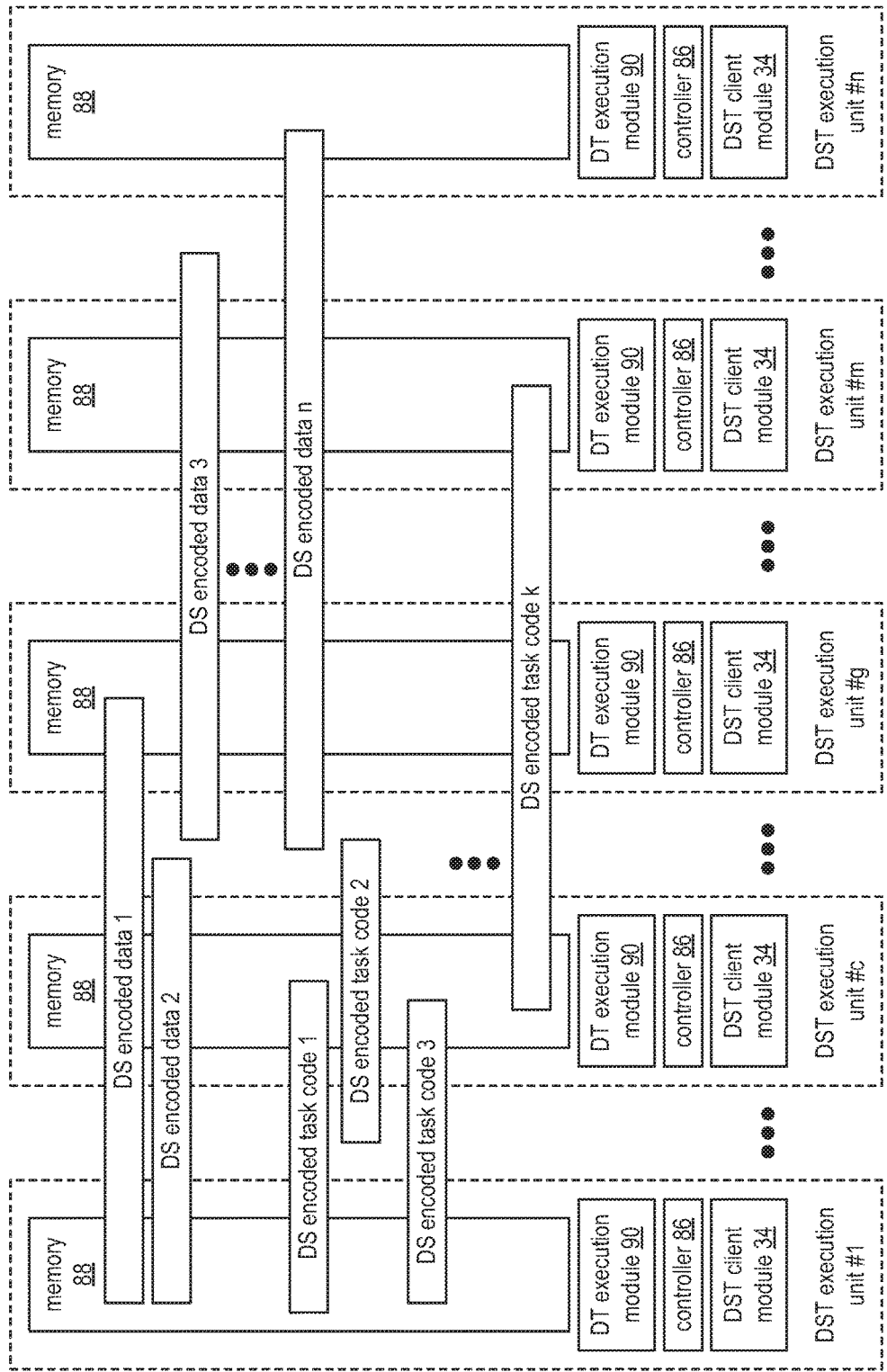
FIG. 27 is a schematic block diagram of an example of a distributed storage and task processing network (DSTN) module storing a plurality of data and a plurality of task codes in accordance with the present invention.

FIG. 27 is a schematic block diagram of an example of a distributed storage and task processing network (DSTN) module that includes a plurality of distributed storage and task (DST) execution units (#1 through #n, where, for example, n is an integer greater than or equal to three). Each of the DST execution units includes a DST client module 34, a controller 86, one or more DT (distributed task) execution modules 90, and memory 88.

In this example, the DSTN module stores, in the memory of the DST execution units, a plurality of DS (dispersed storage) encoded data (e.g., 1 through n, where n is an integer greater than or equal to two) and stores a plurality of DS encoded task codes (e.g., 1 through k, where k is an integer greater than or equal to two). The DS encoded data may be encoded in accordance with one or more examples described with reference to FIGS. 3-19 (e.g., organized in slice groupings) or encoded in accordance with one or more examples described with reference to FIGS. 20-26 (e.g., organized in pillar groups). The data that is encoded into the DS encoded data may be of any size and/or of any content. For example, the data may be one or more digital books, a copy of a company's emails, a large-scale Internet search, a video security file, one or more entertainment video files (e.g., television programs, movies, etc.), data files, and/or any other large amount of data (e.g., greater than a few Terabytes).

The tasks that are encoded into the DS encoded task code may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. The tasks may be encoded into the DS encoded task code in accordance with one or more examples described with reference to FIGS. 3-19 (e.g., organized in slice groupings) or encoded in accordance with one or more examples described with reference to FIGS. 20-26 (e.g., organized in pillar groups).

In an example of operation, a DST client module of a user device or of a DST processing unit issues a DST request to the DSTN module. The DST request may include a request to retrieve stored data, or a portion thereof, may include a request to store data that is included with the DST request, may include a request to perform one or more tasks on stored data, may include a request to perform one or more tasks on data included with the DST request, etc. In the cases where the DST request includes a request to store data or to retrieve data, the client module and/or the DSTN module processes the request as previously discussed with reference to one or more of FIGS. 3-19 (e.g., slice groupings) and/or 20-26 (e.g., pillar groupings). In the case where the DST request includes a request to perform one or more tasks on data included with the DST request, the DST client module and/or the DSTN module process the DST request as previously discussed with reference to one or more of FIGS. 3-19.

In the case where the DST request includes a request to perform one or more tasks on stored data, the DST client module and/or the DSTN module processes the DST request as will be described with reference to one or more of FIGS. 28-39. In general, the DST client module identifies data and one or more tasks for the DSTN module to execute upon the identified data. The DST request may be for a one-time execution of the task or for an on-going execution of the task. As an example of the latter, as a company generates daily emails, the DST request may be to daily search new emails for inappropriate content and, if found, record the content, the email sender(s), the email recipient(s), email routing information, notify human resources of the identified email, etc.

Figure 28:
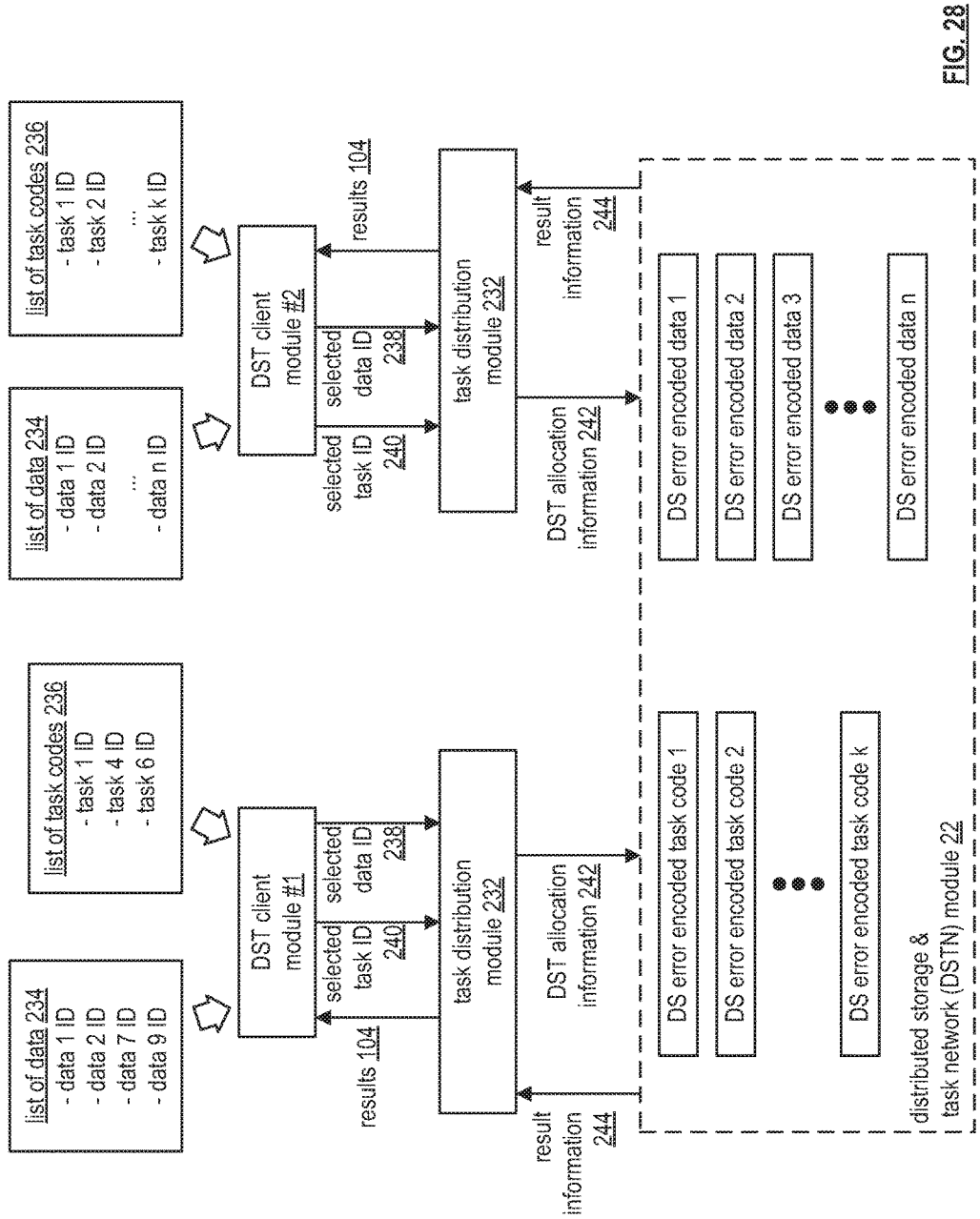
FIG. 28 is a schematic block diagram of an example of the distributed computing system performing tasks on stored data in accordance with the present invention.

FIG. 28 is a schematic block diagram of an example of a distributed computing system performing tasks on stored data. In this example, two distributed storage and task (DST) client modules 1-2 are shown: the first may be associated with a user device and the second may be associated with a DST processing unit or a high priority user device (e.g., high priority clearance user, system administrator, etc.). Each DST client module includes a list of stored data 234 and a list of tasks codes 236. The list of stored data 234 includes one or more entries of data identifying information, where each entry identifies data stored in the DSTN module 22. The data identifying information (e.g., data ID) includes one or more of a data file name, a data file directory listing, DSTN addressing information of the data, a data object identifier, etc. The list of tasks 236 includes one or more entries of task code identifying information, when each entry identifies task codes stored in the DSTN module 22. The task code identifying information (e.g., task ID) includes one or more of a task file name, a task file directory listing, DSTN addressing information of the task, another type of identifier to identify the task, etc.

As shown, the list of data 234 and the list of tasks 236 are each smaller in number of entries for the first DST client module than the corresponding lists of the second DST client module. This may occur because the user device associated with the first DST client module has fewer privileges in the distributed computing system than the device associated with the second DST client module. Alternatively, this may occur because the user device associated with the first DST client module serves fewer users than the device associated with the second DST client module and is restricted by the distributed computing system accordingly. As yet another alternative, this may occur through no restraints by the distributed computing system, it just occurred because the operator of the user device associated with the first DST client module has selected fewer data and/or fewer tasks than the operator of the device associated with the second DST client module.

In an example of operation, the first DST client module selects one or more data entries 238 and one or more tasks 240 from its respective lists (e.g., selected data ID and selected task ID). The first DST client module sends its selections to a task distribution module 232. The task distribution module 232 may be within a stand-alone device of the distributed computing system, may be within the user device that contains the first DST client module, or may be within the DSTN module 22.

Regardless of the task distribution module's location, it generates DST allocation information 242 from the selected task ID 240 and the selected data ID 238. The DST allocation information 242 includes data partitioning information, task execution information, and/or intermediate result information. The task distribution module 232 sends the DST allocation information 242 to the DSTN module 22. Note that one or more examples of the DST allocation information will be discussed with reference to one or more of FIGS. 29-39.

The DSTN module 22 interprets the DST allocation information 242 to identify the stored DS encoded data (e.g., DS error encoded data 2) and to identify the stored DS error encoded task code (e.g., DS error encoded task code 1). In addition, the DSTN module 22 interprets the DST allocation information 242 to determine how the data is to be partitioned and how the task is to be partitioned. The DSTN module 22 also determines whether the selected DS error encoded data 238 needs to be converted from pillar grouping to slice grouping. If so, the DSTN module 22 converts the selected DS error encoded data into slice groupings and stores the slice grouping DS error encoded data by overwriting the pillar grouping DS error encoded data or by storing it in a different location in the memory of the DSTN module 22 (i.e., does not overwrite the pillar grouping DS encoded data).

The DSTN module 22 partitions the data and the task as indicated in the DST allocation information 242 and sends the portions to selected DST execution units of the DSTN module 22. Each of the selected DST execution units performs its partial task(s) on its slice groupings to produce partial results. The DSTN module 22 collects the partial results from the selected DST execution units and provides them, as result information 244, to the task distribution module. The result information 244 may be the collected partial results, one or more final results as produced by the DSTN module 22 from processing the partial results in accordance with the DST allocation information 242, or one or more intermediate results as produced by the DSTN module 22 from processing the partial results in accordance with the DST allocation information 242.

The task distribution module 232 receives the result information 244 and provides one or more final results 104 therefrom to the first DST client module. The final result(s) 104 may be result information 244 or a result(s) of the task distribution module's processing of the result information 244.

In concurrence with processing the selected task of the first DST client module, the distributed computing system may process the selected task(s) of the second DST client module on the selected data(s) of the second DST client module. Alternatively, the distributed computing system may process the second DST client module's request subsequent to, or preceding, that of the first DST client module. Regardless of the ordering and/or parallel processing of the DST client module requests, the second DST client module provides its selected data 238 and selected task 240 to a task distribution module 232. If the task distribution module 232 is a separate device of the distributed computing system or within the DSTN module, the task distribution modules 232 coupled to the first and second DST client modules may be the same module. The task distribution module 232 processes the request of the second DST client module in a similar manner as it processed the request of the first DST client module.

Figure 29:
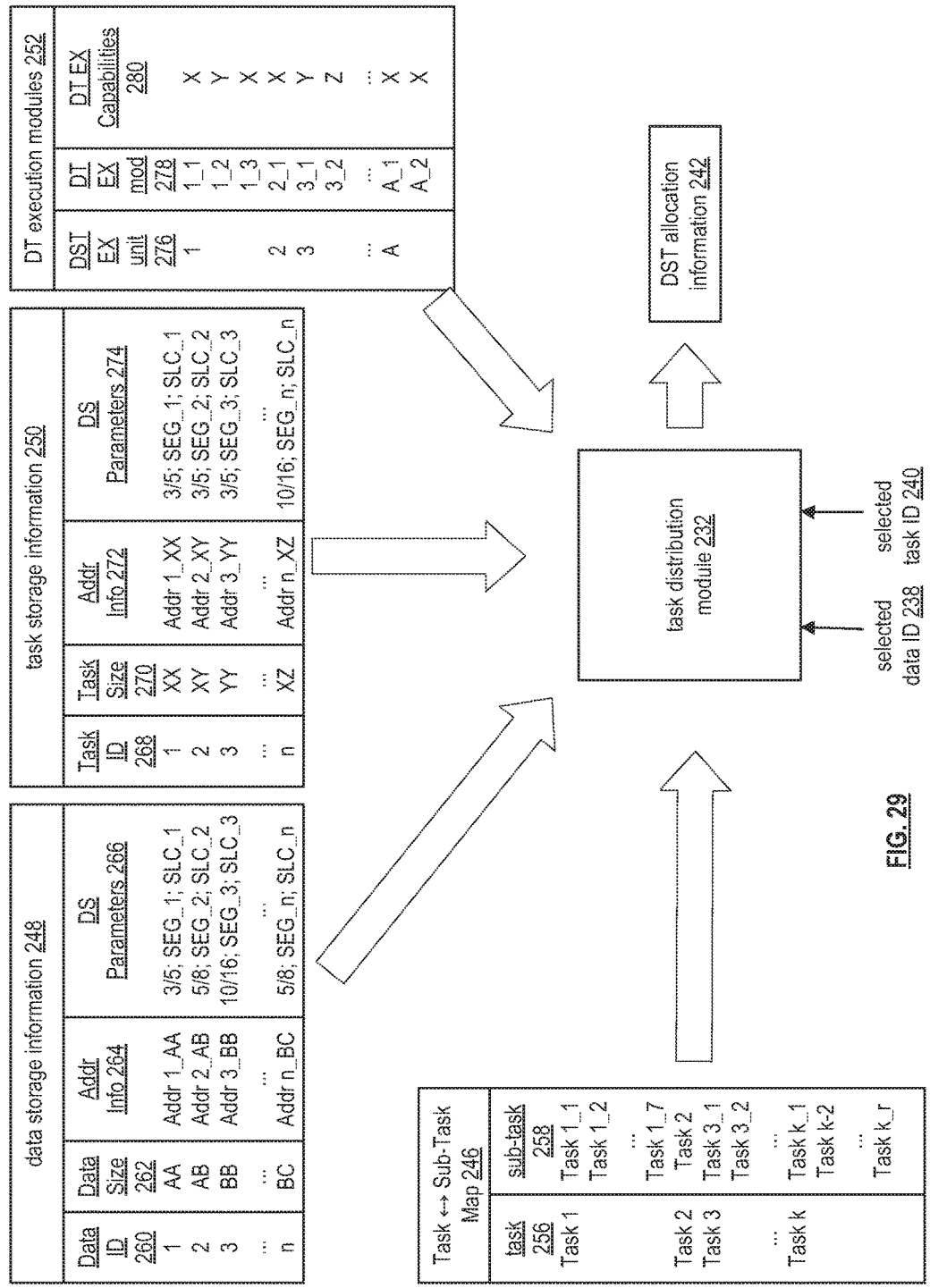
FIG. 29 is a schematic block diagram of an embodiment of a task distribution module facilitating the example of FIG. 28 in accordance with the present invention.

FIG. 29 is a schematic block diagram of an embodiment of a task distribution module 232 facilitating the example of FIG. 28. The task distribution module 232 includes a plurality of tables it uses to generate distributed storage and task (DST) allocation information 242 for selected data and selected tasks received from a DST client module. The tables include data storage information 248, task storage information 250, distributed task (DT) execution module information 252, and task ⇔ sub-task mapping information 246.

The data storage information table 248 includes a data identification (ID) field 260, a data size field 262, an addressing information field 264, distributed storage (DS) information 266, and may further include other information regarding the data, how it is stored, and/or how it can be processed. For example, DS encoded data #1 has a data ID of 1, a data size of AA (e.g., a byte size of a few Terabytes or more), addressing information of Addr_1_AA, and DS parameters of 3/5; SEG_1; and SLC_1. In this example, the addressing information may be a virtual address corresponding to the virtual address of the first storage word (e.g., one or more bytes) of the data and information on how to calculate the other addresses, may be a range of virtual addresses for the storage words of the data, physical addresses of the first storage word or the storage words of the data, may be a list of slice names of the encoded data slices of the data, etc. The DS parameters may include identity of an error encoding scheme, decode threshold/pillar width (e.g., 3/5 for the first data entry), segment security information (e.g., SEG_1), per slice security information (e.g., SLC_1), and/or any other information regarding how the data was encoded into data slices.

The task storage information table 250 includes a task identification (ID) field 268, a task size field 270, an addressing information field 272, distributed storage (DS) information 274, and may further include other information regarding the task, how it is stored, and/or how it can be used to process data. For example, DS encoded task #2 has a task ID of 2, a task size of XY, addressing information of Addr_2_XY, and DS parameters of 3/5; SEG_2; and SLC_2. In this example, the addressing information may be a virtual address corresponding to the virtual address of the first storage word (e.g., one or more bytes) of the task and information on how to calculate the other addresses, may be a range of virtual addresses for the storage words of the task, physical addresses of the first storage word or the storage words of the task, may be a list of slices names of the encoded slices of the task code, etc. The DS parameters may include identity of an error encoding scheme, decode threshold/pillar width (e.g., 3/5 for the first data entry), segment security information (e.g., SEG_2), per slice security information (e.g., SLC_2), and/or any other information regarding how the task was encoded into encoded task slices. Note that the segment and/or the per-slice security information include a type of encryption (if enabled), a type of compression (if enabled), watermarking information (if enabled), and/or an integrity check scheme (if enabled).

The task ⇔ sub-task mapping information table 246 includes a task field 256 and a sub-task field 258. The task field 256 identifies a task stored in the memory of a distributed storage and task network (DSTN) module and the corresponding sub-task fields 258 indicates whether the task includes sub-tasks and, if so, how many and if any of the sub-tasks are ordered. In this example, the task ⇔ sub-task mapping information table 246 includes an entry for each task stored in memory of the DSTN module (e.g., task 1 through task k). In particular, this example indicates that task 1 includes 7 sub-tasks; task 2 does not include sub-tasks, and task k includes r number of sub-tasks (where r is an integer greater than or equal to two).

The DT execution module table 252 includes a DST execution unit ID field 276, a DT execution module ID field 278, and a DT execution module capabilities field 280. The DST execution unit ID field 276 includes the identity of DST units in the DSTN module. The DT execution module ID field 278 includes the identity of each DT execution unit in each DST unit. For example, DST unit 1 includes three DT executions modules (e.g., 1_1, 1_2, and 1_3). The DT execution capabilities field 280 includes identity of the capabilities of the corresponding DT execution unit. For example, DT execution module 1_1 includes capabilities X, where X includes one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, memory information (e.g., type, size, availability, etc.), and/or any information germane to executing one or more tasks.

From these tables, the task distribution module 232 generates the DST allocation information 242 to indicate where the data is stored, how to partition the data, where the task is stored, how to partition the task, which DT execution units should perform which partial task on which data partitions, where and how intermediate results are to be stored, etc. If multiple tasks are being performed on the same data or different data, the task distribution module factors such information into its generation of the DST allocation information.

Figure 30:
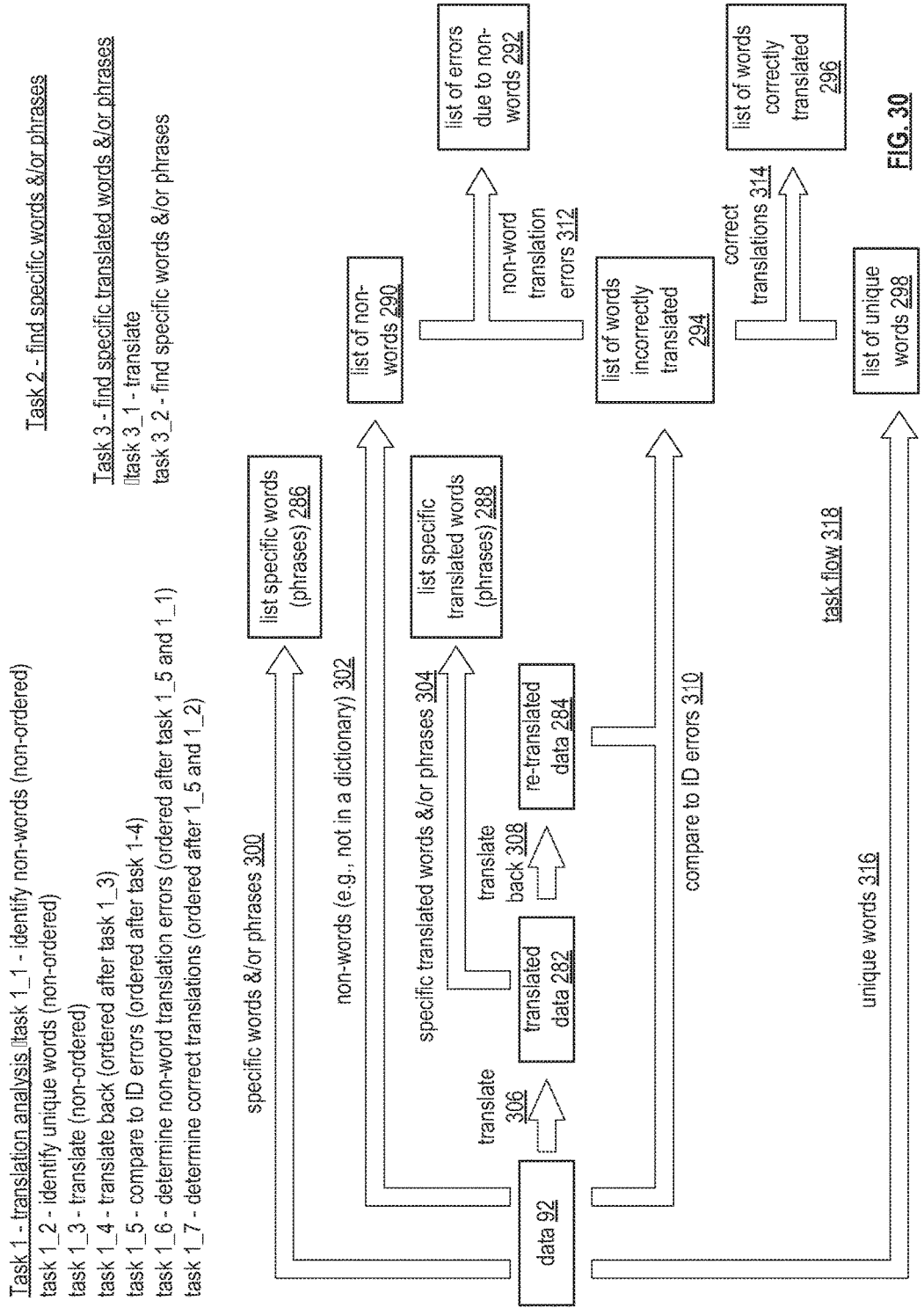
FIG. 30 is a diagram of a specific example of the distributed computing system performing tasks on stored data in accordance with the present invention.

FIG. 30 is a diagram of a specific example of a distributed computing system performing tasks on stored data as a task flow 318. In this example, selected data 92 is data 2 and selected tasks are tasks 1, 2, and 3. Task 1 corresponds to analyzing translation of data from one language to another (e.g., human language or computer language); task 2 corresponds to finding specific words and/or phrases in the data; and task 3 corresponds to finding specific translated words and/or phrases in translated data.

In this example, task 1 includes 7 sub-tasks: task 1_1—identify non-words (non-ordered); task 1_2—identify unique words (non-ordered); task 1_3—translate (non-ordered); task 1_4—translate back (ordered after task 1_3); task 1_5—compare to ID errors (ordered after task 1-4); task 1_6—determine non-word translation errors (ordered after task 1_5 and 1_1); and task 1_7—determine correct translations (ordered after 1_5 and 1_2). The sub-task further indicates whether they are an ordered task (i.e., are dependent on the outcome of another task) or non-order (i.e., are independent of the outcome of another task). Task 2 does not include sub-tasks and task 3 includes two sub-tasks: task 3_1 translate; and task 3_2 find specific word or phrase in translated data.

In general, the three tasks collectively are selected to analyze data for translation accuracies, translation errors, translation anomalies, occurrence of specific words or phrases in the data, and occurrence of specific words or phrases on the translated data. Graphically, the data 92 is translated 306 into translated data 282; is analyzed for specific words and/or phrases 300 to produce a list of specific words and/or phrases 286; is analyzed for non-words 302 (e.g., not in a reference dictionary) to produce a list of non-words 290; and is analyzed for unique words 316 included in the data 92 (i.e., how many different words are included in the data) to produce a list of unique words 298. Each of these tasks is independent of each other and can therefore be processed in parallel if desired.

The translated data 282 is analyzed (e.g., sub-task 3_2) for specific translated words and/or phrases 304 to produce a list of specific translated words and/or phrases 288. The translated data 282 is translated back 308 (e.g., sub-task 1_4) into the language of the original data to produce re-translated data 284. These two tasks are dependent on the translate task (e.g., task 1_3) and thus must be ordered after the translation task, which may be in a pipelined ordering or a serial ordering. The re-translated data 284 is then compared 310 with the original data 92 to find words and/or phrases that did not translate (one way and/or the other) properly to produce a list of incorrectly translated words 294. As such, the comparing task (e.g., sub-task 1_5) 310 is ordered after the translation 306 and re-translation tasks 308 (e.g., sub-tasks 1_3 and 1_4).

The list of words incorrectly translated 294 is compared 312 to the list of non-words 290 to identify words that were not properly translated because the words are non-words to produce a list of errors due to non-words 292. In addition, the list of words incorrectly translated 294 is compared 314 to the list of unique words 298 to identify unique words that were properly translated to produce a list of correctly translated words 296. The comparison may also identify unique words that were not properly translated to produce a list of unique words that were not properly translated. Note that each list of words (e.g., specific words and/or phrases, non-words, unique words, translated words and/or phrases, etc.,) may include the word and/or phrase, how many times it is used, where in the data it is used, and/or any other information requested regarding a word and/or phrase.

Figure 31:
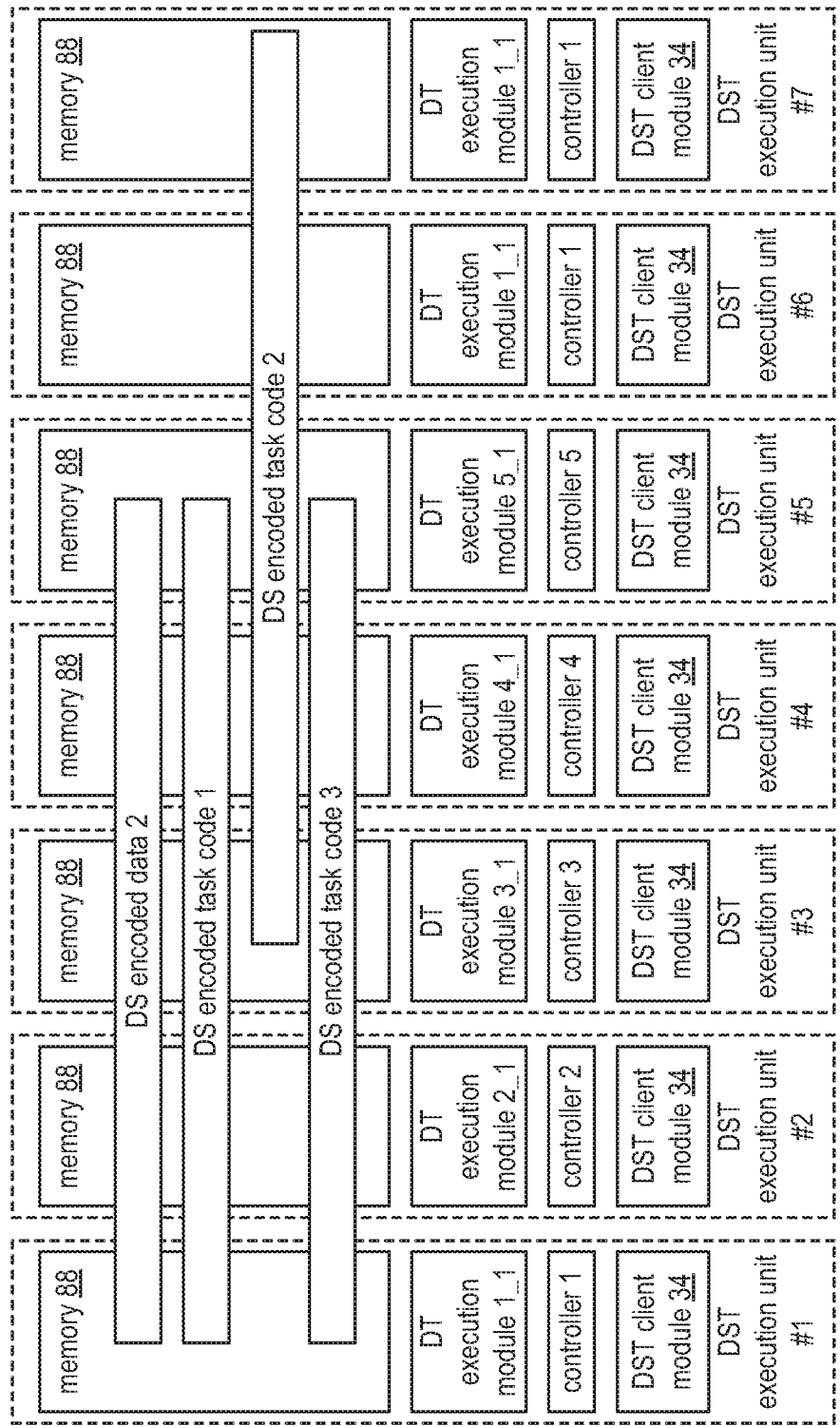
FIG. 31 is a schematic block diagram of an example of a distributed storage and task processing network (DSTN) module storing data and task codes for the example of FIG. 30 in accordance with the present invention.

FIG. 31 is a schematic block diagram of an example of a distributed storage and task processing network (DSTN) module storing data and task codes for the example of FIG. 30. As shown, DS encoded data 2 is stored as encoded data slices across the memory (e.g., stored in memories 88) of DST execution units 1-5; the DS encoded task code 1 (of task 1) and DS encoded task 3 are stored as encoded task slices across the memory of DST execution units 1-5; and DS encoded task code 2 (of task 2) is stored as encoded task slices across the memory of DST execution units 3-7. As indicated in the data storage information table and the task storage information table of FIG. 29, the respective data/task has DS parameters of 3/5 for their decode threshold/pillar width; hence spanning the memory of five DST execution units.

FIG. 32 is a diagram of an example of distributed storage and task (DST) allocation information 242 for the example of FIG. 30. The DST allocation information 242 includes data partitioning information 320, task execution information 322, and intermediate result information 324. The data partitioning information 320 includes the data identifier (ID), the number of partitions to split the data into, address information for each data partition, and whether the DS encoded data has to be transformed from pillar grouping to slice grouping. The task execution information 322 includes tabular information having a task identification field 326, a task ordering field 328, a data partition field ID 330, and a set of DT execution modules 332 to use for the distributed task processing per data partition. The intermediate result information 324 includes tabular information having a name ID field 334, an ID of the DST execution unit assigned to process the corresponding intermediate result 336, a scratch pad storage field 338, and an intermediate result storage field 340.

Continuing with the example of FIG. 30, where tasks 1-3 are to be distributedly performed on data 2, the data partitioning information includes the ID of data 2. In addition, the task distribution module determines whether the DS encoded data 2 is in the proper format for distributed computing (e.g., was stored as slice groupings). If not, the task distribution module indicates that the DS encoded data 2 format needs to be changed from the pillar grouping format to the slice grouping format, which will be done by the DSTN module. In addition, the task distribution module determines the number of partitions to divide the data into (e.g., 2_1 through 2_z) and addressing information for each partition.

The task distribution module generates an entry in the task execution information section for each sub-task to be performed. For example, task 1_1 (e.g., identify non-words on the data) has no task ordering (i.e., is independent of the results of other sub-tasks), is to be performed on data partitions 2_1 through 2_z by DT execution modules 1_1, 2_1, 3_1, 4_1, and 5_1. For instance, DT execution modules 1_1, 2_1, 3_1, 4_1, and 5_1 search for non-words in data partitions 2_1 through 2_z to produce task 1_1 intermediate results (R1-1, which is a list of non-words). Task 1_2 (e.g., identify unique words) has similar task execution information as task 1_1 to produce task 1_2 intermediate results (R1-2, which is the list of unique words).

Task 1_3 (e.g., translate) includes task execution information as being non-ordered (i.e., is independent), having DT execution modules 1_1, 2_1, 3_1, 4_1, and 5_1 translate data partitions 2_1 through 2_4 and having DT execution modules 1_2, 2_2, 3_2, 4_2, and 5_2 translate data partitions 2_5 through 2_z to produce task 1_3 intermediate results (R1-3, which is the translated data). In this example, the data partitions are grouped, where different sets of DT execution modules perform a distributed sub-task (or task) on each data partition group, which allows for further parallel processing.

Task 1_4 (e.g., translate back) is ordered after task 1_3 and is to be executed on task 1_3's intermediate result (e.g., R1-3_1) (e.g., the translated data). DT execution modules 1_1, 2_1, 3_1, 4_1, and 5_1 are allocated to translate back task 1_3 intermediate result partitions R1-3_1 through R1-3_4 and DT execution modules 1_2, 2_2, 6_1, 7_1, and 7_2 are allocated to translate back task 1_3 intermediate result partitions R1-3_5 through R1-3_z to produce task 1_4 intermediate results (R1-4, which is the translated back data).

Task 1_5 (e.g., compare data and translated data to identify translation errors) is ordered after task 1_4 and is to be executed on task 1_4's intermediate results (R4-1) and on the data. DT execution modules 1_1, 2_1, 3_1, 4_1, and 5_1 are allocated to compare the data partitions (2_1 through 2_z) with partitions of task 1-4 intermediate results partitions R1-4_1 through R1-4_z to produce task 1_5 intermediate results (R1-5, which is the list words translated incorrectly).

Task 1_6 (e.g., determine non-word translation errors) is ordered after tasks 1_1 and 1_5 and is to be executed on tasks 1_1's and 1_5's intermediate results (R1-1 and R1-5). DT execution modules 1_1, 2_1, 3_1, 4_1, and 5_1 are allocated to compare the partitions of task 1_1 intermediate results (R1-1_1 through R1-1_z) with partitions of task 1-5 intermediate results partitions (R1-5_1 through R1-5_z) to produce task 1_6 intermediate results (R1-6, which is the list translation errors due to non-words).

Task 1_7 (e.g., determine words correctly translated) is ordered after tasks 1_2 and 1_5 and is to be executed on tasks 1_2's and 1_5's intermediate results (R1-1 and R1-5). DT execution modules 1_2, 2_2, 3_2, 4_2, and 5_2 are allocated to compare the partitions of task 1_2 intermediate results (R1-2_1 through R1-2_z) with partitions of task 1-5 intermediate results partitions (R1-5_1 through R1-5_z) to produce task 1_7 intermediate results (R1-7, which is the list of correctly translated words).

Task 2 (e.g., find specific words and/or phrases) has no task ordering (i.e., is independent of the results of other sub-tasks), is to be performed on data partitions 2_1 through 2_z by DT execution modules 3_1, 4_1, 5_1, 6_1, and 7_1. For instance, DT execution modules 3_1, 4_1, 5_1, 6_1, and 7_1 search for specific words and/or phrases in data partitions 2_1 through 2_z to produce task 2 intermediate results (R2, which is a list of specific words and/or phrases).

Task 3_2 (e.g., find specific translated words and/or phrases) is ordered after task 1_3 (e.g., translate) is to be performed on partitions R1-3_1 through R1-3_z by DT execution modules 1_2, 2_2, 3_2, 4_2, and 5_2. For instance, DT execution modules 1_2, 2_2, 3_2, 4_2, and 5_2 search for specific translated words and/or phrases in the partitions of the translated data (R1-3_1 through R1-3_z) to produce task 3_2 intermediate results (R3-2, which is a list of specific translated words and/or phrases).

For each task, the intermediate result information indicates which DST unit is responsible for overseeing execution of the task and, if needed, processing the partial results generated by the set of allocated DT execution units. In addition, the intermediate result information indicates a scratch pad memory for the task and where the corresponding intermediate results are to be stored. For example, for intermediate result R1-1 (the intermediate result of task 1_1), DST unit 1 is responsible for overseeing execution of the task 1_1 and coordinates storage of the intermediate result as encoded intermediate result slices stored in memory of DST execution units 1-5. In general, the scratch pad is for storing non-DS encoded intermediate results and the intermediate result storage is for storing DS encoded intermediate results.

FIGS. 33-38 are schematic block diagrams of the distributed storage and task network (DSTN) module performing the example of FIG. 30. In FIG. 33, the DSTN module accesses the data 92 and partitions it into a plurality of partitions 1-z in accordance with distributed storage and task network (DST) allocation information. For each data partition, the DSTN identifies a set of its DT (distributed task) execution modules 90 to perform the task (e.g., identify non-words (i.e., not in a reference dictionary) within the data partition) in accordance with the DST allocation information. From data partition to data partition, the set of DT execution modules 90 may be the same, different, or a combination thereof (e.g., some data partitions use the same set while other data partitions use different sets).

For the first data partition, the first set of DT execution modules (e.g., 1_1, 2_1, 3_1, 4_1, and 5_1 per the DST allocation information of FIG. 32) executes task 1_1 to produce a first partial result 102 of non-words found in the first data partition. The second set of DT execution modules (e.g., 1_1, 2_1, 3_1, 4_1, and 5_1 per the DST allocation information of FIG. 32) executes task 1_1 to produce a second partial result 102 of non-words found in the second data partition. The sets of DT execution modules (as per the DST allocation information) perform task 1_1 on the data partitions until the "z" set of DT execution modules performs task 1_1 on the "zth" data partition to produce a "zth" partial result 102 of non-words found in the "zth" data partition.

As indicated in the DST allocation information of FIG. 32, DST execution unit 1 is assigned to process the first through "zth" partial results to produce the first intermediate result (R1-1), which is a list of non-words found in the data. For instance, each set of DT execution modules 90 stores its respective partial result in the scratchpad memory of DST execution unit 1 (which is identified in the DST allocation or may be determined by DST execution unit 1). A processing module of DST execution 1 is engaged to aggregate the first through "zth" partial results to produce the first intermediate result (e.g., R1_1). The processing module stores the first intermediate result as non-DS error encoded data in the scratchpad memory or in another section of memory of DST execution unit 1.

DST execution unit 1 engages its DST client module to slice grouping based DS error encode the first intermediate result (e.g., the list of non-words). To begin the encoding, the DST client module determines whether the list of non-words is of a sufficient size to partition (e.g., greater than a Terra-Byte). If yes, it partitions the first intermediate result (R1-1) into a plurality of partitions (e.g., R1-1_1 through R1-1_m). If the first intermediate result is not of sufficient size to partition, it is not partitioned.

For each partition of the first intermediate result, or for the first intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

In FIG. 34, the DSTN module is performing task 1_2 (e.g., find unique words) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_2 in accordance with the DST allocation information. From data partition to data partition, the set of DT execution modules may be the same, different, or a combination thereof. For the data partitions, the allocated set of DT execution modules executes task 1_2 to produce a partial results (e.g., $1^{st}$ through "zth") of unique words found in the data partitions.

As indicated in the DST allocation information of FIG. 32, DST execution unit 1 is assigned to process the first through "zth" partial results 102 of task 1_2 to produce the second intermediate result (R1-2), which is a list of unique words found in the data 92. The processing module of DST execution 1 is engaged to aggregate the first through "zth" partial results of unique words to produce the second intermediate result. The processing module stores the second intermediate result as non-DS error encoded data in the scratchpad memory or in another section of memory of DST execution unit 1.

DST execution unit 1 engages its DST client module to slice grouping based DS error encode the second intermediate result (e.g., the list of non-words). To begin the encoding, the DST client module determines whether the list of unique words is of a sufficient size to partition (e.g., greater than a Terra-Byte). If yes, it partitions the second intermediate result (R1-2) into a plurality of partitions (e.g., R1-2_1 through R1-2_m). If the second intermediate result is not of sufficient size to partition, it is not partitioned.

For each partition of the second intermediate result, or for the second intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

In FIG. 35, the DSTN module is performing task 1_3 (e.g., translate) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_3 in accordance with the DST allocation information (e.g., DT execution modules 1_1, 2_1, 3_1, 4_1, and 5_1 translate data partitions 2_1 through 2_4 and DT execution modules 1_2, 2_2, 3_2, 4_2, and 5_2 translate data partitions 2_5 through 2_z). For the data partitions, the allocated set of DT execution modules 90 executes task 1_3 to produce partial results 102 (e.g., $1^{st}$ through "zth") of translated data.

As indicated in the DST allocation information of FIG. 32, DST execution unit 2 is assigned to process the first through "zth" partial results of task 1_3 to produce the third intermediate result (R1-3), which is translated data. The processing module of DST execution 2 is engaged to aggregate the first through "zth" partial results of translated data to produce the third intermediate result. The processing module stores the third intermediate result as non-DS error encoded data in the scratchpad memory or in another section of memory of DST execution unit 2.

DST execution unit 2 engages its DST client module to slice grouping based DS error encode the third intermediate result (e.g., translated data). To begin the encoding, the DST client module partitions the third intermediate result (R1-3) into a plurality of partitions (e.g., R1-3_1 through R1-3_y). For each partition of the third intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is further shown in FIG. 35, the DSTN module is performing task 1_4 (e.g., retranslate) on the translated data of the third intermediate result. To begin, the DSTN module accesses the translated data (from the scratchpad memory or from the intermediate result memory and decodes it) and partitions it into a plurality of partitions in accordance with the DST allocation information. For each partition of the third intermediate result, the DSTN identifies a set of its DT execution modules 90 to perform task 1_4 in accordance with the DST allocation information (e.g., DT execution modules 1_1, 2_1, 3_1, 4_1, and 5_1 are allocated to translate back partitions R1-3_1 through R1-3_4 and DT execution modules 1_2, 2_2, 6_1, 7_1, and 7_2 are allocated to translate back partitions R1-3_5 through R1-3_z). For the partitions, the allocated set of DT execution modules executes task 1_4 to produce partial results 102 (e.g., 1$^{st}$ through "zth") of re-translated data.

As indicated in the DST allocation information of FIG. 32, DST execution unit 3 is assigned to process the first through "zth" partial results of task 1_4 to produce the fourth intermediate result (R1-4), which is retranslated data. The processing module of DST execution 3 is engaged to aggregate the first through "zth" partial results of retranslated data to produce the fourth intermediate result. The processing module stores the fourth intermediate result as non-DS error encoded data in the scratchpad memory or in another section of memory of DST execution unit 3.

DST execution unit 3 engages its DST client module to slice grouping based DS error encode the fourth intermediate result (e.g., retranslated data). To begin the encoding, the DST client module partitions the fourth intermediate result (R1-4) into a plurality of partitions (e.g., R1-4_1 through R1-4_z). For each partition of the fourth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

Figure 36:
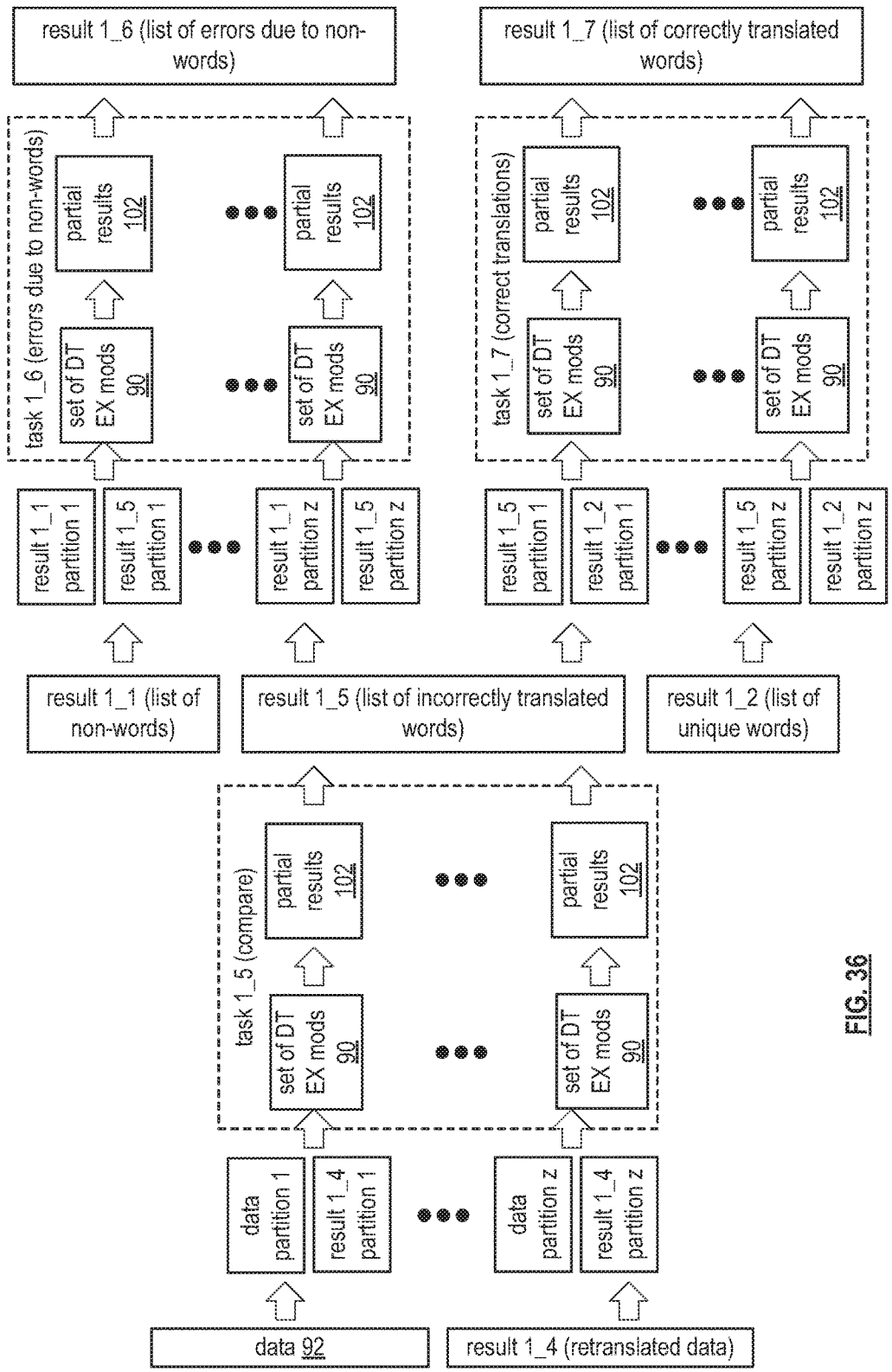

In FIG. 36, a distributed storage and task network (DSTN) module is performing task 1_5 (e.g., compare) on data 92 and retranslated data of FIG. 35. To begin, the DSTN module accesses the data 92 and partitions it into a plurality of partitions in accordance with the DST allocation information or it may use the data partitions of task 1_1 if the partitioning is the same. The DSTN module also accesses the retranslated data from the scratchpad memory, or from the intermediate result memory and decodes it, and partitions it into a plurality of partitions in accordance with the DST allocation information. The number of partitions of the retranslated data corresponds to the number of partitions of the data.

For each pair of partitions (e.g., data partition 1 and retranslated data partition 1), the DSTN identifies a set of its DT execution modules 90 to perform task 1_5 in accordance with the DST allocation information (e.g., DT execution modules 1_1, 2_1, 3_1, 4_1, and 5_1). For each pair of partitions, the allocated set of DT execution modules executes task 1_5 to produce partial results 102 (e.g., 1$^{st}$ through "zth") of a list of incorrectly translated words and/or phrases.

As indicated in the DST allocation information of FIG. 32, DST execution unit 1 is assigned to process the first through "zth" partial results of task 1_5 to produce the fifth intermediate result (R1-5), which is the list of incorrectly translated words and/or phrases. In particular, the processing module of DST execution 1 is engaged to aggregate the first through "zth" partial results of the list of incorrectly translated words and/or phrases to produce the fifth intermediate result. The processing module stores the fifth intermediate result as non-DS error encoded data in the scratchpad memory or in another section of memory of DST execution unit 1.

DST execution unit 1 engages its DST client module to slice grouping based DS error encode the fifth intermediate result. To begin the encoding, the DST client module partitions the fifth intermediate result (R1-5) into a plurality of partitions (e.g., R1-5_1 through R1-5_z). For each partition of the fifth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5 per the DST allocation information).

As is further shown in FIG. 36, the DSTN module is performing task 1_6 (e.g., translation errors due to non-words) on the list of incorrectly translated words and/or phrases (e.g., the fifth intermediate result R1-5) and the list of non-words (e.g., the first intermediate result R1-1). To begin, the DSTN module accesses the lists and partitions them into a corresponding number of partitions.

For each pair of partitions (e.g., partition R1-1_1 and partition R1-5_1), the DSTN identifies a set of its DT execution modules 90 to perform task 1_6 in accordance with the DST allocation information (e.g., DT execution modules 1_1, 2_1, 3_1, 4_1, and 5_1). For each pair of partitions, the allocated set of DT execution modules executes task 1_6 to produce partial results 102 (e.g., 1$^{st}$ through "zth") of a list of incorrectly translated words and/or phrases due to non-words.

As indicated in the DST allocation information of FIG. 32, DST execution unit 2 is assigned to process the first through "zth" partial results of task 1_6 to produce the sixth intermediate result (R1-6), which is the list of incorrectly translated words and/or phrases due to non-words. In particular, the processing module of DST execution 2 is engaged to aggregate the first through "zth" partial results of the list of incorrectly translated words and/or phrases due to non-words to produce the sixth intermediate result. The processing module stores the sixth intermediate result as non-DS error encoded data in the scratchpad memory or in another section of memory of DST execution unit 2.

DST execution unit 2 engages its DST client module to slice grouping based DS error encode the sixth intermediate result. To begin the encoding, the DST client module partitions the sixth intermediate result (R1-6) into a plurality of partitions (e.g., R1-6_1 through R1-6_z). For each partition of the sixth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is still further shown in FIG. 36, the DSTN module is performing task 1_7 (e.g., correctly translated words and/or phrases) on the list of incorrectly translated words and/or phrases (e.g., the fifth intermediate result R1-5) and the list of unique words (e.g., the second intermediate result R1-2).

To begin, the DSTN module accesses the lists and partitions them into a corresponding number of partitions.

For each pair of partitions (e.g., partition R1-2_1 and partition R1-5_1), the DSTN identifies a set of its DT execution modules 90 to perform task 1_7 in accordance with the DST allocation information (e.g., DT execution modules 1_2, 2_2, 3_2, 4_2, and 5_2). For each pair of partitions, the allocated set of DT execution modules executes task 1_7 to produce partial results 102 (e.g., $1^{st}$ through "zth") of a list of correctly translated words and/or phrases.

As indicated in the DST allocation information of FIG. 32, DST execution unit 3 is assigned to process the first through "zth" partial results of task 1_7 to produce the seventh intermediate result (R1-7), which is the list of correctly translated words and/or phrases. In particular, the processing module of DST execution 3 is engaged to aggregate the first through "zth" partial results of the list of correctly translated words and/or phrases to produce the seventh intermediate result. The processing module stores the seventh intermediate result as non-DS error encoded data in the scratchpad memory or in another section of memory of DST execution unit 3.

DST execution unit 3 engages its DST client module to slice grouping based DS error encode the seventh intermediate result. To begin the encoding, the DST client module partitions the seventh intermediate result (R1-7) into a plurality of partitions (e.g., R1-7_1 through R1-7_z). For each partition of the seventh intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

In FIG. 37, the distributed storage and task network (DSTN) module is performing task 2 (e.g., find specific words and/or phrases) on the data 92. To begin, the DSTN module accesses the data and partitions it into a plurality of partitions 1-z in accordance with the DST allocation information or it may use the data partitions of task 1_1 if the partitioning is the same. For each data partition, the DSTN identifies a set of its DT execution modules 90 to perform task 2 in accordance with the DST allocation information. From data partition to data partition, the set of DT execution modules may be the same, different, or a combination thereof. For the data partitions, the allocated set of DT execution modules executes task 2 to produce partial results 102 (e.g., $1^{st}$ through "zth") of specific words and/or phrases found in the data partitions.

As indicated in the DST allocation information of FIG. 32, DST execution unit 7 is assigned to process the first through "zth" partial results of task 2 to produce task 2 intermediate result (R2), which is a list of specific words and/or phrases found in the data. The processing module of DST execution 7 is engaged to aggregate the first through "zth" partial results of specific words and/or phrases to produce the task 2 intermediate result. The processing module stores the task 2 intermediate result as non-DS error encoded data in the scratchpad memory or in another section of memory of DST execution unit 7.

DST execution unit 7 engages its DST client module to slice grouping based DS error encode the task 2 intermediate result. To begin the encoding, the DST client module determines whether the list of specific words and/or phrases is of a sufficient size to partition (e.g., greater than a Terra-Byte). If yes, it partitions the task 2 intermediate result (R2) into a plurality of partitions (e.g., R2_1 through R2_m). If the task 2 intermediate result is not of sufficient size to partition, it is not partitioned.

For each partition of the task 2 intermediate result, or for the task 2 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, and 7).

In FIG. 38, the distributed storage and task network (DSTN) module is performing task 3 (e.g., find specific translated words and/or phrases) on the translated data (R1-3). To begin, the DSTN module accesses the translated data (from the scratchpad memory or from the intermediate result memory and decodes it) and partitions it into a plurality of partitions in accordance with the DST allocation information. For each partition, the DSTN identifies a set of its DT execution modules to perform task 3 in accordance with the DST allocation information. From partition to partition, the set of DT execution modules may be the same, different, or a combination thereof. For the partitions, the allocated set of DT execution modules 90 executes task 3 to produce partial results 102 (e.g., $1^{st}$ through "zth") of specific translated words and/or phrases found in the data partitions.

As indicated in the DST allocation information of FIG. 32, DST execution unit 5 is assigned to process the first through "zth" partial results of task 3 to produce task 3 intermediate result (R3), which is a list of specific translated words and/or phrases found in the translated data. In particular, the processing module of DST execution 5 is engaged to aggregate the first through "zth" partial results of specific translated words and/or phrases to produce the task 3 intermediate result. The processing module stores the task 3 intermediate result as non-DS error encoded data in the scratchpad memory or in another section of memory of DST execution unit 7.

DST execution unit 5 engages its DST client module to slice grouping based DS error encode the task 3 intermediate result. To begin the encoding, the DST client module determines whether the list of specific translated words and/or phrases is of a sufficient size to partition (e.g., greater than a Terra-Byte). If yes, it partitions the task 3 intermediate result (R3) into a plurality of partitions (e.g., R3_1 through R3_m). If the task 3 intermediate result is not of sufficient size to partition, it is not partitioned.

For each partition of the task 3 intermediate result, or for the task 3 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, 5, and 7).

FIG. 39 is a diagram of an example of combining result information into final results 104 for the example of FIG. 30. In this example, the result information includes the list of specific words and/or phrases found in the data (task 2 intermediate result), the list of specific translated words and/or phrases found in the data (task 3 intermediate result), the list of non-words found in the data (task 1 first intermediate result R1-1), the list of unique words found in the data (task 1 second intermediate result R1-2), the list of translation errors due to non-words (task 1 sixth intermediate result R1-6), and the list of correctly translated words and/or phrases (task 1 seventh intermediate result R1-7). The task distribution module provides the result information to the requesting DST client module as the results 104.

Figure 40A:
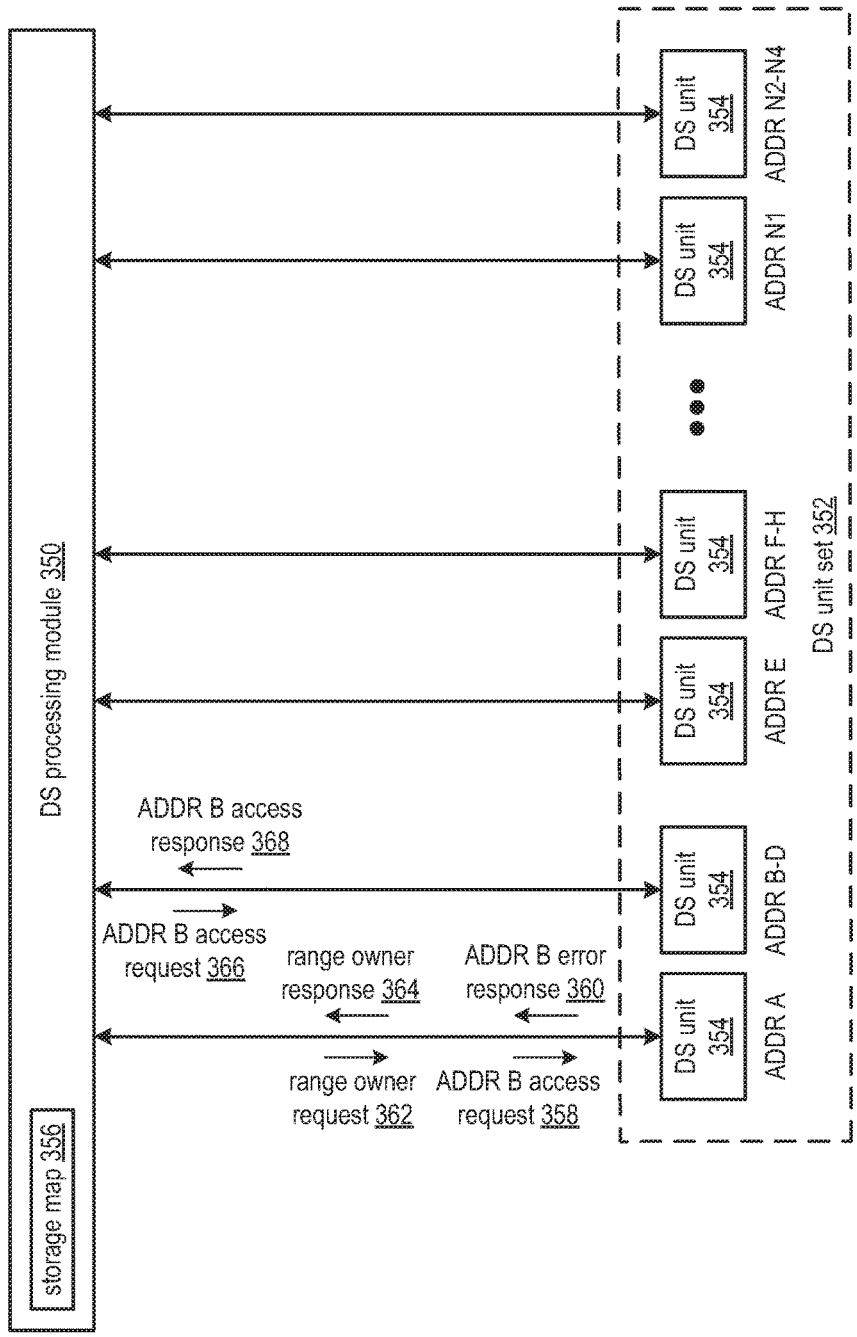
FIG. 40A is a schematic block diagram of an embodiment of a dispersed storage network (DSN) system in accordance with the present invention.

FIG. 40A is a schematic block diagram of an embodiment of a dispersed storage network (DSN) system that includes a dispersed storage (DS) processing module 350 and a DS unit set 352. The DS processing module 350 includes a memory for storage of a storage map 356. The DS processing module 350 may be implemented utilizing at least one of a DS processing unit, the distributed storage and task (DST) processing unit 16 of FIG. 1, a DST processing module, a server, a computer, a computing device, a processing module, a user device, a DS unit, a storage device, a storage server, and the DST execution unit 36 of FIG. 1. The DS unit set 352 includes a set of DS units 354. Each DS unit 354 may be implemented utilizing at least one of a storage server, a memory device, a memory module, a storage device, the DST execution unit 36 of FIG. 1, a user device, the DST processing unit 16 of FIG. 1, and a DS processing unit.

The DS unit set 352 stores one or more sets of encoded data slices, where data is encoded using a dispersed storage error coding function to produce the one or more sets of encoded data slices. Each encoded data slice of the one or more sets of encoded data slices is associated with a slice name. Each DS unit 354 of the DS unit set is affiliated with one or more DSN address ranges such that the encoded data slices that correspond to the slice names within the one or more DSN address ranges are stored in the DS unit 354. For example, encoded data slices with slice names falling in DSN address range A are stored in a first DS unit 354 of the DS unit set, where the first DS unit 354 is affiliated with the DSN address range A. As another example, as illustrated, a second DS unit 354 is affiliated with address ranges B-D, a third DS unit 354 is affiliated with address range E, a fourth DS unit 354 is affiliated with address ranges F-H, etc. through a second to last DS unit 354 affiliated with address range N1 and a last DS unit 354 affiliated with address ranges N2-N4.

The storage map 356 includes a mapping of the one or more DSN address ranges for each DS unit 354. The DS processing module 350 utilizes the storage map 356 when accessing one or more encoded data slices stored in the DS unit set 352. For example, when accessing an encoded data slice associated with a slice name within DSN address range A, the DS processing module 350 sends an access request to the first DS unit 354 when the storage map indicates that the first DS unit 354 is associated with the DSN address range A. The storage map 356 may be initially generated using a deterministic function such that DSN address ranges are evenly distributed amongst the set of DS units such that each DS unit 354 of the set of DS units is affiliated with a common number of DSN addresses of a corresponding DSN address range.

From time to time, DS unit to DSN address range affiliations may be updated. At least one of the DS processing module 350 and at least one DS unit 354 of the set of DS units may determine to update the DS unit to DSN address range affiliation. The determining may be based on one or more of detecting a storage imbalance between two DS units of the set of DS units, receiving an error message, detecting DS unit unavailability, a predetermination, interpreting a schedule, and receiving a request. For example, the first DS unit 354 determines to migrate address range B from the first DS unit 354 to the second DS unit 354 when encoded data slices stored in the first DS unit are utilizing a greater amount of storage capacity as compared to encoded data slices stored in the second DS unit. When migrating the address range B from the first DS unit 354 to the second DS unit 354, each of the first DS unit and the second DS unit update a corresponding local storage map to indicate that DSN address range B is affiliated with the second DS unit and is to be de-affiliated from the first DS unit. Alternatively, or in addition to, at least one of the first DS unit 354 and the second DS unit 354 updates the DS processing module 350 to affect updating of the storage map 356 stored within the DS processing module.

In an example of operation, the DS processing module 350 issues a DSN address range B access request 358 that includes a slice name (e.g., a read or write request for an encoded data slice associated with the slice name that falls within the DSN address range B) to the first DS unit 354 in accordance with the storage map of the DS processing module 350 (e.g., when the slice name falls within DSN address range B and the storage map indicates that the DSN address range B is affiliated with the first DS unit). The first DS unit 354 detects an addressing error by determining that the slice name of the DSN address range B access request is not affiliated with the first DS unit (e.g., since the slice name is affiliated with the second DS unit in accordance with the local storage map of the first DS unit). When detecting such an addressing error, the first DS unit 354 issues a DSN address range B error response 360 to the DS processing module 350, where the DSN address range B error response 360 includes an indicator that the encoded data slice of the slice name of the DSN address range B request is not associated with the first DS unit. When receiving the DSN address range B error response 360, the DS processing module 350 identifies a DSN address range associated with the slice name to produce an identified DSN address range. The determining includes one or more of accessing the storage map 356, initiating a query, receiving a response, and interpreting an error message. For example, the DS processing module 350 accesses the storage map 356 to identify DSN address range B as associated with the slice name.

Next, the DS processing module 350 issues a range owner request 362 to the first DS unit in accordance with the storage map 356, where the range owner request includes the identified DSN address range B. The first DS unit 354 accesses the local storage map of the first DS unit to identify one or more DS units associated with the identify DSN address range B. For instance, the first DS unit 354 identifies the second DS unit 354 as associated with the DSN address range B. The first DS unit 354 issues a range owner response 364 to the DS processing module 350, where the range owner response 364 includes identity of the second DS unit as associated with the DSN address range B. The DS processing module 350 receives the range owner response 364 and updates the storage map 356 of the DS processing module 350 to indicate that the DSN address range B is affiliated with the second DS unit 354 and is de-affiliated with the first DS unit 354.

Next, the DS processing module 350 issues another DSN address range B access request 366 that includes the slice name to the second DS unit in accordance with the storage map 356 of the DS processing module 350 (e.g., when the slice name falls within DSN address range B and the storage map indicates that the DSN address range B is affiliated with the second DS unit). The second DS unit 354 receives the DSN address range B access request 366, and upon verifying that the slice name is associated with the second DS unit based on the storage map of the second DS unit, issues a DSN address range B access response 368 to the DS processing module 350 based on the DSN address range B access request. For example, the DSN address range B access response 368 includes the encoded data slice when the DSN address range B access request 366 includes a read request. As another example, the DSN address range B access response 368 includes a status indicator when the DSN address range B access request 366 includes a write request. The status indicator may include one of a write error indicator and a write success indicator.

Figure 40B:
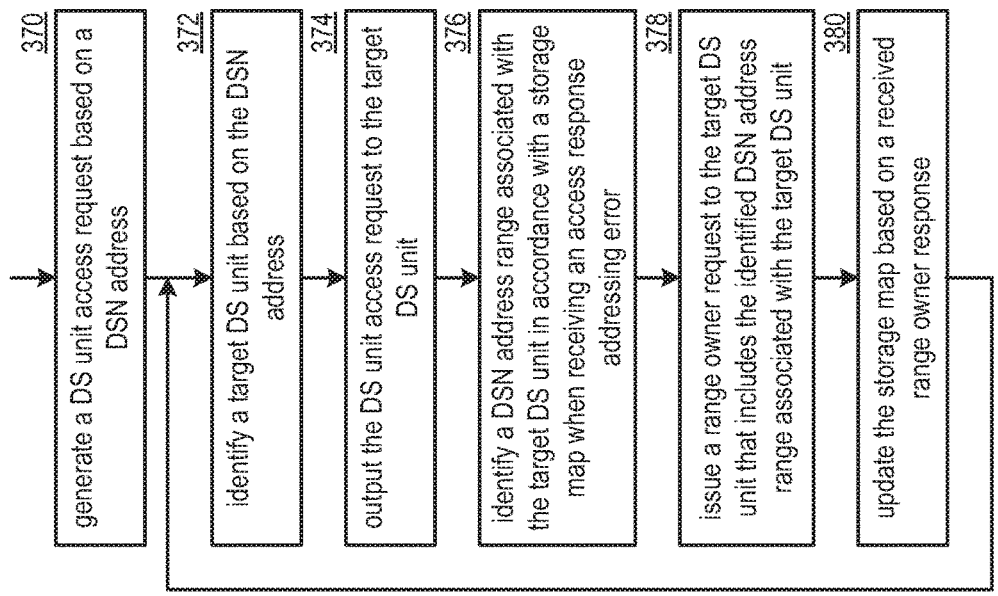
FIG. 40B is a flowchart illustrating an example of updating dispersed storage network (DSN) addressing in accordance with the present invention.

FIG. 40B is a flowchart illustrating an example of updating dispersed storage network (DSN) addressing. The method begins at step 370 where a processing module (e.g., of a distributed storage and task (DST) client module, of a dispersed storage (DS) processing module) generates a DS unit access request based on a DSN address. The generating includes determining the DSN address based on one or more of a directory lookup, a dispersed hierarchical index lookup, and generating (e.g., when writing new data). The generating further includes generating a slice name based on the DSN address for inclusion in the DSN access request. The method continues at step 372 where the processing module identifies a target DS unit based on the DSN address. The identifying includes one or more of a storage map lookup, identifying a DSN address range associated with the DSN address based on the storage map lookup, identifying the DSN address range associated with the slice name based on the storage map lookup, and identifying the target DS unit based on the storage map lookup using at least one of the DSN address range, the DSN address, and a slice name.

The method continues at step 374 where the processing module outputs the DS unit access request to the target DS unit. The method continues at step 376 where the processing module identifies a DSN address range associated with the target DS unit in accordance with the storage map when receiving an access response addressing error. The identifying includes receiving the access response addressing error and identifying a DSN address range associated with the DS unit based on the storage map lookup.

The method continues at step 378 where the processing module issues a range owner request to the target DS unit that includes the identified DSN address range associated with the target DS unit. The issuing includes generating the range owner request and outputting the range owner request to the target DS unit. The method continues at step 380 where the processing module updates the storage map based on received range owner response. The range owner response may include one or more DS unit identifiers and a corresponding one or more DSN address ranges. The updating includes, for each DS unit identifier of the one or more DS unit identifiers of the range owner response, updating the storage map for each of the one or more DS unit identifiers to include a corresponding one or more address ranges of the range owner response, where the address ranges fall within the DSN address range associated with the DS unit. As such, the processing module may ignore DSN address mappings outside of the identified DSN address range.

Figure 41:
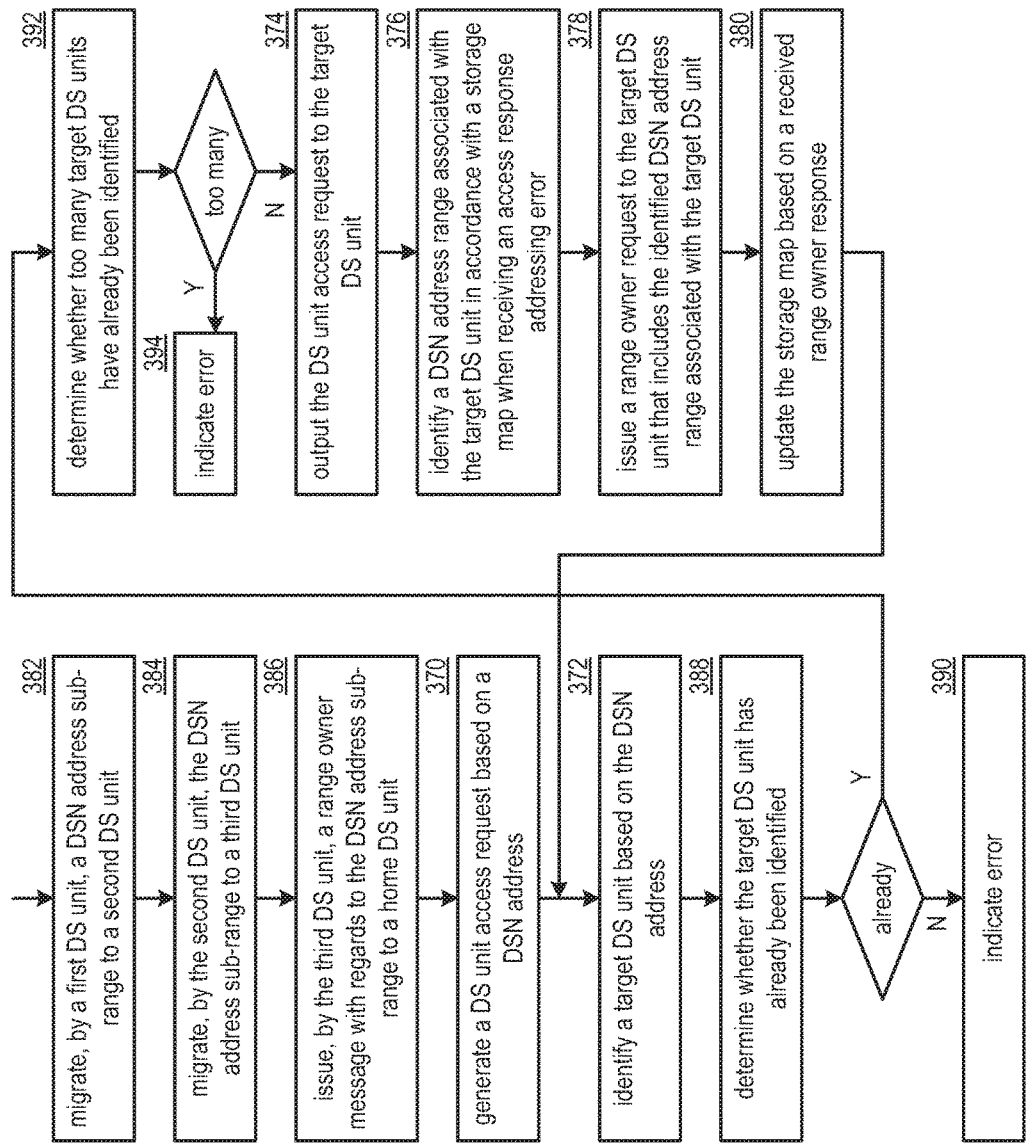
FIG. 41 is a flowchart illustrating another example of updating dispersed storage network addressing in accordance with the present invention.

FIG. 41 is a flowchart illustrating another example of updating dispersed storage network addressing, which includes similar steps to FIG. 40B. The method begins at step 382 where a first dispersed storage (DS) unit of a set of DS units migrates a dispersed storage network (DSN) address sub-range from the first DS unit to a second DS unit of the set of DS units. The migrating includes one or more of selecting slices to migrate, identifying DSN address sub-range associated with the selected slices based on a local storage map of the first DS unit, facilitating migration of the slices, and updating the local storage map associated with the first DS unit to affiliate the DSN address sub-range with the second DS unit and to de-affiliate the DSN address sub-range with the first DS unit.

The method continues at step 384 where the second DS unit migrates the DSN address sub-range from the second DS unit to a third DS unit. The migrating includes one or more of selecting slices to migrate, identifying the DSN address sub-range associated with the selected slices based on a local storage map of the second DS unit, facilitating migration of the slices, and updating the local storage map associated with the second DS unit to affiliate the DSN address sub-range with the third DS unit and to de-affiliate the DSN address sub-range with the second DS unit.

The method continues at step 386 where the third DS unit issues a range owner message with regards to the DSN address sub-range to a home DS unit. The home DS unit includes a DS unit affiliated with the DSN address sub-range with regards to a storage map of a DS processing module. For example, the home DS unit includes the first DS unit. The issuing includes generating and outputting the range owner message to one or more of the second DS unit, the first DS unit, and one or more DS processing modules including the DS processing module. The method continues with steps 370-372 of FIG. 40B where a processing module (e.g., of a distributed storage and task (DST) client module, of a dispersed storage (DS) processing module) generates a DS unit access request based on a DSN address and identifies a target DS unit based on the DSN address.

The method continues at step 388 where the processing module determines whether the target DS unit has already been identified. The determining may be based on a tracking record that tracks previous authentication of potential target DS units. The method continues to step 390 when the target DS unit has not already been identified. The method branches to step 392 when the target DS unit has already been identified. The method continues at step 390 where the processing module indicates an error when the target DS unit has not already been identified. The indicating of the error includes at least one of issuing a namespace error message to one or more of a requesting entity, the DS processing module, and a DS managing unit.

When the target DS unit has already been identified, the method continues at step 392 where the processing module determines whether too many target DS units have already been identified. The determining may be based on a tracking record associated with tracking how many target DS units have been accessed. The method branches to step 374 of FIG. 40B when too many target DS units have not already been identified. The method continues to step 394 when too many target DS units have already been identified. When too many steps have already been identified, the method continues at step 394 where the processing module indicates the error.

When too many target DS units have not already been identified, the method continues with steps 374-380 of FIG. 40B where the processing module outputs the DS unit access request to the target DS unit, identifies a DSN address range associated with the target DS unit in accordance with a storage map when receiving an access response addressing error, issues a range owner request to the target DS unit that includes the identified DSN address range associated with the target DS unit, and updates the storage map based on a received range owner response. The method branches back to step 372 of FIG. 40B where the processing module identifies the target DS unit based on the DSN address.

Figure 42A:
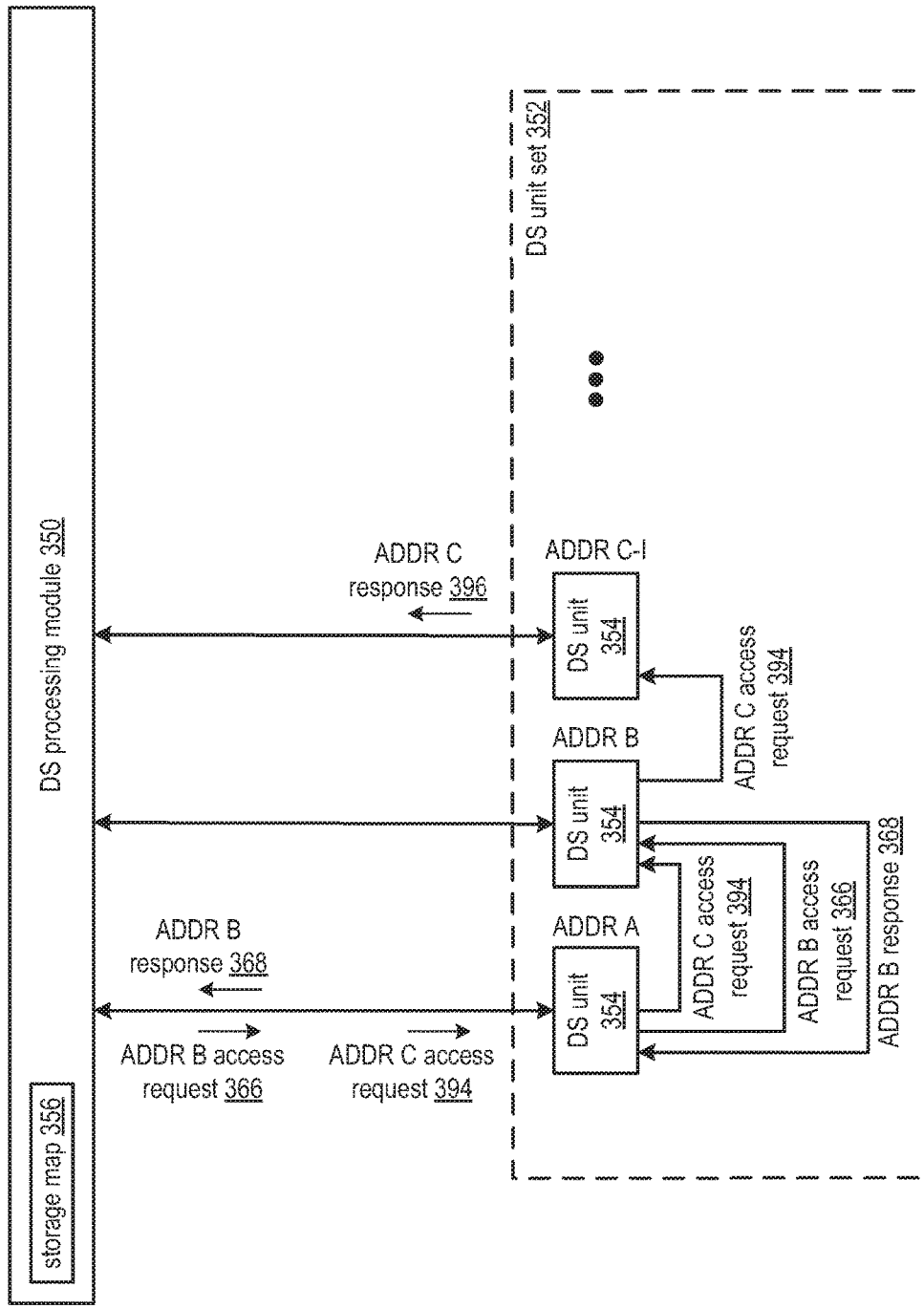
FIG. 42A is a schematic block diagram of another embodiment of a dispersed storage network (DSN) system in accordance with the present invention.

FIG. 42A is a schematic block diagram of another embodiment of a dispersed storage network (DSN) system that includes the dispersed storage (DS) processing module 350 of FIG. 40A and the DS unit set 352 of FIG. 40A. The DS processing module includes a memory for storage of the storage map 356 of FIG. 40A. The DS unit set 352 includes a set of DS units 354 of FIG. 40A.

The DS unit set 352 stores one or more sets of encoded data slices, where data is encoded using a dispersed storage error coding function to produce the one or more sets of encoded data slices. Each encoded data slice of the one or more sets of encoded data slices is associated with a slice name. Each DS unit 354 of the DS unit set is affiliated with one or more DSN address ranges such that the encoded data slices that correspond to the slice names within the one or more DSN address ranges are stored in the DS unit. For example, encoded data slices with slice names falling in a DSN address range A are stored in a first DS unit of the DS unit set, where the first DS unit is affiliated with the DSN address range A. As another example, as illustrated, a second DS unit is affiliated with a DSN address range B, and a third DS unit is affiliated with DSN address ranges C-I, etc.

The storage map 356 includes a mapping of the one or more DSN address ranges for each DS unit. The DS processing module 350 utilizes the storage map 356 when accessing one or more encoded data slices stored in the DS unit set 352. For example, when accessing an encoded data slice associated with a slice name within DSN address range A, the DS processing module sends an access request to the first DS unit when the storage map indicates that the first DS unit is associated with the DSN address range A. The storage map may 356 be initially generated using a deterministic function such that DSN address ranges are evenly distributed amongst the set of DS units such that each DS unit of the set of DS units is affiliated with a common number of DSN addresses of a corresponding DSN address range.

From time to time, DS unit to DSN address range affiliations may be updated. At least one of the DS processing module 350 and at least one DS unit of the set of DS units 352 may determine to update the DS unit to DSN address range affiliation. The determining may be based on one or more of detecting a storage imbalance between two DS units of the set of DS units, receiving an error message, detecting DS unit unavailability, a predetermination, interpreting a schedule, and receiving a request. For example, the first DS unit determines to migrate address range B from the first DS unit to the second DS unit when encoded data slices stored in the first DS unit are utilizing a greater amount of storage capacity as compared to encoded data slices stored in the second DS unit. When migrating the address range B from the first DS unit to the second DS unit, each of the first DS unit and the second DS unit update a corresponding local storage map to indicate that DSN address range B is affiliated with the second DS unit and is de-affiliated from the first DS unit. Alternatively, or in addition to, at least one of the first DS unit and the second DS unit updates the DS processing module to affect updating of the storage map of the DS processing module.

In an example of operation, the DS processing module 350 (e.g., a requesting entity) issues a DSN address range C access request 394 that includes a slice name (e.g., a read or write request for an encoded data slice associated with the slice name that falls within the DSN address range C) to the first DS unit (e.g., a target DS unit) in accordance with the storage map of the DS processing module (e.g., when the slice name falls within DSN address range C and the storage map indicates that the DSN address range C is affiliated with the first DS unit). The first DS unit determines that the slice name of the DSN address range C access request 394 is not affiliated with the first DS unit (e.g., since the slice name is affiliated with the second DS unit in accordance with a local storage map of the first DS unit). When detecting that the slice name is not affiliated with the first DS unit, the first DS unit forwards the DSN address range C access request 394 to the second DS unit (e.g., a new target DS unit) in accordance with the local storage map to the first DS unit. Alternatively, the first DS unit forwards the DSN address range C access request 394 to the third DS unit by at least one of a direct path and via the second DS unit.

The second DS unit forwards the DSN address range C access request 394 to the third DS unit (e.g., another new target DS unit) in accordance with a local storage map of the second DS unit. The third DS unit generates a DSN address range C access response 396 based on the DSN address range C access request and outputs the DSN address range C access response 396 to the DS processing module (e.g., the requesting entity) by at least one of a direct path and via one or more intermediary DS units.

As another example of operation, the DS processing module issues a DSN address range B access request 366 to the first DS unit in accordance with the storage map of the DS processing module. The first DS unit forwards the DSN address range B access request 366 to the second DS unit in accordance with the local storage map of the first DS unit. The second DS unit generates a DSN address range B access response 368 based on the DSN address range B access request 366. The second DS unit outputs the DSN address range B access response 368 to the DS processing module 350 via the first DS unit (e.g., an intermediary DS unit associated with the forwarding of the DSN address range B access request).

Figure 42B:
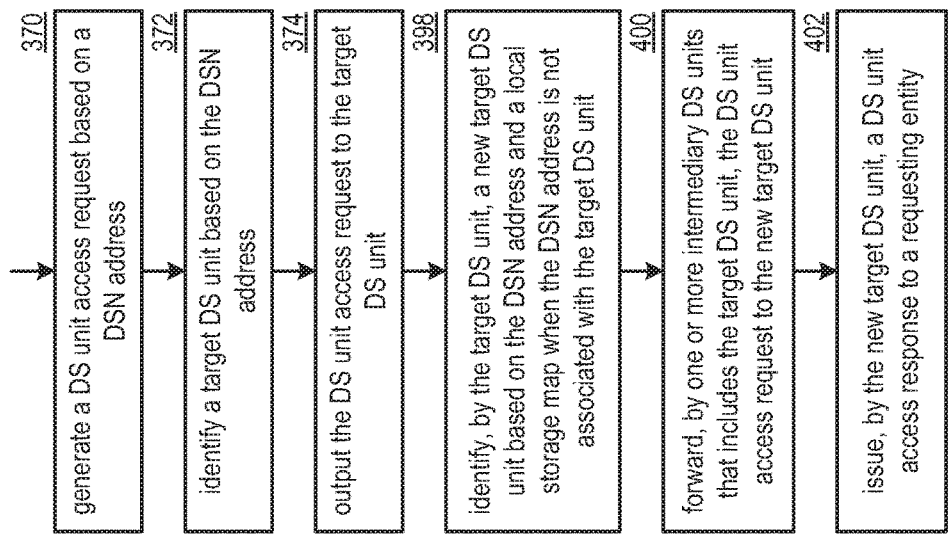
FIG. 42B is a flowchart illustrating an example of accessing a dispersed storage (DS) unit in accordance with the present invention.

FIG. 42B is a flowchart illustrating an example of accessing a dispersed storage (DS) unit, which includes similar steps to FIG. 40B. The method begins with steps 370, 372, and 374 of FIG. 40B where a processing module of a requesting entity (e.g., of a distributed storage and task (DST) client module, of a dispersed storage (DS) processing module) generates a dispersed storage (DS) unit access request based on a dispersed storage network (DSN) address, identifies a target DS unit based on the DSN address, and outputs the DS unit access request to the target DS unit. The method continues at step 398 where the target DS unit identifies a new target DS unit based on the DSN address and a local storage map when the DSN address is not associated with the target DS unit. The identifying includes determining whether the DSN address is associated with the target DS unit, and when not associated, identify the new target DS unit from the local storage map using the DSN address.

The method continues at step 400 where one or more intermediary DS units that includes the target DS unit, forwards the DS unit access request to the new target DS unit. The forwarding includes identifying the new target DS unit from a local storage map of one or more intermediary DS units and sending the DS unit access request to the new target DS unit. The method continues at step 402 where the new target DS unit issues a DS unit access response to the requesting entity. The issuing includes generating the DS unit access response and outputting the DS unit access response. The outputting the DS unit access response includes at least one of sending the DS unit access response directly to the requesting entity and forwarding, via the one or more intermediary DS units, the DS unit access response to the requesting entity.

Figure 43A:
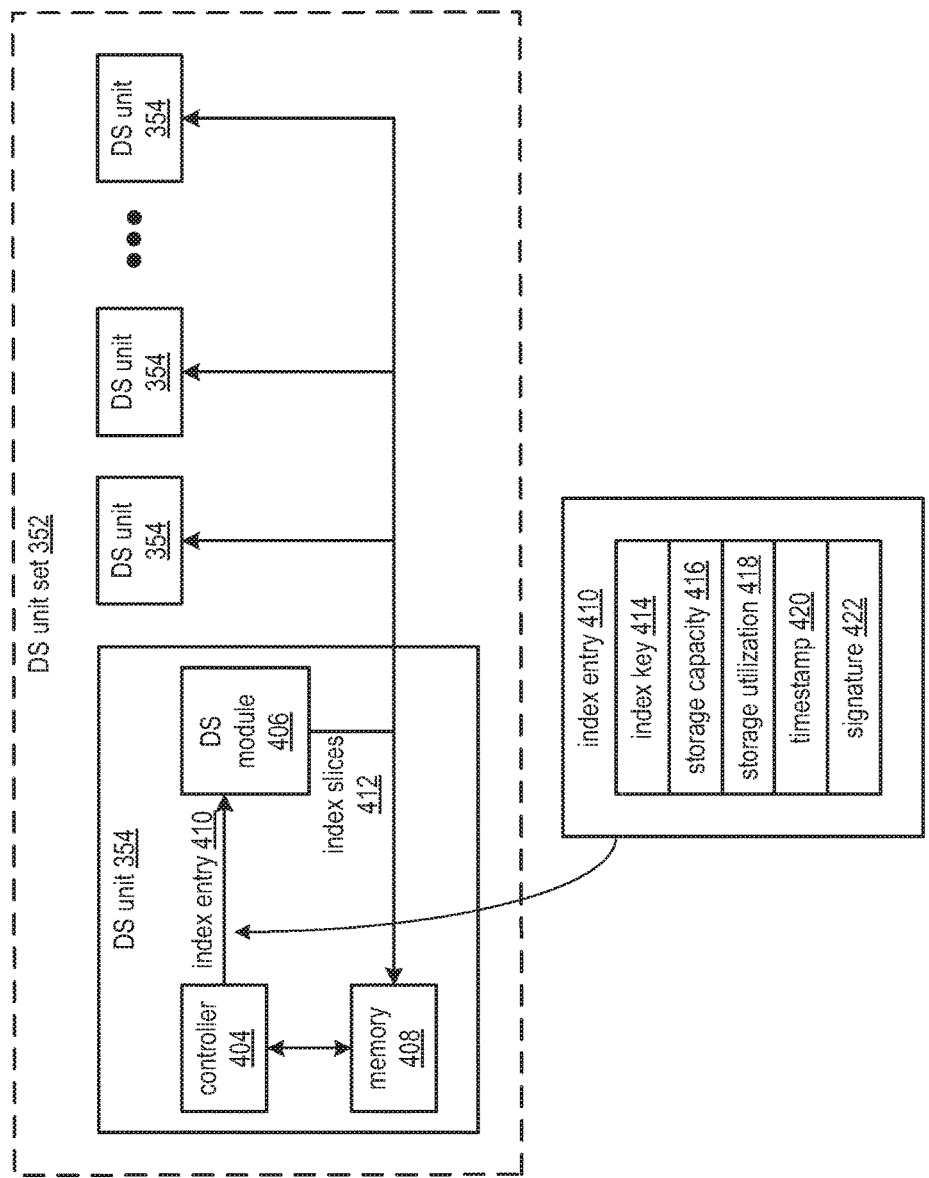
FIG. 43A is a schematic block diagram of another embodiment of a dispersed storage network (DSN) system in accordance with the present invention.

FIG. 43A is a schematic block diagram of another embodiment of a dispersed storage network (DSN) system that includes the dispersed storage (DS) unit set 352 of FIG.

40A. The DS unit set 352 includes a set of DS units 354 of FIG. 40A. Each DS unit 354 includes a controller 404, a DS module 406, and a memory 408. The DS module may be implemented utilizing the DST client module 34 of FIG. 1. The controller 404 includes at least one of a computer, a computing device, the computing core 26 of FIG. 2, a microprocessor, a set of microprocessors, and a computing module. The memory 408 includes one or more memory devices and may be implemented utilizing the memory 88 of FIG. 3.

The DS unit set 352 may be utilized to store sets of encoded data slices associated with one or more storage pools. For example, six DS units of the DS unit set may be utilized to store six encoded data slices per set of encoded data slices associated with a first storage pool and eight DS units of the DS unit set may be utilized to store eight encoded data slices per set of encoded data slices associated with a second storage pool. As such, storage utilization levels of memories of the DS units may vary from DS unit to DS unit.

From time to time, each DS unit 354 of the DS unit set 352 may update a centralized storage information repository. The updating includes providing storage capacity information and storage utilization information with regards to the DS unit 354. The centralized storage information repository includes at least one of a repository data object and as a set of index entries in a dispersed hierarchical index. When the centralized storage information repository includes the repository data object, the repository data object may be stored in at least one of a memory of one of the DS units 354, a memory of a DS managing unit, a server, and as a plurality of encoded data slices in the set of DS units.

When the centralized storage information repository includes the set of index entries in the dispersed hierarchical index, the dispersed hierarchical index includes generating an index entry 410 for each DS unit 354 of the set of DS units to produce the set of index entries. The dispersed hierarchical index includes one or more of the set of index entries corresponding to the set of DS units (e.g., lowest level leaf nodes), one or more levels of index nodes utilized to search and sort the dispersed hierarchical index (e.g., includes at least one root index node), and another of index entries corresponding to another set of DS units of the DSN system.

Each index entry 410 of the set of index entries includes an index key field 414, a storage capacity field 416, a storage utilization field 418, a timestamp field 420, and a signature field 422. The index key field 414 includes an index key entry that corresponds to an identifier of a corresponding DS unit. The index key field 414 may be utilized to identify an association of the index entry with the corresponding DS unit. The storage capacity field 416 includes a storage capacity entry corresponding to a total amount of storage associated with the memory of the corresponding DS unit. The storage utilization field 418 includes a storage utilization entry corresponding to a total amount of storage resources of the memory that are currently utilized. The storage utilization entry includes at least one of the total number of bytes stored, a percentage of the memory that is utilized, utilization by vault, and utilization by vault generation. The timestamp field 420 includes a timestamp entry corresponding to when the index entry was generated. The signature field 422 includes a signature entry including a digital signature over the index entry to be utilized for subsequent verification of the index entry. In addition, the index entry 410 may include one or more of a sibling node source name and a sibling minimum index key to assist in searching of the dispersed hierarchical index.

In an example of operation, a DS unit 354 of the DS unit set determines to update an index entry 410 of the dispersed hierarchical index with regards to the DS unit 354. The determining may be based on one or more of detecting that a time frame has expired since a previous update, receiving a request, receiving an error message, and detecting that a storage utilization value has changed by more than a change threshold value. When updating the index entry 410, DS unit 354 determines storage information for the DS unit that includes storage capacity and storage utilization. The DS unit 354 generates an updated index entry that includes the storage information, an index key, a timestamp, and a signature. The DS unit 354 overwrites a corresponding index entry in the dispersed hierarchical index with the updated index entry. For example, the DS unit encodes the updated index entry using a dispersed storage error coding function to produce a set of index slices 412 and outputs the set of index slices 412 to the set of DS units 354 for storage in a set of corresponding memories associated with the set of DS units (e.g., including a memory associated with the DS unit).

Figure 43B:
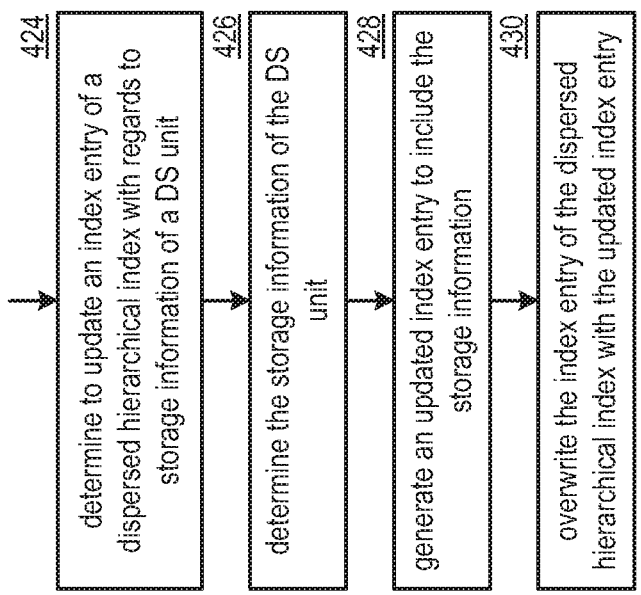
FIG. 43B is a flowchart illustrating an example of updating storage information in accordance with the present invention.

FIG. 43B is a flowchart illustrating an example of updating storage information. The method begins at step 424 where a processing module (e.g., of a dispersed storage (DS) unit) determines to update an index entry of a dispersed hierarchical index with regards to storage information of the DS unit. The determining may be based on one or more of detecting that a time frame from a previous update sequence has expired, receiving a request, receiving an error message, and detecting that a storage utilization value has changed by more than a change threshold value. The method continues at step 426 where the processing module determines the storage information of the DS unit. The determining includes one or more of accessing one or more memory devices of the DS unit to identify a total amount of storage capacity, identify a storage utilization level of the one or more memory devices, and aggregate the total amount of storage capacity and the storage utilization level to produce the storage information.

The method continues at step 428 where the processing module generates an updated index entry to include the storage information. The generating includes one or more of generating a timestamp, generating a temporary index entry to include an index key that includes an identifier for the DS unit, the storage information, the timestamp, and generating a signature over the temporary index entry. The generating further includes aggregating the temporary index entry and the signature to produce the updated index entry.

The method continues at step 430 where the processing module overwrites the index entry of the dispersed hierarchical index with the updated index entry. The overwriting includes one or more of encoding the updated index entry using a dispersed storage error coding function to produce a set of index slices, identifying a dispersed storage network (DSN) address of a node of the dispersed hierarchical index that includes the index entry (e.g., search the dispersed hierarchical index using the identifier of the DS unit as an index key), generating a set of slice names based on the DSN address, generating a set of write slice requests that includes the set of index slices and the set of slice names, and outputting the set of write slice requests to a set of DS units to facilitate storage of the set of index slices in a set of memories of the set of DS units.

The storage utilization information of each DS unit of the set of DS units may be accessed by accessing a set of nodes of the dispersed hierarchical index corresponding to a set of index entries that includes an index key associated with the set of DS units. For example, a set of sequential leaf nodes are identified corresponding to the DS units and the storage information is extracted from the set of sequential leaf nodes.

Figure 44A:
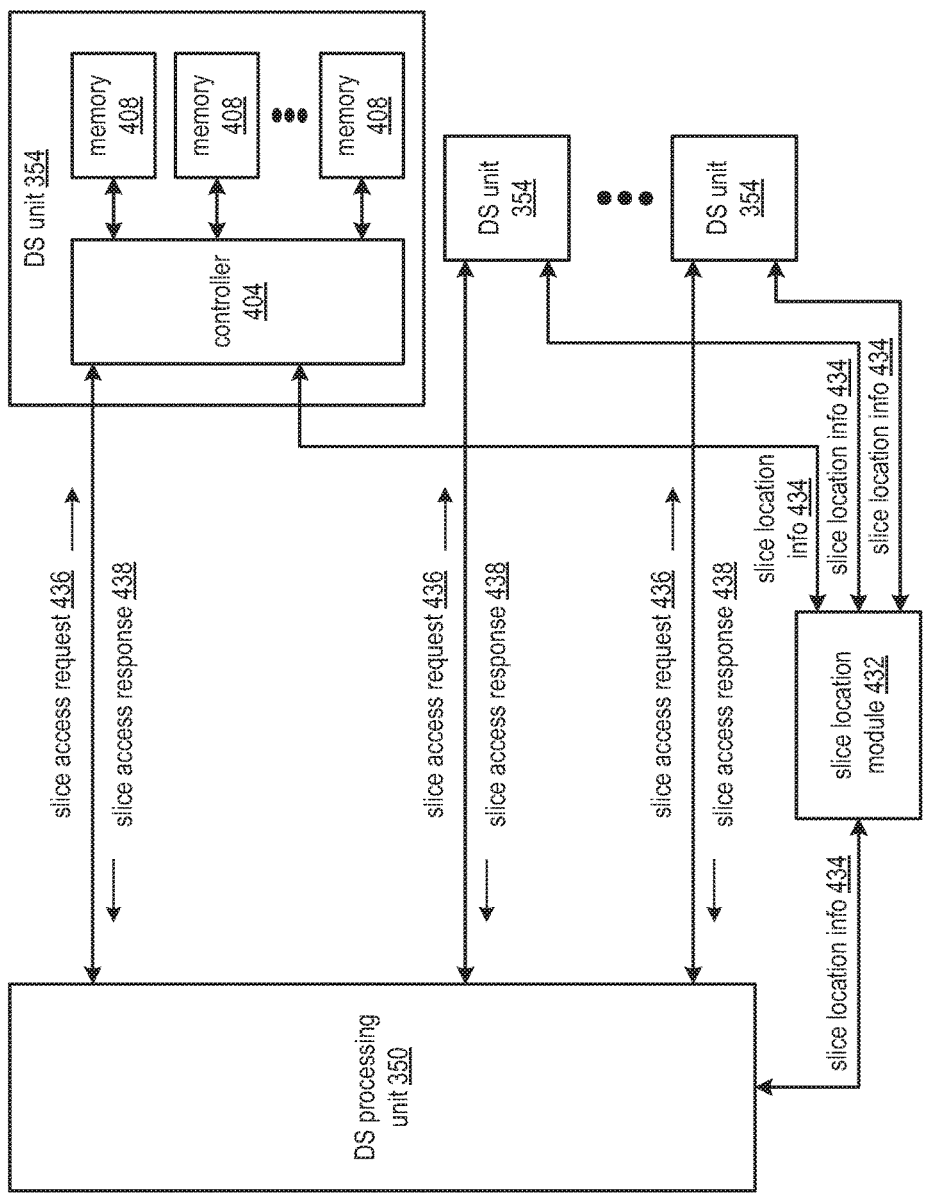
FIG. 44A is a schematic block diagram of another embodiment of a dispersed storage network (DSN) system in accordance with the present invention.

FIG. 44A is a schematic block diagram of another embodiment of a dispersed storage network (DSN) system that includes the dispersed storage (DS) processing unit 350 of FIG. 40A, at least one slice location module 432, and the set of DS units 354 of FIG. 40A. The slice location module may be implemented utilizing at least one of the DS processing unit 354, the distributed storage and task (DST) processing unit 16 of FIG. 1, a DST processing module, a server, a computer, a computing device, a processing module, a user device, a DS unit, a storage device, a storage server, and the DST execution unit 36 of FIG. 1. The slice location module 432 may be implemented according to at least one of one per DSN system, one for each DS processing unit 350, one for each pillar of a set of pillars associated with sets of slices stored in the set of DS units, one for each set of DS units, and one for each DS unit 354. Each DS unit 354 includes the controller 404 of FIG. 43A and one or more memories 408 of FIG. 43A.

The DS processing unit 350 encodes data to produce a plurality of sets of encoded data slices for storage in the set of DS units. The DS processing module 350 generates a plurality of sets of slice names for the plurality of sets of encoded data slices. The DS processing unit 350 generates one or more sets of slice access requests 436 that includes a write slice indication, the plurality of sets of encoded data slices, and the plurality of sets of slice names. The DS processing unit 350 sends the one or more sets of slice access requests 436 to the set of DS units 354 to facilitate storing the plurality of sets of encoded data slices in the set of DS units. The set of DS units issues one or more sets of slice access responses 438 to the DS processing unit 350 that includes one or more sets of status codes associated with writing of the plurality of sets of encoded data slices.

Alternatively, the DS processing unit 350 may retrieve the data from the set of DS units. When retrieving, the DS processing unit 350 issues one or more sets of slice access requests 436 that includes a read slice indication and the plurality of sets of slice names. The issuing includes identifying a slice location by one or more of a local table lookup, a directory lookup, and a query/response sequence with the slice location module 432 to acquire slice location information 434, and performing a slice list query/response and/or a read slice request/response with one or more DS units.

The slice location information 434 includes one or more of a slice name, one or more slice name aliases, and a slice location (e.g., a DS unit identifier, a memory identifier, a memory device identifier). A slice name alias includes one or more of a domain name system name (e.g., sliceA.segmentB.objectC.vaultD.storageprovider.com) and an Internet protocol address that is deterministically formed based on one or more of a vault identifier, an object number, and a segment number associated with a DSN address utilized to form the slice name. The issuing further includes utilizing the slice location to facilitate outputting the one or more sets of slice access requests to the set of DS units. The set of DS units 354 issues a set of slice access responses 438 to the DS processing unit 350 that includes at least some of the plurality of sets of encoded data slices.

From time to time, one or more of each DS unit 354 of the set of DS units and the DS processing unit 350 may send the slice location information 434 to the slice location module 432 for storage therein. For example, a DS unit 354 sends the slice location information 434 to the slice location module 432 based on one or more of an update time frame has expired since a last update, when storing a new encoded data slice in a memory 408, and in response to a slice location information request. The DS processing unit 350 may send the slice location information 434 to the slice location module 432 based on one or more of generating a response to a slice location information request and when outputting an encoded data slice of a slice access request with regards to writing the encoded data slice to a DS unit.

In an example of operation, a sending entity (e.g., a DS unit of the set of DS units, the DS processing unit) determines to post slice location information 434 to the slice location module 432. The sending entity generates the slice location information 434 and outputs the slice location information 434 to the slice location module 432. The slice location module 432 updates stored slice location information using the slice location information 434 to produce updated slice location information 434. The slice location module 432 stores the updated slice location information 434. The storing includes at least one of storing the updated slice location information 434 in a local memory of the slice location module 432 and encoding the updated slice location information 434 using the dispersed storage error coding function to produce a set of location information slices for storage in the set of DS units 354. The slice location module 432 issues slice location information 434 from the stored slice information in response to a slice location information request.

Figure 44B:
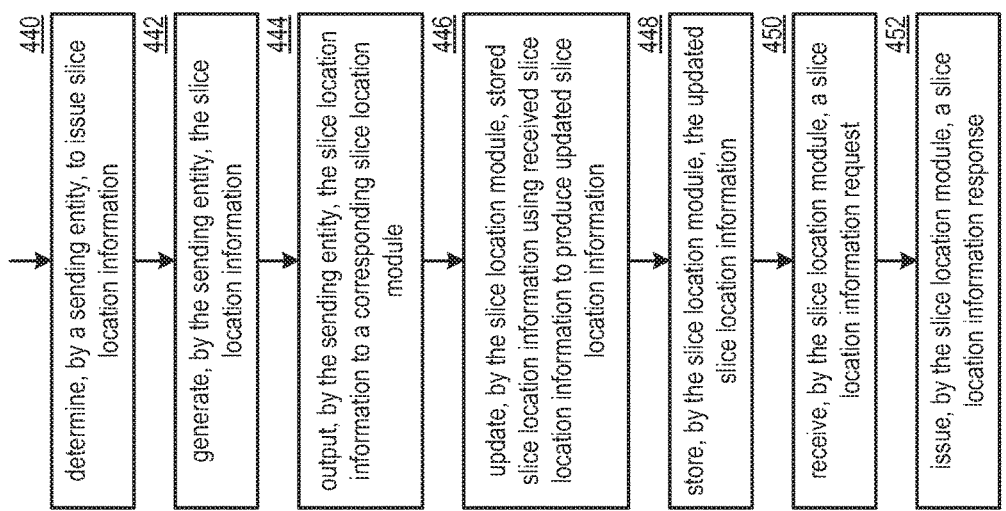
FIG. 44B is a flowchart illustrating an example of tracking slice location information in accordance with the present invention.

FIG. 44B is a flowchart illustrating an example of tracking slice location information. The method begins at step 440 where a sending entity (e.g., of a dispersed storage (DS) processing unit, of a DS unit) determines to issue slice location information. The determining may be based on one or more of outputting an encoded data slice for storage, storing a received encoded data slice in a memory device, detecting that an update time frame has expired, interpreting a predetermination, and receiving a request. The method continues at step 442 where the sending entity generates the slice location information. The generating includes one or more of identifying a slice name, identifying a slice name range, identifying a DS unit associated with storage of the encoded data slice, identifying a memory device associated with the encoded data slice, identifying an existing slice alias, and generating a new slice alias associated with a new slice. The generating the new slice alias includes one or more of generating a domain name system format alias in accordance with a domain name system approach and based on attributes of a dispersed storage network (DSN) address associated with the encoded data slice (e.g., including one or more of a vault identifier, an object number, a segment number, etc.) and generating an Internet protocol format alias in accordance with an Internet protocol approach based on attributes of the DSN address associated with encoded data slice.

The method continues at step 444 where the sending entity outputs the slice location information to the corresponding slice location module. The outputting includes one or more of selecting the corresponding slice location module from a plurality of slice location modules based on one or more of a predetermination, an affiliation, a request, an availability indicator, and a performance indicator. The method continues at step 446 where the slice location module updates stored slice location information using received slice location information to produce updated slice location information. The updating includes one or more of retrieving the stored slice location information (e.g., from one or more of a local memory, a set of DS units), modifying (e.g., appending, overwriting) the stored slice location information using the received slice location information to produce the updated slice location information.

The method continues at step 448 where the slice location module stores the updated slice location information. The storing includes at least one of storing the updated slice location information in the local memory and issuing a set of write slice requests that includes a set of location slices to a set of DS units (e.g., encode, output). The method continues at step 450 where the slice location module receives a slice location information request. The receiving includes generating the slice location information by a requesting entity when determining to obtain slice location information (e.g., to enable subsequent access of the slice). The method continues at step 452 where the slice location module issues a slice location information response. The issuing includes one or more of accessing a local memory using a slice name of the request to retrieve the slice location information, retrieving the slice location information from the set of DS units (e.g., issuing read slice request, receiving slices, decoding the slices to reproduce the slice location information), generating the location information response to include the slice location information, and outputting the location information response to the requesting entity.

Figure 45A:
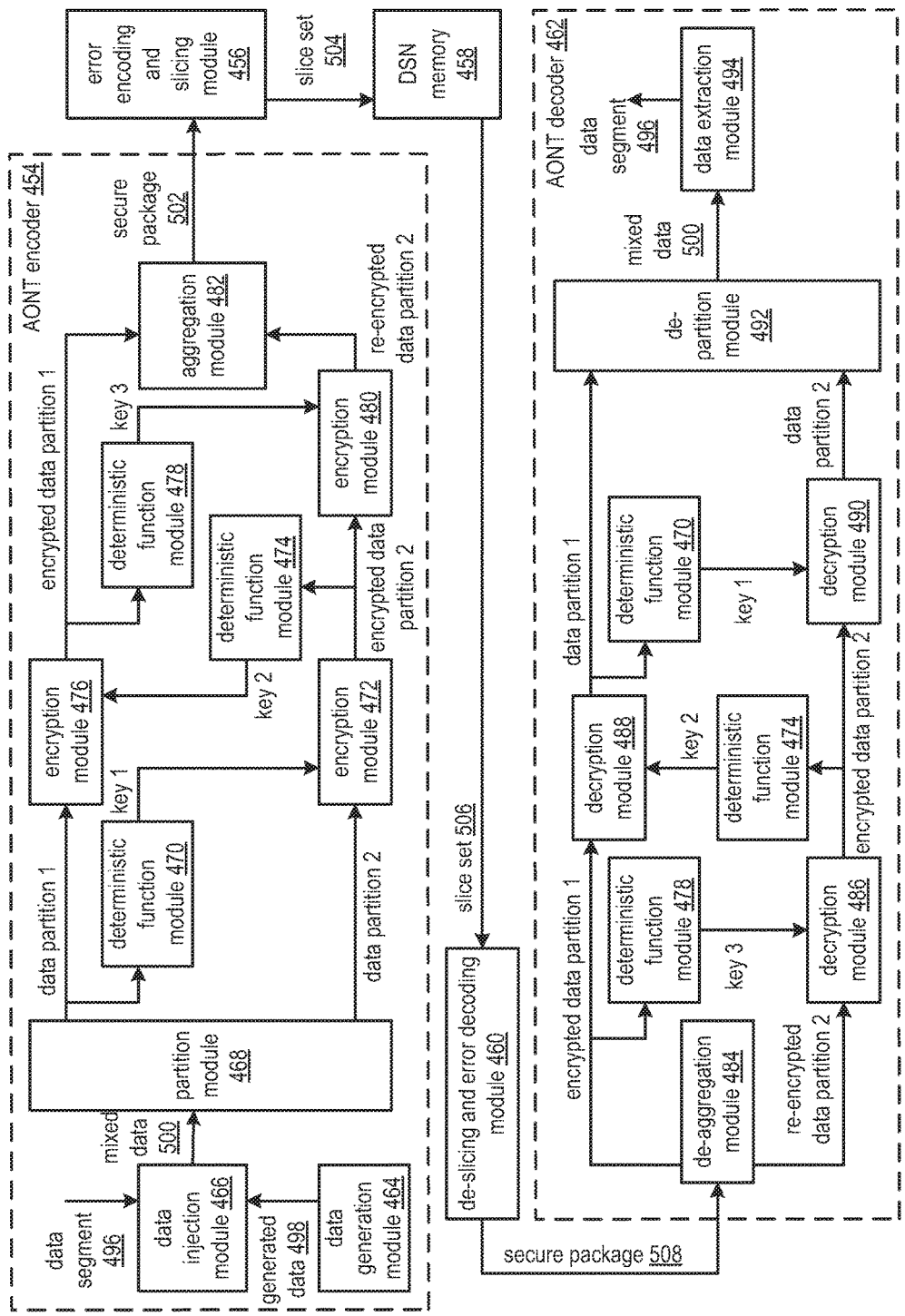
FIG. 45A is a schematic block diagram of an embodiment of a zero expansion all or nothing transformation (AONT) system in accordance with the present invention.

FIG. 45A is a schematic block diagram of an embodiment of a zero expansion all or nothing transformation (AONT) system that includes an AONT encoder 454, an error encoding and slicing module 456, a dispersed storage network (DSN) memory 458, a de-slicing and error decoding module 460, and an AONT decoder 462. The AONT encoder 454 includes a data injection module 466, a data generation module 464, a partition module 468, one or more deterministic function modules 470, 474, and 478, one or more encryption modules 472, 476, and 480, and an aggregation module 482. The AONT decoder 462 includes a de-aggregation module 484, the one or more deterministic function modules 470, 474, and 478, one or more decryption modules 486, 488, and 490, a de-partition module 492, and a data extraction module 494. The DSN memory 458 includes at least one set of storage units. Each storage unit may be implemented utilizing the distributed storage and task (DST) execution unit 36 of FIG. 1. The zero expansion AONT system functions to obfuscate data for storage as a set of encoded data slices in the DSN memory 458, where the obfuscating produces a different set of encoded data slices for each instance of obfuscating and storing data that is identical to a previous instance.

The data generation module 464 generates one or more of a plurality of random data bytes (e.g., to provide variance between storage instances) and a plurality of check bytes (e.g., for subsequent tampering detection during recovery of the data from the DSN memory) as generated data 498. The data injection module 466 injects the generated data 498 into a data segment 496 in accordance with an injection approach to produce mixed data 500. The injection approach includes at least one of interleaving, substituting, appending, and performing a deterministic function. For example, the data injection module 466 injects four bytes of random data of the generated data 498 into the data segment every 1000 bytes from the beginning of the data segment 496 to produce the mixed data 500.

The partition module 468 partitions the mixed data 500 to produce a data partition 1 and a data partition 2 in accordance with a partitioning approach. The partitioning approach includes indicating which one or more portions of the mixed data are to be partitioned into the data partitions 1 and 2. For example, the partitioning approach indicates to partition the mixed data 500 to include a first half of the mixed data as the data partition 1 and to include a second half of the mixed data as the data partition 2.

The deterministic function module 470 applies a deterministic function to data partition 1 to produce a key 1. The deterministic function includes at least one of a hashing function, a cyclic redundancy code function, a hash based message authentication code function, a mask generating function, a truncation function, and a sponge function. For example, the deterministic function module 470 applies the mask generating function to the data partition 1 to produce an interim result and applies a truncation function to the interim result to produce the key 1, where the truncation function produces the key 1 to include a number of bits for keys utilized by the encryption module 472. The encryption module 472 encrypts data partition 2 using key 1 to produce encrypted data partition 2.

The deterministic function module 474 performs another deterministic function on the encrypted data partition 2 to produce key 2. The encryption module 476 encrypts data partition 1 using the key 2 to produce an encrypted data partition 1. The deterministic function module 478 performs yet another deterministic function on the encrypted data partition 1 to produce key 3. The encryption module 480 encrypts the encrypted data partition 2 using key 3 to produce a re-encrypted data partition 2. The aggregation module 482 aggregates the encrypted data partition 1 and the re-encrypted data partition 2 in accordance with an aggregation scheme to produce a secure package 502. The aggregation scheme includes at least one of interleaving and appending.

The error encoding and slicing module 456 dispersed storage error encodes the secure package 502 using a dispersed storage error coding function to produce a slice set 504 for storage in the DSN memory 458. Upon retrieval, the de-slicing and error decoding module 460 receives at least some of the slice set 504 as slice set 506 from the DSN memory 458. The de-slicing and error decoding module 460 decodes the slice set 506 using the dispersed storage error coding function to produce a reproduced secure package 508. The de-aggregation module 484 de-aggregates the secure package 508 in accordance with the aggregation scheme to reproduce the encrypted data partition 1 and the re-encrypted data partition 2.

The deterministic function module 478 of the AONT decoder 462 performs the deterministic function performed by deterministic function module 478 of the AONT encoder 454 to produce key 3 on the encrypted data partition 1 to reproduce key 3. The decryption module 486 decrypts the re-encrypted data partition 2 using the reproduced key 3 to reproduce the encrypted data partition 2. The deterministic function module 474 of the AONT decoder 462 performs the deterministic function performed by the deterministic function 474 of the AONT encoder 454 to produce key 2 on the encrypted data partition 2 to reproduce key 2. The decryption module 488 decrypts the encrypted data partition 1 using the reproduced key 2 to reproduce data partition 1. The deterministic function module 470 of the AONT decoder 462 performs the deterministic function performed by the AONT encoder 454 to produce key 1 on the data partition 1 to reproduce key 1. The decryption module 490 decrypts the encrypted data partition 2 using the reproduced key 1 to reproduce the data partition 2.

The de-partition module 492 de-partitions the data partition 1 and the data partition 2 in accordance with the partitioning approach to reproduce the mixed data 500. The data extraction module 494 extracts the data segment 496 from the reproduced mixed data 500 in accordance with the injection approach. For example, the data extraction module 494 identifies and discards the generated data 498 in accordance with the injection approach. Alternatively, or in addition to, the data extraction module 494 verifies the extracted data segment 496 by matching check bytes of the generated data portion of the reproduced mixed data 500 in accordance with the injection approach.

Figure 45B:
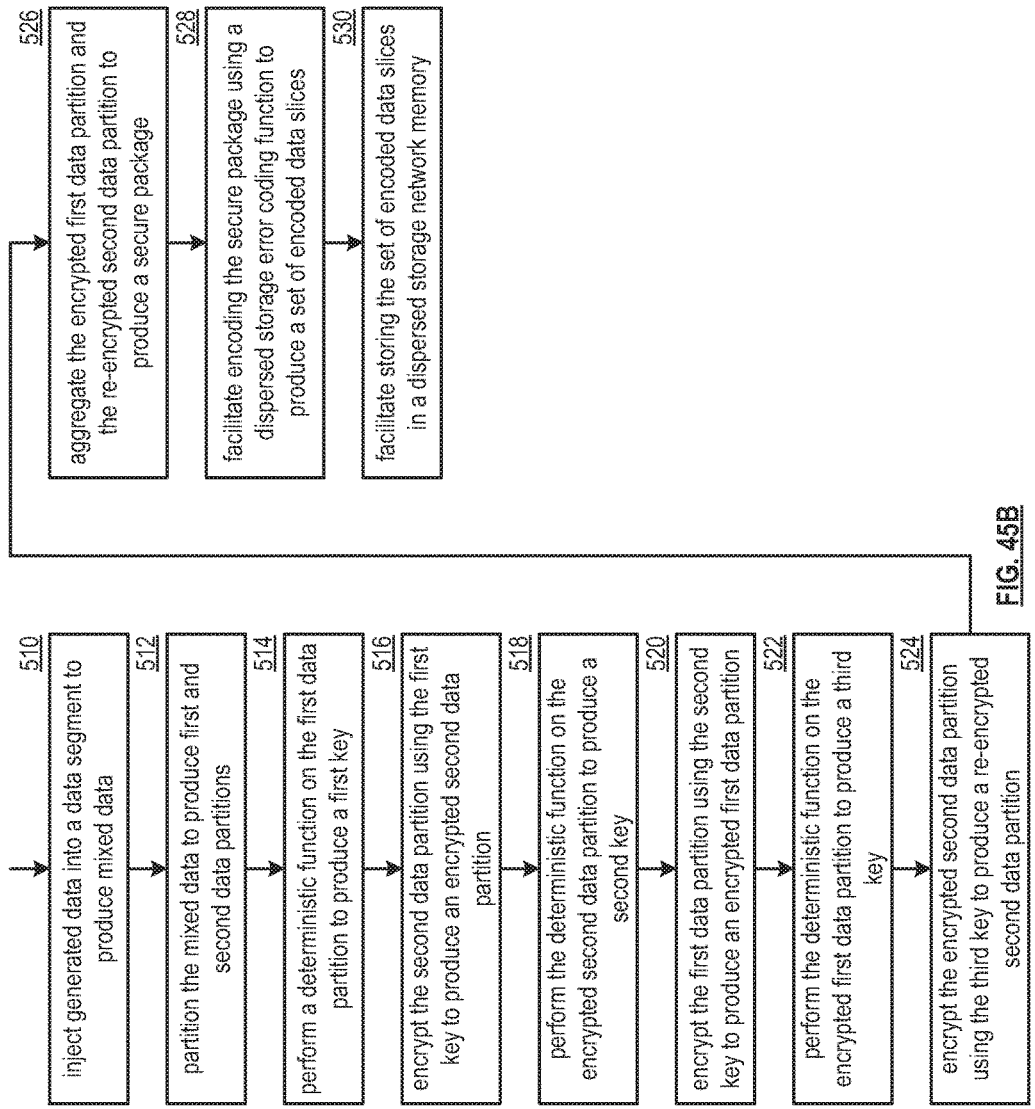
FIG. 45B is a flowchart illustrating an example of transforming data in accordance with the present invention.

FIG. 45B is a flowchart illustrating an example of transforming data. The method begins at step 510 where a processing module (e.g., of a distributed storage and task (DST) client module, of a dispersed storage (DS) processing module) injects generated data into a data segment to produce the mixed data in accordance with a data injection scheme. The injecting includes generating the generated data by one or more of retrieving/and/or generating a plurality of random bytes and generating a plurality of check bytes. The method continues at step 512 where the processing module partitions the mixed data in accordance with a partitioning approach (e.g., 50/50, 60/40) to produce first and second data partitions.

The method continues at step 514 where the processing module performs a deterministic function on the first data partition to produce a first key. For example, the processing module performs a hashing function on the first data partition to produce an interim result and truncates the interim result to produce the first key with a desired number of bits. The method continues at step 516 where the processing module encrypts the second data partition using the first key to produce an encrypted second data partition. The method continues at step 518 where the processing module performs the deterministic function on the encrypted second data partition to produce a second key.

The method continues at step 520 where the processing module encrypts the first data partition using the second key to produce an encrypted first data partition. The method continues at step 522 where the processing module performs the deterministic function on the encrypted first data partition to produce a third key. The method continues at step 524 where the processing module encrypts the encrypted second data partition using the third key to produce a re-encrypted second data partition.

The method continues at step 526 where the processing module aggregates the encrypted first data partition and the re-encrypted second data partition in accordance with an aggregation scheme to produce a secure package. The aggregating includes at least one of interleaving and appending. The method continues at step 528 where the processing module facilitates encoding the secure package using a dispersed storage error coding function to produce a set of encoded data slices. For example, the processing module encodes the secure package using the dispersed storage error coding function to produce the set of encoded data slices. The method continues at step 530 where the processing module facilitates storing the set of encoded data slices in a dispersed storage network (DSN) memory. The facilitating includes at least one of sending the set of encoded data slices to an output module and outputting the set of encoded data slices to the DSN memory.

Figure 45C:
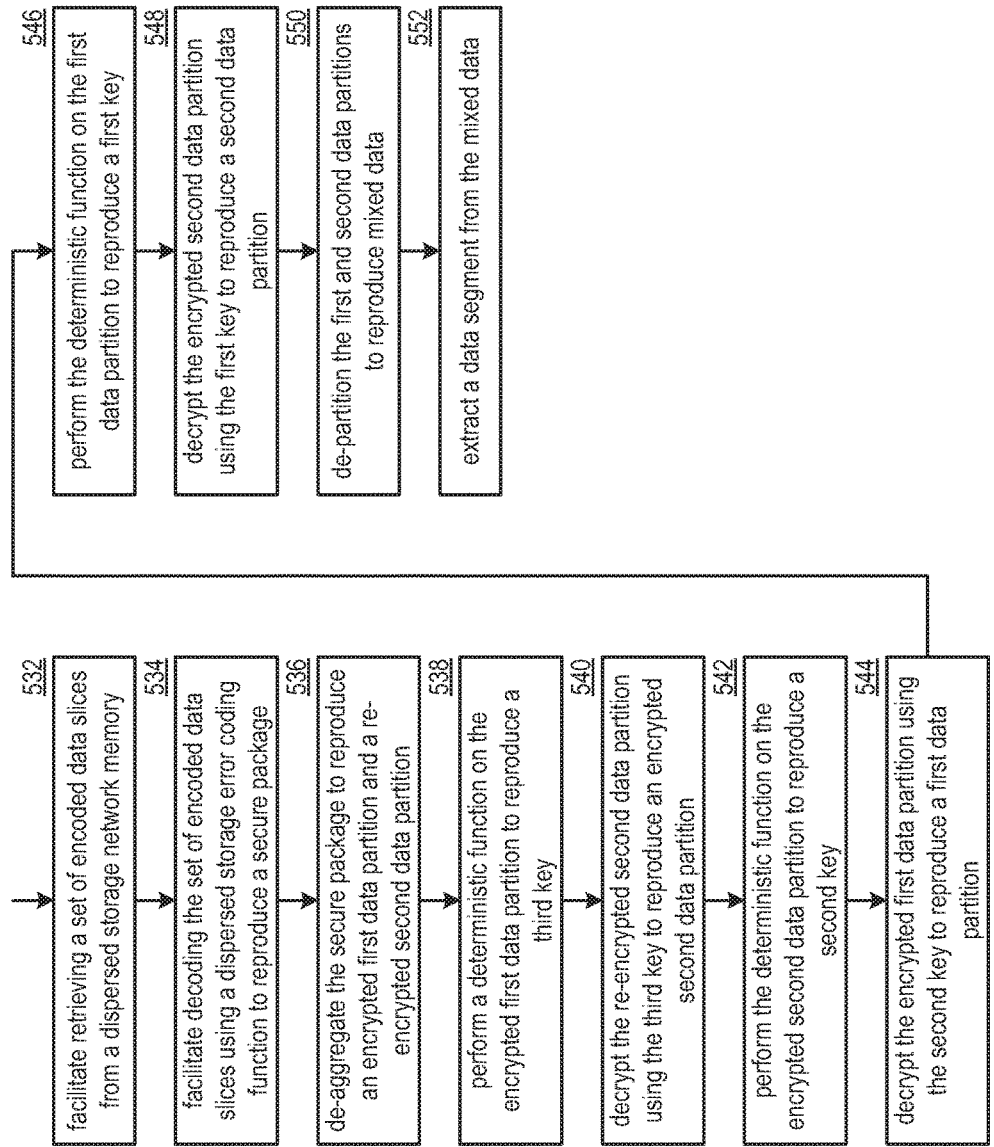
FIG. 45C is a flowchart illustrating an example of de-transforming data in accordance with the present invention.

FIG. 45C is a flowchart illustrating an example of de-transforming data. The method begins at step 532 where a processing module (e.g., of a distributed storage and task (DST) client module, of a dispersed storage (DS) processing module) facilitates retrieving a set of encoded data slices from a dispersed storage network (DSN) memory. The facilitating includes at least one of issuing slice retrieval requests and receiving at least a decode threshold number of encoded data slices of the set of encoded data slices from the DSN memory. The method continues at step 534 where the processing module facilitates decoding the set of encoded data slices using a dispersed storage error encoding function to reproduce a secure package. The facilitating includes decoding the at least the decode threshold number of encoded data slices of the set of encoded data slices using the dispersed storage error coding function to reproduce the secure package. The method continues at step 536 where the processing module de-aggregates the secure package in accordance with an aggregation scheme to reproduce an encrypted first data partition and a re-encrypted second data partition.

The method continues at step 538 where the processing module performs a deterministic function on the encrypted first data partition to reproduce a third key, where the deterministic function is substantially the same as a deterministic function utilized by a transforming data function to produce the third key. The method continues at step 540 where the processing module decrypts the re-encrypted second data partition using the third key to reproduce an encrypted second data partition. The method continues at step 542 where the processing module performs the deterministic function on the encrypted second data partition to reproduce a second key, where the deterministic function is substantially the same as a deterministic function utilized by the transforming data function to produce the second key. The method continues at step 544 where the processing module decrypts the encrypted first data partition using the second key to reproduce a first data partition. The method continues at step 546 where the processing module performs the deterministic function on the first data partition to reproduce a first key, where the deterministic function is substantially the same as a deterministic function utilized by the transforming data function to produce the first key. The method continues at step 548 where the processing module decrypts the encrypted second data partition using the first key to reproduce a second data partition.

The method continues at step 550 where the processing module de-partitions the first and second data partitions in accordance with a partitioning approach to reproduce mixed data, where the partitioning approach is substantially the same as a partitioning approach utilized by the transforming data function to reproduce the mixed data. The method continues at step 552 where the processing module extracts a data segment from the mixed data in accordance with a data injection scheme, where the data injection scheme is substantially the same as a data injection scheme utilized by the transforming data function to inject generated data into the data segment to produce the mixed data. For example, the processing module discards random bytes that were injected into the data segment. Alternatively, or in addition to, the processing module validates the data segment by comparing extracted check bytes of the mixed data to expected check bytes. For example, the processing module retrieves the expected check bytes from a local memory, extracts the checks bytes in accordance with the injection scheme from the mixed data, compares the extracted check bytes to the expected check bytes, and indicates that the data segment is valid (e.g., not tampered with) when the comparison is favorable (e.g., substantially the same).

FIGS. 46A, 46C, 46D, and 46E are schematic block diagrams of another embodiment of a dispersed storage network (DSN) system illustrating an example of storing related data. The DSN system includes distributed storage and task (DST) client modules 1-M, the network 24 of FIG. 1, a DST execution unit set 560, and a binding module 562. Each DST client module may be implemented using the DST client module 34 of FIG. 1. Hereafter, the DST client modules 1-M may be referred to interchangeably as write requesting modules. DST execution unit set 560 includes a set of DST execution units 1-n. Each DST execution unit may be implemented utilizing the DST execution unit 36 of FIG. 1. Hereafter, the DST execution units 1-n may be referred to interchangeably as storage units 1-n of the DSN memory. Alternatively, the DSN includes any number of DST execution unit sets 560. The binding module 562 may be implemented utilizing one or more of the DST client module 34 of FIG. 1, the DST execution unit 36 of FIG. 1, a server, a user device, the distributed storage and task network (DSTN) managing unit 18 of FIG. 1, and the DST integrity processing unit 20 of FIG. 1. Alternatively, the DSN includes any number of binding modules 562.

A computer readable storage medium of the DSN includes one or more memory sections. Each memory section stores operational instructions. Each of the DST client modules 1-M, the DST execution units 1-n, and the binding module 562 includes one or more processing modules of one or more computing devices of the DSN. The one or more processing modules execute the operational instructions stored by one or more memory sections. As a specific example, a first memory section stores operational instructions that are executed by the one or more processing modules of the DST client modules 1-M to cause the one or more computing devices to perform functions of the write requesting entities (e.g., the DST client modules 1-M). As another specific example, a second memory section stores operational instructions that are executed by the one or more processing modules of the binding module 562 to cause the one or more computing devices to perform functions of the binding module 562. As yet another specific example, a third memory section stores operational instructions that are executed by the one or more processing modules of the DST execution units 1-n to cause the one or more computing devices to perform functions of the storage units 1-n of the DSN memory (e.g., the DST execution units 1-n).

FIG. 46A illustrates initial steps of the example of the storing of the related data. As a specific example, each of a group of DST client modules 1-2 generates one or more sets of write requests (e.g., write slice requests 1, write slice requests 2) regarding one of a group of portions of the related data. Each write request includes an encoded data slice and information indicating that the write request corresponds to a portion of the group of portions of the related data. The write request may further include a slice name of the encoded data slice, a request number, and a slice revision number of the encoded data slice. A data segment of the portion of the group of portions of the related data is encoded to produce a set of encoded data slices, which includes the encoded data slice.

In an instance of the example, the DST client module 1 dispersed storage error encodes a first data object to produce a first plurality of sets of encoded data slices and the DST client module 1 dispersed storage error encodes a second data object to produce a second plurality of sets of encoded data slices, where the related data includes the first data object and the second data object. Having generated the first and second plurality of sets of encoded data slices, the DST client module 1 generates the write slice requests 1 to include a set of write slice requests 1-1, 1-2, 1-3, through 1-n and the DST client module 2 generates the write slice requests 2 to include another set of write slice requests 2-1, 2-2, 2-3, through 2-n. The set of write slice requests 1-1, 1-2, 1-3, through 1-n includes the first plurality of sets of encoded data slices and the other set of write slice requests 2-1, 2-2, 2-3, through 2-n includes the second plurality of sets of encoded data slices. The method of generating the one or more sets of write requests is discussed in greater detail with reference to FIG. 46B.

The information indicating that the write request corresponds to the portion of the group of portions of the related data includes a field within the write request to indicate one or more of the write request corresponds to the related data (e.g., a different transaction number from each of the DST client modules), a total number of sets of write requests regarding the related data, a current number of a set of the sets of write requests regarding the related data, a size of the related data, and an identifier of the binding module. Having generated the one or more sets of write requests, the group of DST client modules 1 and 2 (e.g., the group of write requesting modules) sends a group of the one or more sets of write requests to the DST execution unit set 560 (e.g., the DSN memory of the DSN). For instance, the DST client module 1 sends, via the network 24, the set of write slice requests 1-1, 1-2, 1-3, through 1-n to the DST execution units 1-n and the DST client module 2 sends, via the network 24, the other set of write slice requests 2-1, 2-2, 2-3, through 2-n to the DST execution units 1-n.

Having sent the group of the one or more sets of write requests to the DST execution unit set 560 (e.g., the DSN memory), the group of DST client modules 1-2 sends binding information to the binding module 562 of the DSN. The binding information includes transaction information from each of the group of DST client modules 1-2 (e.g., the group of write requesting modules). The transaction information includes, from each of the group of DST client modules 1-2, the different transaction number that indicates a separate write operation and an identifier of a corresponding DST client module. The transaction information may further include, for each different transaction number, a write threshold number, a commit threshold number, and a temporary authorization token to enable the binding module 562 to access the DST execution unit set 560 and the half of the corresponding DST client module. In an instance of sending the binding information, the DST client module 1 generates binding information 1 to include a transaction number 51 associated with writing of the first plurality of sets of encoded data slices, identifier 1 for DST client module 1, a write threshold number of 14 for the transaction number 51, and a commit threshold number of 13 for the transaction number 51.

FIG. 46B is a schematic block diagram of another embodiment of a distributed storage and task (DST) client module further illustrating the example of the storing the related data by the group of DST client modules 1-2. Each DST client module includes the outbound dispersed storage (DS) processing module 80 of FIG. 3. The outbound DS processing module 80 includes a data portioning 564, the data partition 110 of FIG. 4, the DS error encoding 112 of FIG. 4, and the grouping selector 114 of FIG. 4.

In the example of the storing of the related data, the group of DST client modules 1-2 generates the one or more sets of write requests regarding the one of the group of portions of the related data 566. As a specific example, having access to the related data 566 and unrelated data 568 (e.g., including data objects 1-3), the group of DST client modules 1-2 determines that data objects 5 and 8 are related to produce the related data 566 for storing in the DSN memory. As such, the group of DST client modules 1-2 determines to exclude the data objects 1-3 from the related data 566. For instance, the group of DST client modules 1-2 receives a command to relate the data objects 5 and 8 into the related data 566. As another instance, the group of DST client modules 1-2 identifies a common source of the data objects 5 and 8. As yet another instance, the group of DST client modules 1-2 receives the data objects 5 and 8 concurrently within a given time frame (e.g., within one minute). As a further instance, the group of DST client modules 1-2 identifies a common data type of the data objects 5 and 8. As a still further instance, the group of DST client modules 1-2 interprets metadata of the data objects 5 and 8. As yet a still further instance, the group of DST client modules 1-2 generates a data object 8 as metadata of data object 5. In a specific example of the related data 566, the data object 5 is a tenth revision of a sixth chapter of a book and the data object 8 is a tenth revision of a table of contents for the book. In another specific example of the related data 566, data objects 5 and 8 are portions of a larger data object.

Having determined the related data 566, for each DST client module of the group of DST client modules 1-2, the data portioning 564 selects at least some of the group of portions of the related data 566. For example, the data portioning 564 of the DST client module 1 selects a first portion of the data object 5 to produce a data portion 570 and the data portioning 564 of the DST client module 2 selects a corresponding first portion of the data object 8 to produce another data portion 570. Having selected the at least some of the group of portions of the related data 566, each data partition 110 partitions each corresponding data portion 570 in accordance with a segmentation scheme to produce one or more data segments 572. The segmentation scheme includes at least one of utilizing a predetermined fixed segment size, using a ramping up segment size, and utilizing a ramping down segment size.

Having produced the one or more data segments 572, for each data segment 572, the DS error encoding 112 dispersed storage error encodes the data segment 572 to produce an encoded data slice set 574 (e.g., a corresponding set of encoded data slices) of a corresponding plurality of sets of encoded data slices. For example, the DS error encoding 112 of the DST client module 1 generates the first plurality of sets of encoded data slices corresponding to the portion of the data object 5 and the DS error encoding 112 of the DST client module 2 generates the second plurality of sets of encoded data slices corresponding to the portion of the data object 8.

Having produced the corresponding plurality of sets of encoded data slices, each grouping selector 114 generates each write request of the one or more sets of write requests to include the corresponding plurality of sets of encoded data slices and the information indicating that the write request corresponds to the first portion of the group of portions of the related data 566. For example, the grouping selector 114 generates the write requests 1 to include the set of write slice requests 1-1, 1-2, 1-3, through 1-n and the DST client module 2 generates the write slice requests 2 to include the other set of write slice requests 2-1, 2-2, 2-3, through 2-n. The set of write requests 1-1, 1-2, 1-3, through 1-n includes the first plurality of sets of encoded data slices corresponding to the portion of the data object 5 and first information indicating that the write slice requests 1 corresponds to the first portion of the group of portions of the data object 5 (e.g., the transaction number 51). The other set of write requests 2-1, 2-2, 2-3, through 2-n includes the second plurality of sets of encoded data slices corresponding to the portion of the data object 8 and second information indicating that the write slice requests 2 corresponds to the first portion of the group of portions of the data object 8 (e.g., a transaction number 81).

FIG. 46C illustrates further steps of the example of the storing of the related data. As a specific example, each DST execution unit receives at least some of the one or more sets of write slice requests and interprets the information indicating that the write request corresponds to the portion of the group of portions of the related data and communicates with the binding module 562 regarding processing the remaining phases. As an example of the interpreting, the DST execution unit set 1-n interprets the set of write slice requests 1-1, 1-2, 1-3, through 1-n to associate the DST client module 1 with the transaction number 51 of the set of write slice requests 1-1, 1-2, 1-3, through 1-n and to associate the transaction number 51 with the binding module 562. As another example of the interpreting, the DST execution unit set 1-n interprets the other set of write slice requests 2-1, 2-2, 2-3, through 2-n to associate the DST client module 2 with the transaction number 81 of the set of write slice requests 2-1, 2-2, 2-3, through 2-n and to associate the transaction number 81 with the binding module 562.

As an example of the communicating with the binding module 562 regarding processing the remaining phases, the DST execution unit set 1-n processes the received write requests to produce a corresponding write responses. Each corresponding write response determines whether the write request was successfully executed (e.g., storing an encoded data slice without error). Each DST execution unit generates a favorable write response status when the corresponding write request was successfully executed. Each DST execution unit generates an unfavorable write response status when the corresponding write request was not successfully executed (e.g., addressing error, communication error, a write conflict error, insufficient storage space, etc.).

Having determined whether each write request was successfully executed, the DST execution unit set 1-n issues, via the network 24, a set of write slice responses 1-1, 1-2, 1-3, through 1-n to the binding module 562 as write slice responses 576, where the set of write slice responses 1-1, 1-2, 1-3, through 1-n indicates the status of the corresponding set of write slice requests 1-1, 1-2, 1-3, through 1-n. The DST execution unit set 1-n further issues, via the network 24, another set of write slice responses 2-1, 2-2, 2-3, through 2-n to the binding module 562 as further write slice responses 576, where the set of write slice responses 2-1, 2-2, 2-3, through 2-n indicates the status of the corresponding set of write slice requests 2-1, 2-2, 2-3, through 2-n.

The binding module 562 receives, via the network 24, the write slice responses 576 and determines whether a favorable response to the group of the one or more sets of write requests is received. The determining includes, for each set of encoded data slices of each of the pluralities of sets of encoded data slices, determining whether a corresponding write threshold number of favorable write slice responses have been received within a response timeframe. For example, the binding module 562 extracts the write threshold number of 14 for the transaction number 51 from the binding information 1, extracts a write threshold number of 15 for the transaction number 81 from binding information 2, and indicates the favorable response when at least 14 favorable write slice responses have been received for each set of encoded data slices of the first plurality of sets of encoded data slices corresponding to the data object 5 and at least 15 favorable write slice responses have been received for each set of encoded data slices of the second plurality of sets of encoded data slices corresponding to the data object 8.

FIG. 46D illustrates further steps of the example of the storing of the related data. As a specific example, the binding module 562 processes remaining phases of the group of the one or more sets of write requests for writing the related data into the DST execution unit set 560 as a single set of write requests. The remaining phases, after a first phase that includes the writing, includes a second phase that includes one of a commit or rollback, and a third phase that includes one of a finalize or undo.

As an example of the second phase, when the favorable response to the group of the one or more sets of write requests is received, the binding module 562 issues, via the network 24, transaction requests 1 and 2 on behalf of the DST client modules 1-2 to the set of DST execution units 1-2, where the transaction requests 1 and 2 includes a set of write commit requests for the group of portions of the related data. The issuing includes the binding module 562 generating the set of write commit requests to include the different transaction numbers from each of the write requesting modules. For instance, the binding module 562 generates the set of write commit requests to include the transaction number 51, the transaction number 81, the temporary access token from DST client module 1, and a temporary access token from DST client module 2; and sends, via the network 24, the set of write commit requests to the set of DST execution units 1-n. When receiving a corresponding write commit request, each DST execution unit changes status of encoded data slices of each of the pluralities of sets of encoded data slices based on the corresponding transaction number to indicate that the corresponding encoded data slices are accessible (e.g., visible versions for retrieval). The changing of the status may further include each DST execution unit verifying each temporary access token and changing the status when each corresponding temporary access token has been verified.

As another example of the second phase, when the favorable response to the group of the one or more sets of write requests is not received, the binding module 562 issues, via the network 24, the transaction requests 1 and 2 on the behalf of the DST client modules 1-2 to the set of DST execution units 1-2, where the transaction requests 1 and 2 includes a set of write rollback requests for the group of portions of the related data. The issuing includes the binding module 562 generating set of write rollback requests for the group of portions of the related data to include the different transaction numbers from each of the write requesting modules. For instance, the binding module 562 generates the set of write rollback requests to include the transaction number 51, the transaction number 81, the temporary access token from DST client module 1, and the temporary access token from DST client module 2. Having generated the set of write rollback requests, the binding module 562 sends, via the network 24, the set of write rollback requests the set of DST execution units 1-n. When receiving a corresponding write rollback request, each DST execution unit deletes the encoded data slices of each of the pluralities of sets of encoded data slices based on the corresponding transaction number.

Having sent the set of write rollback requests, the binding module 562 may notify each of the group of DST client modules 1-2 (e.g., write requesting modules) of rollback of the writing of the related data. For example, the binding module 562 issues a notification 1 to the DST client module 1 and issues a notification 2 to the DST client module 2, where each notification includes one or more of a corresponding transaction number, a DST client module identifier, the identifier of the binding module, and status (e.g., rollback) of the corresponding transaction. Having received the rollback status, the group of DST client modules 1-2 may subsequently re-issue the write requests to the DST execution unit set 560.

As an example of the third phase, the set of DST execution unit 1-n issues, via the network 24, transaction responses 1 and 2 to the binding module 562 with regards to the transaction requests 1 and 2 of the second phase. For example, the set of DST execution unit 1-n issues a set of write commit responses based on processing of the set of write commit requests. For instance, DST execution unit 2 issues a favorable write commit response indicating that a corresponding write commit request was successfully processed. The issuing includes determining that the write commit request was successfully processed for each encoded data slice of each set of encoded data slices of each of the pluralities of sets of encoded data slices for the transaction numbers 51 and 81 and issuing the favorable write commit response when the write commit request was successfully processed for each encoded data slice of each transaction.

The binding module 562 determines whether a favorable response to the set of write commit requests is received based on received write commit responses. For example, the binding module indicates the favorable response to the set of write commit requests when receiving at least a commit threshold number of favorable write commit responses, where the commit threshold is based on at least one of the commit thresholds of the transactions 51 and 81. For instance, the binding module indicates the favorable response when receiving 15 favorable write commit responses and a highest commit threshold number of each commit threshold number associated with each transaction is 15.

When the favorable response to the set of write commit requests is received, the binding module issues, via the network 24, further transaction requests 1 and 2 to the set of DST execution units 1-2, where the further transaction requests 1 and 2 includes a set of write finalize requests for the group of portions of the related data. The issuing includes the binding module 562 generating the set of write finalize requests to include one or more of a plurality of sets of slice names for each of the pluralities of sets of encoded data slices, a plurality of sets of revision numbers for each of the pluralities of sets of encoded data slices, and the different transaction numbers from each of the write requesting modules. When receiving a corresponding write finalize request, each DST execution unit changes a status of the corresponding transaction of writing the encoded data slices of each of the pluralities of sets of encoded data slices to indicate that the corresponding transaction has ended and that any locks on writing slices associated with the plurality of sets of slice names are unlocked allowing others to write further encoded data slices of the same plurality of sets of slice names. The changing of the transaction status may further include each DST execution unit verifying each temporary access token and changing the status when each corresponding temporary access token has been verified.

Having sent the set of write finalize requests to the DST execution unit set 560, the binding module 562 notifies each of the DST client modules of finalizing of the writing the related data. For example, the binding module 562 issues the notification 1 to the DST client module 1 and issues the notification 2 to the DST client module 2, where each notification includes one or more of the corresponding transaction number, the DST client module identifier, the identifier of the binding module, and status (e.g., finalize) of the corresponding transaction.

As another example of the third phase, when the favorable response to the set of write commit requests is not received, the binding module 562 issues further transaction requests 1 and 2 to the set of DST execution units 1-2, where the further transaction requests 1 and 2 includes a set of write undo requests for the group of portions of the related data. For example, the binding module 562 generates the set of write undo requests for the group of portions of the related data to include one or more of the plurality of sets of slice names for each of the pluralities of sets of encoded data slices, the plurality of sets of revision numbers for each of the pluralities of sets of encoded data slices, and the different transaction numbers from each of the write requesting modules. Having generated the set of write undo requests, the binding module 562 sends, via the network 24, the set of write undo requests to the set of DST execution units 1-2.

When receiving a corresponding write undo request, each DST execution unit deletes the encoded data slices of each of the pluralities of sets of encoded data slices based on the corresponding transaction number and changes the status of the corresponding transaction number to inactive. When receiving the corresponding write undo request, each DST execution unit may further change the status of the corresponding transaction of writing the encoded data slices of each of the pluralities of sets of encoded data slices to indicate that the corresponding transaction has ended and that any locks on writing slices associated with the plurality of sets of slice names are unlocked allowing others to write further encoded data slices of the same plurality of sets of slice names. The changing of the transaction status may further include each DST execution unit verifying each temporary access token and changing the status when each corresponding temporary access token has been verified.

Having sent the set of write undo requests, the binding module 562 may notify each of the group of DST client modules 1-2 (e.g., write requesting modules) of undoing of the writing of the related data. For example, the binding module 562 issues yet another notification 1 to the DST client module 1 and issues yet another notification 2 to the DST client module 2, where each notification includes one or more of the corresponding transaction number, the DST client module identifier, the identifier of the binding module, and status (e.g., undo) of the corresponding transaction. Having received the undo status, the group of DST client modules 1-2 may subsequently re-issue the write requests to the DST execution unit set 560.

FIG. 46E illustrates final steps of the example of the storing of the related data. As a specific example, the binding module 562 notifies the group of the DST client modules 1-2 (e.g., the write requesting modules) of status (e.g., transaction status) of the writing the related data into the DST execution unit set 560 at completion of the processing of the remaining phases. For example, the binding module 562 generates transaction status 1 and transaction status 2, where the transaction status 1 and 2 indicates a favorable status (e.g., succeeded) of the writing of the related data when the transactions 51 and 81 both successfully completed the processing of the other remaining phases (e.g., ending with sending of the write finalize requests for both transactions). As such, while the related data is written into the DST execution unit set 560 in pieces over time as groups of portions, the related data is made accessible as a single piece of data when the processing of the remaining phases is successful.

As another example, the binding module 562 generates transaction status 1 and transaction status 2, where the transaction status 1 and 2 indicates an unfavorable status (e.g., failed) of the writing of the related data when at least one of the transaction numbers 51 and 81 did not successfully complete the processing of the remaining phases (e.g., ending with sending of at least one of the write rollback requests and the write undo requests for at least one of the transactions). As such, when the processing of the remaining phases is not successful, none of the pieces of the related data are accessible.

FIG. 46F is a flowchart illustrating an example of storing related data. The method begins with step 580 where a group of write requesting modules of a dispersed storage network (DSN) determines the data objects are related to produce related data. The determining includes at least one of receiving a command to relate the data objects into the related data, identifying a common source of the data objects, receiving the data objects concurrently within a given time frame, identifying a common data type of the data objects, and interpreting metadata of the data objects.

The method continues at step 582 where each of the group of write requesting modules generates one or more sets of write requests regarding one of a group of portions of the related data. A write request of the one or more sets of write requests includes an encoded data slice and information indicating that the write request corresponds to a portion of the group of portions of the related data. A data segment of the portion of the group of portions of the related data is encoded to produce a set of encoded data slices. The set of encoded data slices includes the encoded data slice.

The method continues at step 584 where the group of write requesting modules sends a group of the one or more sets of write requests to DSN memory of the DSN. The method continues at step 586 where the group of write requesting module sends binding information to a binding module of the DSN. The method continues at step 588 where storage units of the DSN memory interpret the information indicating that the write request corresponds to the portion of the group of portions of the related data. The method continues at step 590 where the storage units communicate with the binding module regarding processing the remaining phases of the group of the one or more sets of write requests for writing the related data into the DSN memory.

The method continues at step 592 where the binding module processes the remaining phases of the group of the one or more sets of write requests for writing the related data into the DSN memory as a single set of write requests. As an example of the processing of the remaining phases by the binding module, when a favorable response to the group of the one or more sets of write requests is received, the binding module generates a set of write commit requests for the group of portions of the related data and sends the set of write commit requests to the DSN memory. When the favorable response to the group of the one or more sets of write requests is not received, the binding module generates a set of write rollback requests for the group of portions of the related data, sends the set of write rollback requests to the DSN memory, and notifies each of the group of write requesting modules of rollback of the writing the related data.

As another example of the processing of the remaining phases, when a favorable response to the set of write commit requests is received, the binding module generates a set of write finalize requests for the group of portions of the related data, sends the set of write finalize requests to the DSN memory, and notifies each of the group of write requesting modules of finalizing of the writing the related data. When the favorable response to the set of write commit requests is not received, the binding module generates a set of write undo requests for the group of portions of the related data, sends the set of write undo requests to the DSN memory, and notifies each of the group of write requesting modules of undoing of the writing the related data.

The method continues at step 594 where the binding module notifies the write requesting modules of status (e.g., transaction status) of the writing the related data into the DSN memory at completion of the processing of the remaining phases. As such, the related data is written into the DSN memory in pieces over time as groups of portions and the related data is made accessible as a single piece of data when the processing of the remaining phases is successful. When the processing of the remaining phases is not successful, none of the pieces of the related data are accessible.

FIG. 47 is a flowchart illustrating an example of synchronously storing two or more data objects in a dispersed storage network (DSN). The method begins at step 600 where a processing module (e.g., of a distributed storage and task (DST) client module, of a dispersed storage (DS) processing module) selects two or more write transactions to be associated with a common write transaction. The method continues at step 602 where a binding module obtains binding information with regards to the two or more write transactions from one or more DS processing modules associated with the two or more write transactions. The method continues at step 604 where the binding module receives transaction responses (e.g., write slice responses) from one or more DS units sets with regards to the two or more write transactions.

The method continues at step 606 where the binding module determines that a favorable number of write acknowledgments (e.g., write slice responses) have been received for a first write transaction of the two or more write transactions. For example, the binding module receives at least a write threshold number of favorable (e.g., succeeded) write slice responses with regards to the first write transaction.

When the favorable number of write acknowledgments have been received, the method continues at step 608 where the binding module issues a commit transaction request to a corresponding DS unit set of the one or more DS units sets to commit the first write transaction. The issuing includes issuing a commit write transaction request to each DS unit of the corresponding DS unit set where the transaction request includes a common transaction number with the first write transaction. Alternatively, when the favorable number of write acknowledgments have not been received within a time frame, the binding module issues rollback transaction requests to the one or more DS units sets with regards to the two or more write transactions (e.g., a rollback transaction request issued to a DS unit set includes a common transaction number with the corresponding write transaction).

The method continues at step 610 where the binding module determines that a favorable number of commit acknowledgments have been received for the first write transaction. For example, the binding module receives at least a write threshold number of favorable commit transaction responses. Alternatively, when the favorable number of commit transactions have not been received for the first write transaction within a time frame, the binding module issues undo transaction requests to the DS unit set that corresponds to the first write transaction and issues rollback transaction requests to remaining DS units sets of the one or more DS units sets with regards to other write transactions of the two or more write transactions.

When the favorable number of commit transaction responses have been received with regards to the first write transaction, the method continues at step 612 where the binding module determines that a favorable number of write acknowledgments have been received for a second write transaction of the two or more write transactions. For example, the binding module receives at least a write threshold number of favorable write slice responses with regards to the second write transaction. Alternatively, when the favorable number write acknowledgments have not been received for the second write transaction within a time frame, the binding module issues the undo transaction requests to the DS unit set that corresponds to the first write transaction and issues the rollback transaction requests to remaining DS units sets of the one or more DS units sets with regards to other write transactions of the two or more write transactions.

When a favorable number of write acknowledgments have been received for the second write transaction, the method continues at step 614 where the binding module issues a commit transaction request to another corresponding DS unit set (e.g., associated with the second write transaction) of the one or more DS units sets to commit the second write transaction. The method continues at step 616 where the binding module determines that a favorable number of commit acknowledgments have been received for the second write transaction. Alternatively, when the favorable number of commit transactions have not been received for the second write transaction within a time frame, the binding module issues undo transaction requests to the DS unit set that corresponds to the second write transaction, issues undo transaction requests to the DS unit set that corresponds to the first write transaction, and issues rollback transaction requests to remaining DS units sets of the one or more DS units sets with regards to other write transactions of the two or more write transactions that have not received commit requests. When the favorable number of commit acknowledgments have been received for each write transaction of the two or more write transactions, the method continues at step 618 where the binding module issues finalize transaction requests to each of the one or more DS units sets with regards to each of the two or more write transactions including the first transaction and the second transaction.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method for execution within a dispersed storage network (DSN), the method comprises:
   determining, by a first distributed storage and task (DST) client module and a second DST client module, that a first data object and a second data objects are related;
   dispersed storage error encoding, by the first DST client module, the first data object to produce a first plurality of sets of encoded data slices;
   dispersed storage error encoding, by the second DST client module, the second data object to produce a second plurality of sets of encoded data slices;
   sending, by the first DST client module, first write requests regarding the first plurality of sets of encoded data slices to a set of storage units of the DSN, wherein the first write requests include a first transaction number and a first indication that the first data object is related to the second data object;
   sending, by the second DST client module, second write requests regarding the second plurality of sets of encoded data slices to the set of storage units, wherein the second write requests include a second transaction number and a second indication that the second data object is related to the first data object; and
   processing, by a binding module of the DSN, remaining phases of the first and second write requests as a single write operation for the first and second data objects.

2. The method of claim 1 further comprises:
   sending, by the first DST client module, a first plurality of sets of write requests regarding the first plurality of sets of encoded data slices, wherein the first plurality of sets of write requests corresponds to a first phase of a write operation to write the first plurality of sets of encoded data slices into the set of storage units, and wherein each write request of the first plurality of sets of write requests includes the first transaction number; and
   sending, by the second DST client module, a second plurality of sets of write requests regarding the second plurality of sets of encoded data slices, wherein the second plurality of sets of write requests corresponds to a first phase of a write operation to write the second plurality of sets of encoded data slices into the set of storage units, and wherein each write request of the second plurality of sets of write requests includes the second transaction number.

3. The method of claim 2, wherein the processing the remaining phases of the first and second write requests comprises:
   combining the first and second transaction numbers into a combined transaction number; and
   upon receiving successful write responses from the set of storage units regarding the first and second pluralities of sets of encoded data slices, issuing, to the set of storage units, a plurality of sets of commit requests regarding the first and second pluralities of sets of encoded data slices.

4. The method of claim 3 further comprises:
   upon receiving successful commit responses from the set of storage units regarding the first and second pluralities of sets of encoded data slices, issuing, to the set of storage units, a plurality of sets of finalize requests regarding the first and second pluralities of sets of encoded data slices.

5. The method of claim 4 further comprises:
   when the successful commit responses are not received from the set of storage units, sending undo commands to the set of storage units regarding the first and second pluralities of sets of encoded data slices.

6. The method of claim 3 further comprises:
   when the successful write responses are not received from the set of storage units, sending rollback commands to the set of storage units regarding the first and second pluralities of sets of encoded data slices.

7. The method of claim 1, wherein the determining that the first and second data objects are related comprises one or more of:
   receiving, by the first and second DST client modules, a command indicating that the first and second data objects are related;
   identifying, by the first and second DST client modules, a common source of the first and second data objects;
   receiving, by the first and second DST client modules, the first and second data objects within a given timeframe;
   identifying, by the first and second DST client modules, a common data type of the first and second data objects; and
   interpreting, by the first and second DST client modules, metadata of the first and second data objects.

8. The method of claim 1 further comprises:
   the first indication indicates that the first data object is a first part of related data; and
   the second indication indicates that the second data object is a second part of the related data.

9. A non-transitory computer readable memory comprises:
   a first memory section that stores operational instructions that, when executed by a first dispersed storage and task (DST) client module and a second DST client module of a dispersed storage network (DSN), causes the first and second DST client modules to:
      determine that a first data object and a second data objects are related;
   a second memory section that stores operational instructions that, when executed by the first DST client module, causes the first DST client module to:
      dispersed storage error encode the first data object to produce a first plurality of sets of encoded data slices; and
      send first write requests regarding the first plurality of sets of encoded data slices to a set of storage units of the DSN, wherein the first write requests include a first transaction number and a first indication that the first data object is related to the second data object;
   a third memory section that stores operational instructions that, when executed by the second DST client module, causes the second DST client module to:
      dispersed storage error encode the second data object to produce a second plurality of sets of encoded data slices; and
      send second write requests regarding the second plurality of sets of encoded data slices to the set of storage units, wherein the second write requests include a second transaction number and a second indication that the second data object is related to the first data object; and
   a fourth memory section that stores operational instructions that, when executed by a binding module of the DSN, causes the binding module to:

process remaining phases of the first and second write requests as a single write operation for the first and second data objects.

10. The non-transitory computer readable memory of claim 9 further comprises:
the second memory section further stores operational instructions that, when executed by the first DST client module, causes the first DST client module to:
send a first plurality of sets of write requests regarding the first plurality of sets of encoded data slices, wherein the first plurality of sets of write requests corresponds to a first phase of a write operation to write the first plurality of sets of encoded data slices into the set of storage units, and wherein each write request of the first plurality of sets of write requests includes the first transaction number; and
the third memory section further stores operational instructions that, when executed by the second DST client module, causes the second DST client module to:
send a second plurality of sets of write requests regarding the second plurality of sets of encoded data slices, wherein the second plurality of sets of write requests corresponds to a first phase of a write operation to write the second plurality of sets of encoded data slices into the set of storage units, and wherein each write request of the second plurality of sets of write requests includes the second transaction number.

11. The non-transitory computer readable memory of claim 10, wherein the fourth memory section further stores operational instructions that, when executed by the binding module of the DSN, causes the binding module to process the remaining phases of the first and second write requests by:
combining the first and second transaction numbers into a combined transaction number; and
upon receiving successful write responses from the set of storage units regarding the first and second pluralities of sets of encoded data slices, issuing, to the set of storage units, a plurality of sets of commit requests regarding the first and second pluralities of sets of encoded data slices.

12. The non-transitory computer readable memory of claim 11, wherein the fourth memory section further stores operational instructions that, when executed by the binding module of the DSN, causes the binding module to:
upon receiving successful commit responses from the set of storage units regarding the first and second pluralities of sets of encoded data slices, issue, to the set of storage units, a plurality of sets of finalize requests regarding the first and second pluralities of sets of encoded data slices.

13. The non-transitory computer readable memory of claim 12, wherein the fourth memory section further stores operational instructions that, when executed by the binding module of the DSN, causes the binding module to:
when the successful commit responses are not received from the set of storage units, send undo commands to the set of storage units regarding the first and second pluralities of sets of encoded data slices.

14. The non-transitory computer readable memory of claim 11, wherein the fourth memory section further stores operational instructions that, when executed by the binding module of the DSN, causes the binding module to:
when the successful write responses are not received from the set of storage units, send rollback commands to the set of storage units regarding the first and second pluralities of sets of encoded data slices.

15. The non-transitory computer readable memory of claim 9, wherein the first memory section further stores operational instructions that, when executed by the first DST client module and the second DST client module, causes the first and second DST client modules to determine that the first and second data objects are related by one or more of:
receiving a command indicating that the first and second data objects are related;
identifying a common source of the first and second data objects;
receiving the first and second data objects within a given timeframe;
identifying a common data type of the first and second data objects; and
interpreting metadata of the first and second data objects.

16. The non-transitory computer readable memory of claim 9 further comprises:
the first indication indicates that the first data object is a first part of related data; and
the second indication indicates that the second data object is a second part of the related data.

* * * * *